US007744459B2

(12) United States Patent
Okada

(10) Patent No.: US 7,744,459 B2
(45) Date of Patent: Jun. 29, 2010

(54) GAME SYSTEM INCLUDING SLOT MACHINES AND GAME CONTROL METHOD THEREOF

(75) Inventor: Kazuo Okada, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 594 days.

(21) Appl. No.: 11/634,975

(22) Filed: Dec. 7, 2006

(65) Prior Publication Data

US 2008/0051176 A1 Feb. 28, 2008

Related U.S. Application Data

(60) Provisional application No. 60/839,675, filed on Aug. 24, 2006.

(51) Int. Cl.
*G06F 17/00* (2006.01)

(52) U.S. Cl. ........................................ 463/20

(58) Field of Classification Search .............. 463/16–25
See application file for complete search history.

(56) References Cited

U.S. PATENT DOCUMENTS

| | | | | |
|---|---|---|---|---|
| 6,634,941 | B2 | 10/2003 | Olive | |
| 6,905,412 | B2 * | 6/2005 | Thomas et al. | 463/25 |
| 7,326,115 | B2 * | 2/2008 | Baerlocher | 463/25 |
| 7,344,444 | B2 * | 3/2008 | Suzuki | 463/36 |
| 7,416,186 | B2 * | 8/2008 | Walker et al. | 273/292 |
| 2004/0110558 | A1 | 6/2004 | Suda et al. | |
| 2006/0040735 | A1 | 2/2006 | Baerlocher | |
| 2006/0160624 | A1 | 7/2006 | Slomiany et al. | |
| 2008/0045309 | A1 * | 2/2008 | Okada | 463/20 |
| 2008/0051175 | A1 * | 2/2008 | Okada | 463/20 |
| 2008/0051176 | A1 * | 2/2008 | Okada | 463/20 |
| 2008/0051186 | A1 * | 2/2008 | Okada | 463/20 |
| 2008/0051199 | A1 * | 2/2008 | Okada | 463/42 |
| 2008/0064468 | A1 * | 3/2008 | Okada | 463/16 |

(Continued)

FOREIGN PATENT DOCUMENTS

| | | |
|---|---|---|
| CN | 1535746 | 10/2004 |

(Continued)

OTHER PUBLICATIONS

International Search Report, Macao; Jan. 5, 2009. English translation included.

*Primary Examiner*—Ronald Laneau
(74) *Attorney, Agent, or Firm*—NDQ&M Watchstone LLP

(57) ABSTRACT

A game system has a plurality of slot machines, each slot machine having a controller for executing a basic game, and transmitting a signal for making a transition to the roulette game when a prescribed symbol combination is stopped on a payline; a second game device for executing the roulette game, which is provided as a physically separate device from the slot machines; a display for displaying images according to a game status of the second game device; and a center controller capable of communicating with these devices by being connected with them through a network. If the roulette game is already executed when a signal for requesting a transition to the roulette game is received from a slot machine, the center controller keeps a transition to the roulette game waiting, and controls that slot machine and the second game device to start the roulette game at a timing where a transition to the roulette game becomes possible.

18 Claims, 32 Drawing Sheets

U.S. PATENT DOCUMENTS

| | | | | |
|---|---|---|---|---|
| 2008/0064469 | A1 * | 3/2008 | Okada | 463/16 |
| 2008/0085756 | A1 * | 4/2008 | Okada | 463/20 |
| 2008/0090640 | A1 * | 4/2008 | Okada | 463/20 |

FOREIGN PATENT DOCUMENTS

| | | | |
|---|---|---|---|
| EP | 1467329 | A2 | 10/2004 |
| JP | 08117446 | A | 5/1996 |

* cited by examiner

FIG. 13

| COMBINATION | RANDOM NUMBER RANGE | PROBABILITY FOR BEING DETERMINED |
|---|---|---|
| BONUS | 0 ~ 999 | 1000 / 65536 |
| A | 1000 ~ 1999 | 1000 / 65536 |
| K | 2000 ~ 3499 | 1500 / 65536 |
| Q | 3500 ~ 4999 | 1500 / 65536 |
| J | 5000 ~ 5999 | 2000 / 65536 |
| 10 | 7000 ~ 9999 | 3000 / 65536 |
| OTHERS | 10000 ~ 65535 | 55536 / 65536 |

FIG. 14

| COMBINATION | PAYOUT NUMBER | | |
|---|---|---|---|
| | CREDIT AMOUNT 1 | CREDIT AMOUNT 2 | CREDIT AMOUNT 3 |
| BONUS | 100 COINS | 200 COINS | 300 COINS |
| A | 20 COINS | 40 COINS | 60 COINS |
| K | 10 COINS | 20 COINS | 30 COINS |
| Q | 5 COINS | 10 COINS | 15 COINS |
| J | 2 COINS | 4 COINS | 6 COINS |
| 10 | 1 COIN | 2 COINS | 3 COINS |

FIG. 15

SECOND GAME PAYOUT TABLE

| BETTING METHOD | RATE | SLOT MACHINE | | | SLOT MACHINE (JOINING)/ SECOND GAME TERMINAL |
|---|---|---|---|---|---|
| | | CREDIT AMOUNT 1 | CREDIT AMOUNT 2 | CREDIT AMOUNT 3 | |
| STRAIGHT BET | × 36 | ○ | | | |
| SPLIT BET | × 18 | ○ | | | |
| STREET BET | × 12 | ○ | | | |
| CORNET BET | × 9 | | ○ | | |
| FIVE BET | × 6 | | ○ | ○ | |
| LINE BET | | | | | |
| DOZEN BET | × 3 | | ○ | ○ | ○ |
| COLUMN BET | | | | | |
| RED / BLACK | × 2 | | | ○ | ○ |
| EVEN / ODD | | | | | |
| LOW / HIGH | | | | | |
| MULTIPLE BET | | OK | | | NG |

GAME SYSTEM INCLUDING SLOT MACHINES AND GAME CONTROL METHOD THEREOF

CROSS REFERENCE TO RELATED APPLICATIONS

This application claims priority to U.S. provisional patent application Ser. No. 60/839,675 filed on Aug. 24, 2006, and which is incorporated by reference herein for all purposes.

BACKGROUND OF THE INVENTION

1. Field of the Invention

The present invention relates to a game system including slot machines and a game control method.

2. Description of Related Art

As disclosed in U.S. Pat. No. 6,634,941 and U.S. Patent application publication No. 2004/110558, the conventional slot machine includes a slot machine which executes a free game or a bonus game which has a higher possibility for becoming advantageous to a player than the basic game, in addition to the basic game. The free game or the bonus game is one of the second games. In the second game, a probability for a specific combination associated with a prize becomes high as a special symbol is displayed, or a payout in the case of realizing the specific combination associated with a prize is set to be greater, in the disclosed slot machine, for example. In this way, in the second game, an attractive game different from the basic game is executed, so that the player can have a great expectation to the second game.

In the other disclosed slot machine, a prize value that can be obtained by the player in the second game is displayed to the player prior to the second game, so as to strongly arouse the player's interest.

In such conventional slot machines, some contributions can be made in terms of arousing the player's interest by using the second game, but this is done within the casing of the same slot machine.

SUMMARY OF THE INVENTION

The first aspect of the present invention is a game system, comprising: a plurality of slot machines, each slot machine having a controller operable to control at least a basic game and a second game, capable of making a transition to the second game from a middle of the basic game when a prescribed condition is realized in the basic game, and transmitting a second game request signal for requesting a transition to the second game when the prescribed condition is realized in the basic game; a second game device operable to execute the second game, which is provided as a physically separate device from the slot machines; a display adapted to display images according to a game status of the second game device, which is visible from a plurality of players playing the second game at the slot machines; and a center controller capable of communicating with the slot machines, the second game device and the display, the center controller operable to control one slot machine and the second game device to start the second game if the second game is not currently executed by the second game device when the second game request signal is received from the one slot machine, and control the one slot machine which transmitted the second game request signal and the second game device to start the second game at a timing where a transition to the second game becomes possible if the second game is currently executed by the second game device.

According to the game system of the first aspect of the present invention, when the second game request signal is transmitted from one slot machine among the plurality of slot machines, if the second game is already executed by the other slot machine, a right to make a transition to the second game possessed by that one slot machine is temporarily held in the center controller. On the other hand, that one slot machine continues the basic game while waiting for an opportunity to make a transition to the second game. Then, when the second game by the other slot machine is finished, the center controller controls the slot machine which has the right to make a transition to the second game and the second game device to start the second game.

The second aspect of the present invention is a game system, comprising: a plurality of slot machines, each slot machine having a controller operable to control at least a basic game and a second game, capable of making a transition to the second game from a middle of the basic game when a prescribed condition is realized in the basic game, and transmitting a second game request signal for requesting a transition to the second game when the prescribed condition is realized in the basic game; a second game device operable to execute the second game, which is provided as a physically separate device from the slot machines; a display adapted to display images according to a game status of the second game device, which is visible from a plurality of players playing the second game at the slot machines; and a center controller capable of communicating with the slot machines, the second game device and the display, the center controller operable to control one slot machine and the second game device to start the second game if the second game is not currently executed by the second game device when the second game request signal is received from the one slot machine, hold a right to make a transition to the second game by the one slot machine which transmitted the second game request signal in an order of receiving the second game request signal, and control a slot machine for which the right is held at a top and the second game device to start the second game at a timing where a transition to the second game becomes possible, if the second game is currently executed by the second game device when the second game request signal is received from the one slot machine.

According to the game system of the second aspect of the present invention, the right to make a transition to the second game possessed by that one slot machine is held in the center controller in an order of receiving. On the other hand, that one slot machine continues the basic game while waiting for an opportunity to make a transition to the second game. Then, when the second game by the other slot machine is finished, the center controller takes out the oldest held right among the right to make a transition to the second game held in the order of receiving, and controls the slot machine which has this right and the second game device to start the second game.

The third aspect of the present invention is a game system, comprising: a plurality of slot machines, each slot machine having a controller operable to control at least a basic game and a second game, capable of making a transition to the second game from a middle of the basic game when a prescribed condition is realized in the basic game, transmitting a second game request signal for requesting a transition to the second game when the prescribed condition is realized in the basic game, and displaying a message indicating that it is waiting for the second game on a screen visible to a player when a second game waiting signal is received from a center controller; a second game device operable to execute the second game, which is provided as a physically separate device from the slot machines;

a display adapted to display images according to a game status of the second game device, which is visible from a plurality of players playing the second game at the slot machines; and a center controller capable of communicating with the slot machines, the second game device and the display, the center controller operable to transmit a second game waiting signal indicating that it is waiting for the second game to the one slot machine which transmitted the second game request signal, and hold a right to make a transition to the second game by the one slot machine which transmitted the second game request signal in an order of receiving the second game request signal, and control a slot machine for which the right is held at a top and the second game device to start the second game at a timing where a transition to the second game becomes possible, if the second game is currently executed by the second game device when the second game request signal is received from the one slot machine.

According to the game system of the third aspect of the present invention, when the second game request signal is received from a slot machine, if the second game is currently executed by the second game device, the center controller transmits a second game waiting signal to the slot machine which transmitted the second game request signal. At the slot machine which received this second game waiting signal, a message indicating that it is waiting for the second game is displayed on a screen visible to a player, the basic game is continued while waiting for an opportunity to make a transition to the second game. Then, when the second game by the other slot machine is finished, the center controller takes out the oldest held right among the right to make a transition to the second game held in the order of receiving, and controls the slot machine which has this right and the second game device to start the second game.

The fourth aspect of the present invention is a control method of a game system, the game system comprising: a plurality of slot machines, each slot machine having a controller operable to control at least a basic game and a second game, capable of making a transition to the second game from a middle of the basic game when a prescribed condition is realized in the basic game, and transmitting a second game request signal for requesting a transition to the second game when the prescribed condition is realized in the basic game; a second game device operable to execute the second game, which is provided as a physically separate device from the slot machines; a display adapted to display images according to a game status of the second game device, which is visible from a plurality of players playing the second game at the slot machines; and a center controller capable of communicating with the slot machines, the second game device and the display; the control method comprising the steps of: receiving the second game request signal from one slot machine at the center controller; controlling the one slot machine and the second game device to start the second game if the second game is not currently executed by the second game device; and controlling the one slot machine which transmitted the second game request signal and the second game device to start the second game at a timing where a transition to the second game becomes possible if the second game is currently executed by the second game device.

According to the game system of the fourth aspect of the present invention, when the second game request signal is transmitted from one slot machine among the plurality of slot machines, if the second game is already executed by the other slot machine, a right to make a transition to the second game possessed by that one slot machine is temporarily held in the center controller. On the other hand, that one slot machine is controlled to continue the basic game while waiting for an opportunity to make a transition to the second game. Then, when the second game by the other slot machine is finished, the slot machine which has the right to make a transition to the second game and the second game device are controlled to start the second game at the center controller.

The fifth aspect of the present invention is a control method of a game system, the game system comprising: a plurality of slot machines, each slot machine having a controller operable to control at least a basic game and a second game, capable of making a transition to the second game from a middle of the basic game when a prescribed condition is realized in the basic game, and transmitting a second game request signal for requesting a transition to the second game when the prescribed condition is realized in the basic game; a second game device operable to execute the second game, which is provided as a physically separate device from the slot machines; a display adapted to display images according to a game status of the second game device, which is visible from a plurality of players playing the second game at the slot machines; and a center controller capable of communicating with the slot machines, the second game device and the display; the control method comprising the steps of: receiving the second game request signal from one slot machine at the center controller; controlling the one slot machine and the second game device to start the second game if the second game is not currently executed by the second game device when the second game request signal is received; holding a right to make a transition to the second game by the one slot machine which transmitted the second game request signal in an order of receiving the second game request signal, if the second game is currently executed by the second game device; and controlling a slot machine for which the right is held at a top and the second game device to start the second game at a timing where a transition to the second game becomes possible.

According to the game system of the fifth aspect of the present invention, the right to make a transition to the second game possessed by that one slot machine is held by the center controller in an order of receiving. On the other hand, that one slot machine continues the basic game while waiting for an opportunity to make a transition to the second game. Then, when the second game by the other slot machine is finished, the oldest held right among the right to make a transition to the second game held in the order of receiving is taken out by the center controller, and the slot machine which has this right and the second game device are controlled to start the second game.

The sixth aspect of the present invention is a control method of a game system, the game system comprising: a plurality of slot machines, each slot machine having a controller operable to control at least a basic game and a second game, capable of making a transition to the second game from a middle of the basic game when a prescribed condition is realized in the basic game, transmitting a second game request signal for requesting a transition to the second game when the prescribed condition is realized in the basic game, and displaying a message indicating that it is waiting for the second game on a screen visible to a player, when a second game waiting signal is received from a center controller after the second game request signal is transmitted; a second game device operable to execute the second game, which is provided as a physically separate device from the slot machines; a display adapted to display images according to a game status of the second game device, which is visible from a plurality of players playing the second game at the slot machines; and a center controller capable of communicating with the slot machines, the second game device and the display; the control method comprising the steps of: receiving the second game request signal from one slot machine at the center controller; transmitting a second game waiting signal indicating that it is waiting for the second game to the one slot machine which transmitted the second game request signal, if the second game is currently executed by the second game device when the second game request signal is received; holding a right to make a transition to the second game by the one slot machine which transmitted the second game request signal in an order of receiving the second game request signal; and controlling a slot machine for which the right is held at a top and the second game device to start the second game at a timing where a transition to the second game becomes possible.

According to the game system of the sixth aspect of the present invention, when the second game request signal is received from a slot machine, if the second game is currently executed by the second game device, a second game waiting signal is transmitted by the center controller to the slot machine which transmitted the second game request signal. At the slot machine which received this second game waiting signal, a message indicating that it is waiting for the second game is displayed on a screen visible to a player, the basic game is continued while waiting for an opportunity to make a transition to the second game. Then, when the second game by the other slot machine is finished, the oldest held right among the right to make a transition to the second game held in the order of receiving is taken out by the center controller, and controls the slot machine which has this right and the second game device are controlled to start the second game.

BRIEF DESCRIPTION OF THE DRAWINGS

FIG. 13 is a diagram showing a configuration of a basic game random number table.

FIG. 14 is a diagram showing a configuration of a basic game payout table.

FIG. 15 is a diagram showing a configuration of a second game payout table.

FIG. 19 is displayed in a basic game in a slot machine according to one embodiment of the present invention.

DETAILED DESCRIPTION OF THE EMBODIMENT

Figure 2:
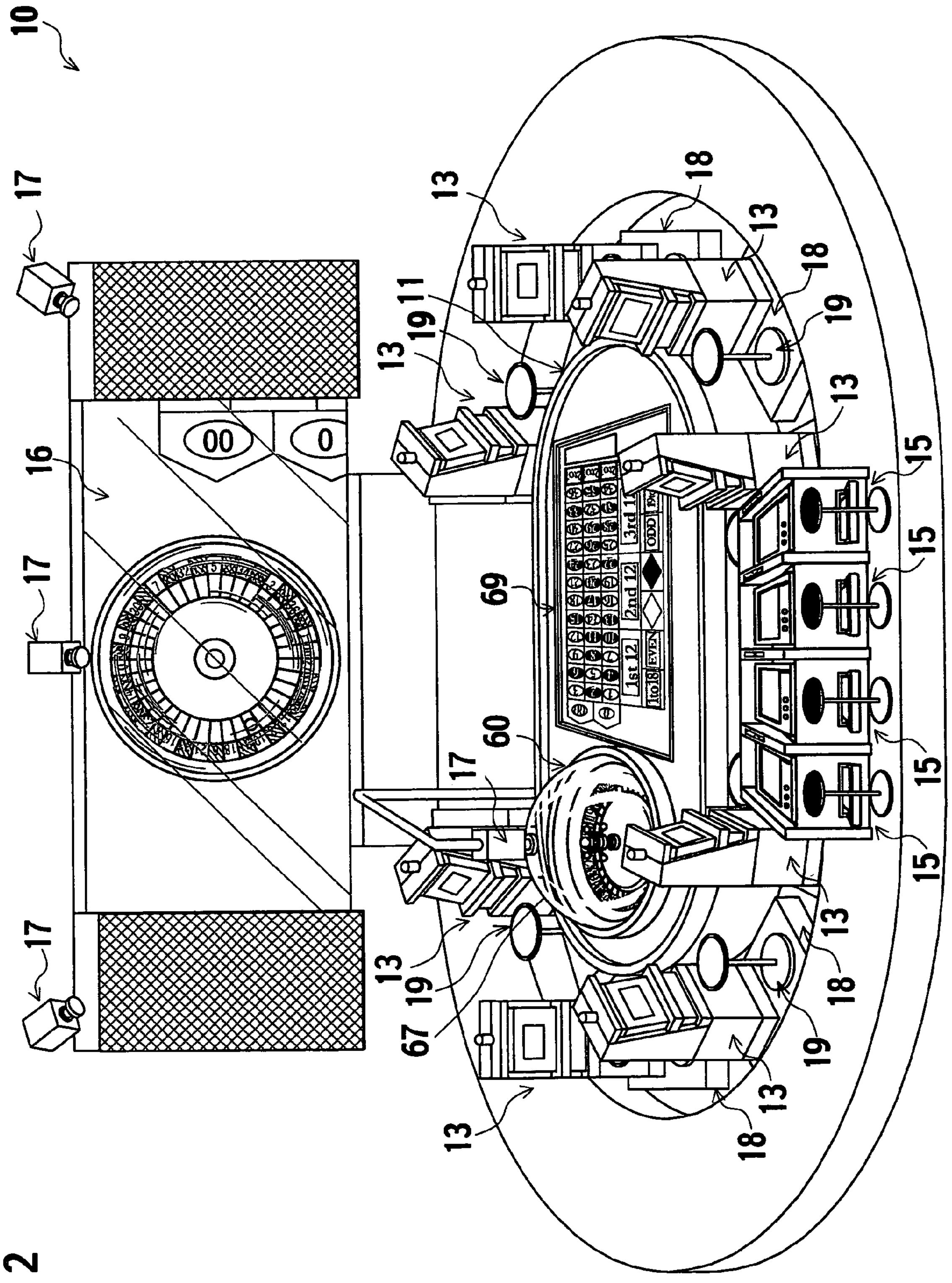
FIG. 2 is a diagram showing an outward appearance of a game system according to one embodiment of the present invention.

A schematic configuration of a game system 10 according to the present embodiment will be described according to FIG. 2. FIG. 2 is a diagram showing an outward appearance configuration of a game system 10 according to the present embodiment. As shown in FIG. 2, the game system 10 mainly comprises slot machines 13, a second game device 11, and second game terminals 15. The second game device 11 of the present embodiment is a game device for a roulette game. Besides a basic game to be described below with reference to FIG. 16, the slot machine 13 can make a betting operation for the roulette game as a second game to be described below with references to FIG. 17A to FIG. 17E, at a timing when a prescribed condition is realized.

The game system 10 is provided with a large scale monitor 16. On the monitor 16, a betting board 71 (see FIG. 9 to be described below) for indicating a betting state of a player, a BET time indicating a remaining time during which a betting can be made, and a content of a display 60 for displaying a winning number, etc., as a progress state of the second game (referred hereafter also as the roulette game), along with an image of the rotating roulette or an image of a player and the like taken by viewpoint movable cameras to be described below according to the need.

A plurality (eight in the present embodiment) of the slot machines 13 are provided in such directions that they are enclosing around second game device 11 and the players of the slot machines 13 can view the large scale monitor 16. A set of each slot machine 13 and a chair 19 for a player to sit are provided on a movable floor 18. It is configured such that, when the second game is started, the slot machine that made a transition to the second game will be raised integrally with the chair 19 as the movable floor 18 is raised.

In the game system 10, a plurality (four in the present embodiment) second game terminals 15 that can join in the roulette game are provided at positions from which the large scale monitor 16 can be viewed in front. The second game terminal 15 is a dedicated roulette game terminal, which is a terminal for enabling the other players to join that second game in the case where the second game is started by the slot machine 13.

In the game system 10, a plurality (four in the present embodiment) of viewpoint movable cameras 17 are provided. One of the viewpoint movable cameras 17 is for taking an image of a roulette device 60 shown in FIG. 9 to be described below, which takes images of a rotation of the roulette and a position of a ball 65 when the roulette is stopped, and displays them on the monitor 16. The viewpoint movable camera 17 for taking images of the roulette device 60 is arranged such that images can be taken from an upper side of the roulette device 60 toward a downward direction vertically. The viewpoint movable camera 17 for taking images of the roulette device 60 may be made to take other images such as those of the players or the display 69 for displaying a BET screen 70 containing the betting board 71 to be described below, before the roulette is rotated. The other viewpoint movable cameras 17 are provided on an upper face of the monitor 16 in order to capture facial expressions of the players. The images taken by the viewpoint movable cameras 17 are displayed on a liquid crystal display 30 (see FIG. 5) of the slot machine 13 and a display 93 (see FIG. 11) of the second game terminal 15, besides the large scale monitor 16. The game system 10 formed by these elements is provided within a gaming facility such as casino.

The slot machine 13 is changed from a terminal for playing the basic game to a terminal for playing the roulette game at a timing when a prescribed condition of having a specific symbol combination stopped on a payline is realized, as will be described below, such that the player can play the roulette game. Note that, in the case where the roulette game is to be started, the other slot machines which are playing the basic game at that point and for which the above described prescribed condition is not realized can also join the roulette game. Then, the betting can be made on the betting board 71 of the BET screen 70 to be described below, or the betting can be made on whether the bet made by the player who made a transition to the roulette game is going to win or lose.

By preparing a second game payout table which is different for each terminal as shown in FIG. 15 to be described below, it is possible to set a prize in a case where the bet by the slot machine 13 for which a prescribed condition is realized becomes win to be different from a prize in a case where the bet by the slot machine 13 for which a prescribed condition is not realized becomes win.

Figure 1:
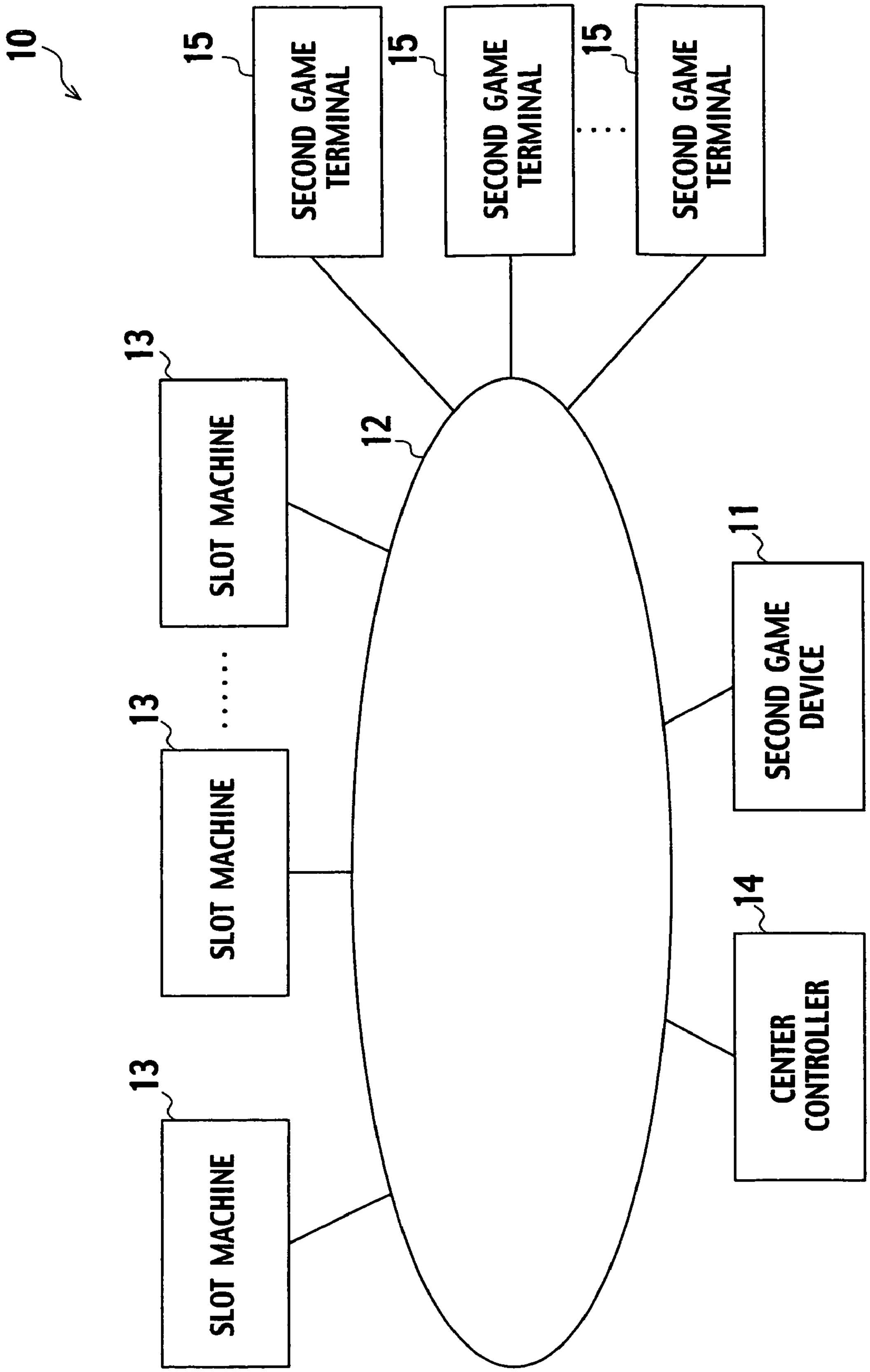
FIG. 1 is a block diagram showing a system configuration of a game system according to one embodiment of the present invention.

FIG. 1 is a block diagram showing a configuration of the game system 10 according to the present invention. In the game system 10 shown in FIG. 1, the slot machines 13, the second game device 11, a center controller 14 and the second game terminals 15 are connected to a network 12. The center controller 14 can control the slot machines 13, the second game device 11 and the second game terminals 15 through the network 12.

Each slot machine 13 is a slot machine by which the player can play the basic game. The slot machine 13 itself carries out a control for making a transition from the basic game to the second game at a timing when a prescribed condition is realized. The second game is a game to be executed by the second game device 11, under the control of the center controller 14. In the case where the second game is started, the slot machine used by the player is made to function as a terminal for the second game, so that the player can make the betting operation for the roulette game. With such a configuration, the player can enjoy the second game using the second game device 11 which is physically separate from the slot machine 13.

Even for the slot machine 13 for which a prescribed condition is not realized, the center controller 14 carries out a control for enabling a selection to determine whether or not to join in the second game, when a prescribed condition is realized at another slot machine 13 and the second game by the second game 11 is started. With such a configuration, even the player of the slot machine 13 for which a prescribed condition is not realized can enjoy the second game using the second game device 11.

The second game terminals 15 are connected to the center controller 14 through the network 12. When the roulette game is started by the second game device 11, it is configured such that the second game can be played by using the second game terminal 15, apart from the slot machine 13. For this reason, it becomes possible for a third person present in the gaming facility to become a player of that roulette game by using the second game terminal 15, in response to the start of the roulette game. In this way, by giving the opportunity to join in the roulette game even to the other players who are not playing the basic game, it is possible to increase the interest with respect to the roulette game.

Figure 3:
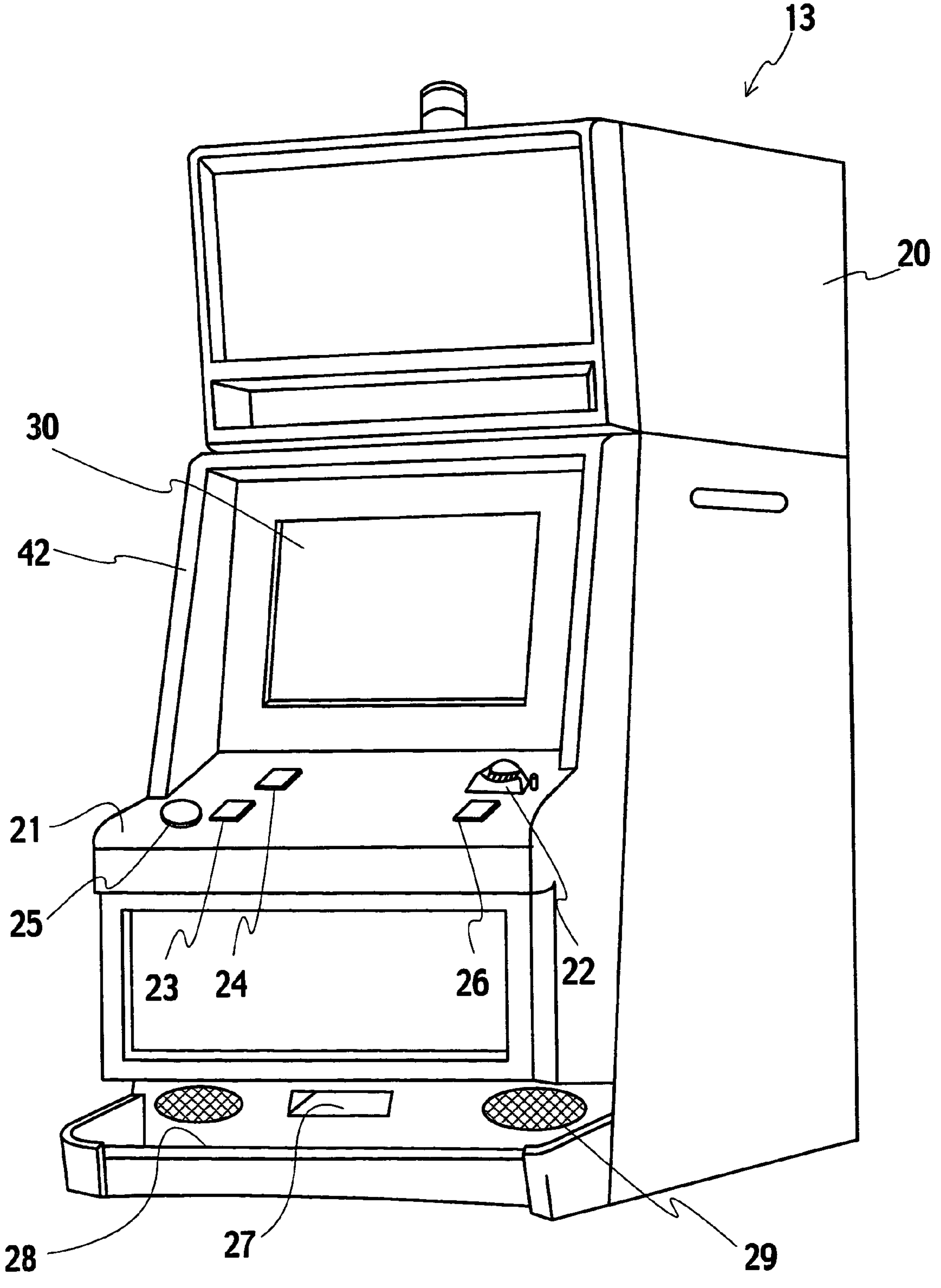
FIG. 3 is a diagram showing a slot machine according to one embodiment of the present invention.

FIG. 3 is a diagram showing the slot machine 13 according to one embodiment of the present invention. The slot machine 13 has a cabinet 20 and a main door 42. The cabinet 20 has a side facing the player open. Inside the cabinet 20, various constituent elements including a controller 100 (see FIG. 7) for electrically controlling the slot machine 13 and a hopper 44 (see FIG. 7) for controlling input, deposit and payout of coins (game medium). The game medium is not limited to coins, and can be medals, tokens, electronic money, or electronic value information (credit) corresponding to these, for example The main door 42 is an element for covering such that the inside of the cabinet 20 is not exposed to outside. At approximately center of the main door 42, a liquid crystal display 30 is provided.

The liquid crystal display 30 is for displaying various images related to the game including effect images and the like. The player proceeds with the game while visually checking various images displayed on the liquid crystal display 30. In particular, in the roulette game, the BET screen 70 shown in FIG. 22 to be described below will be displayed on the liquid crystal display 30. The liquid crystal display 30 has a transparent liquid crystal panel 34 (see FIG. 5 and FIG. 6). The transparent liquid crystal panel 34 has its part or whole that can be switched between transparent/non-transparent states, and is capable of displaying various images. The detailed configuration of the liquid crystal display 30 will be described below.

On the back side of the liquid crystal display 30, five mechanical reels 3A, 3B, 3C, 3D ad 3E (see FIG. 4 and FIG. 5) with a plurality of symbols depicted on their outer circumferential faces are provided to be rotatable and arranged along a horizontal line. The mechanical reels 3A to 3E are configured to display a plurality of symbols, in cooperation with stepping motors 45A, 45B, 45C, 45D and 45E (see FIG. 7) to be described below. On the outer circumferential faces of the mechanical reels 3A, 3B, 3C, 3D and 3E, a plurality of symbols needed for the basic game such as symbols “BONUS”, “WILD”, “TREASURE BOX”, “GOLDEN MASK”, “HOLY CUP”, “COMPASS&MAP”, “SNAKE”, “A”, “K”, “Q”, “J” and “10” are depicted. These various symbols on the mechanical reels 3A to 3E will become visible when the transparent liquid crystal panel 34 is in the transparent state.

On the lower side of the liquid crystal display 30, a roughly horizontal operation unit 21 is provided. On the right side of the operation unit 21, a coin slot 22 for entering coins into the slot machine 13 is provided. On the left side of the operation unit 21, a BET switch 23 and a spin/repeat/bet switch 24 are provided. The BET switch 23 is for determining which ones of nine lines L1, L2, L3, L4, L5, L6, L7, L8 and L9 for awarding prizes to be described below should be set active, and selecting the number of coins as the game medium to be bet on a line for awarding a prize that is set active (hereafter simply referred to as a “payline”). The spin/repeat/bet switch 24 is for playing the game again without changing the number of coins bet on the payline in an immediately previous game. By operating the BET switch 23 or the spin/repeat/bet switch 24 by pressing it, the number of coins to be bet on the payline is determined according to that operation.

In the operation unit 21, on the left side of the BET switch 23, a start switch 25 for accepting the basic game start operation of the player in each game is provided. The pressing operation on either the start switch 25 or the spin/repeat/bet switch 24 will become a trigger for the start of the game, and the rotation of the five mechanical reels 3A to 3E described above will be started.

In the operation unit 21, in a vicinity of the coin slot 22, a cashout switch 26 is provided. When the player presses the cashout switch 26, the entered coins are paid out from a coin payout opening 27 provided at the lower front portion of the main door 42, and these paid coins are accumulated in a coin tray 28. On the upper side of the coin tray 28 and on left and right sides of the coin payout opening 27, sound outlets 29 for propagating effect sounds generated from a speaker 41 (see FIG. 7) contained inside the cabinet 20 to outside the cabinet 20 are provided.

Figure 4:
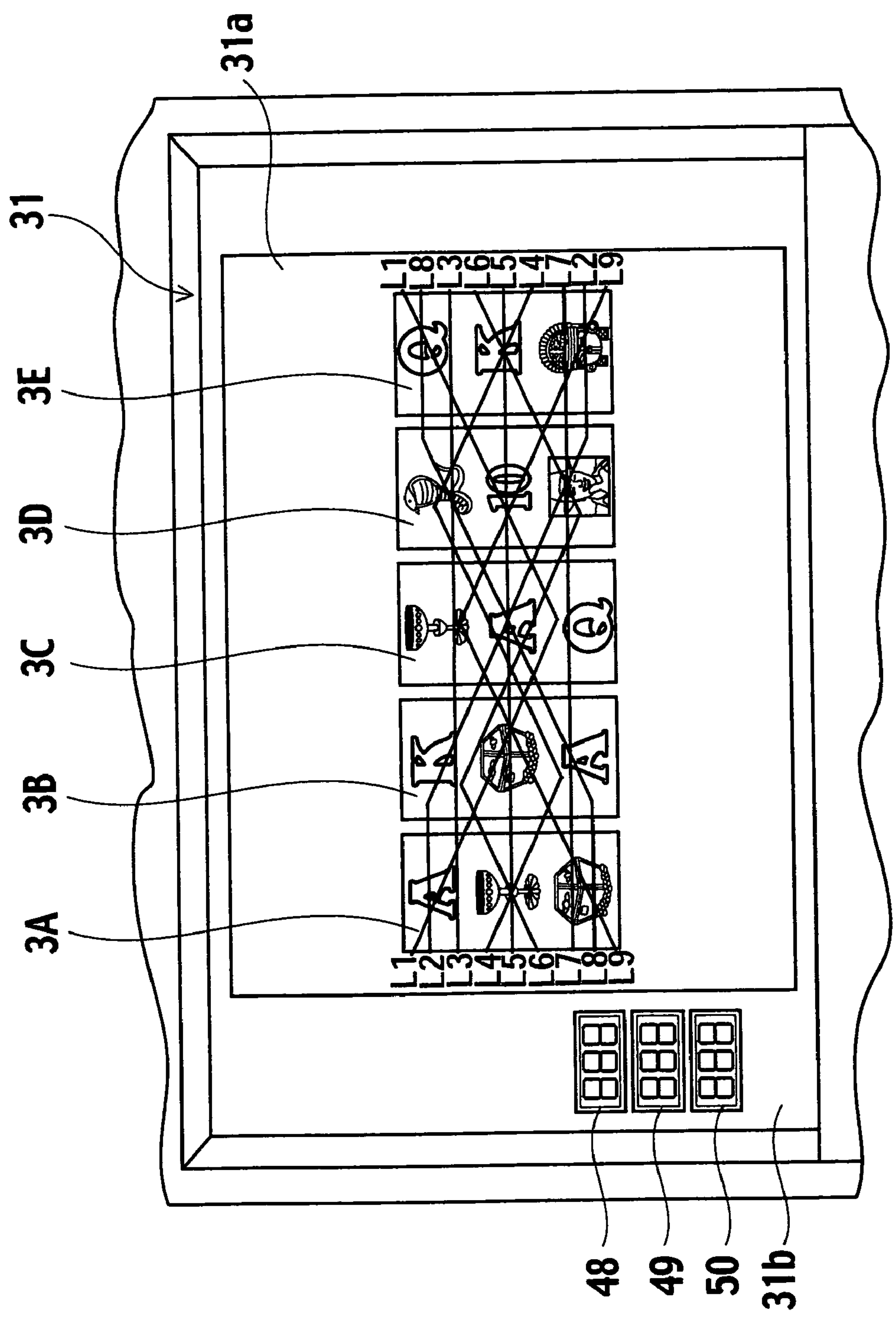
FIG. 4 is a diagram showing a front view of a display region of a slot machine according to one embodiment of the present invention.

FIG. 4 shows a display region of the slot machine 13 in enlargement. The liquid crystal display 30 of the slot machine 13 has a front panel 31, and a transparent liquid crystal panel 34 (see FIG. 5 and FIG. 6) provided on a back side of the front panel 31. The front panel 31 is formed by a transparent display screen 31*a* and a design pattern formation region 31*b* on which design patterns are formed. The image information displayed on the transparent liquid crystal panel 343 provided on the back side of the front panel 31 will be visible through the display screen 31*a* of the front panel 31. When the region of the transparent liquid crystal panel 34 is in the transparent state, the symbols on the five mechanical reels 3A to 3E provided on the back side of the transparent liquid crystal panel 34 will be visible through the display screen 31*a* of the front panel 31.

On the left back side of the liquid crystal display 30, various display units including a payout amount display unit 48, a credit amount display unit 49, a BET number display unit 50 are provided. The design pattern formation region 31*b* of the front panel 31 has a transparent portion covering a front side of the various display units 48 to 50, so that the display contents of the various display units 48 to 50 will be visible.

The slot machine 13 has nine paylines L1 to L9 for awarding prizes, as shown in FIG. 4. Each one of these paylines L1 to L9 for awarding prizes is extended such that one symbol on each one of the mechanical reels 3A to 3E will pass through it when the rotation of all the mechanical reels 3A to 3E is stopped.

When the BET switch 23 is pressed once, the payline L3 for awarding the third prize, the payline L5 for awarding the fifth prize, and the payline L7 for awarding the seventh prize are set active, for example, and one coin is taken in as a credit medal.

When the BET switch 23 is pressed twice, in addition to the three paylines described above, the payline L1 for awarding the first prize, the payline L4 for awarding the fourth prize, and the payline L8 for awarding the eighth prize are set active, for example, and two coins are taken in as the credit medals.

When the BET switch 23 is pressed three times, in addition to the six paylines described above, the payline L2 for awarding the second prize, the payline L6 for awarding the sixth prize, and the payline L9 for awarding the ninth prize are set active, for example, and three coins are taken in as the credit medals.

The game that can be executed in the present embodiment is the basic game for aligning symbols along the payline. A transition to the second game using the coins entered in the basic game will be made at a timing when a prescribed condition is realized in the basic game.

The payout amount display unit 48 is for displaying the payout amount of coins when a combination for awarding a prize is realized along the payline. The credit amount display unit 49 is for displaying the credit amount of coins that are stored in the slot machine 13. The BET number display unit 50 is for displaying the BET number, i.e., the number of coins bet on the payline. The various display units 48 to 50 are formed by including 7 segment display device. Alternatively, the various display units 48 to 50 may be made to display images on the transparent liquid crystal panel 34. In the present embodiment, the exemplary case of the slot machine

13 using the mechanical reels 3A to 3E which are visible through the transparent liquid crystal panel 34 is described, but without being limited to the transparent liquid crystal panel 34, it is also possible to use virtual reels to be displayed on the liquid crystal display 30.

Figure 5:
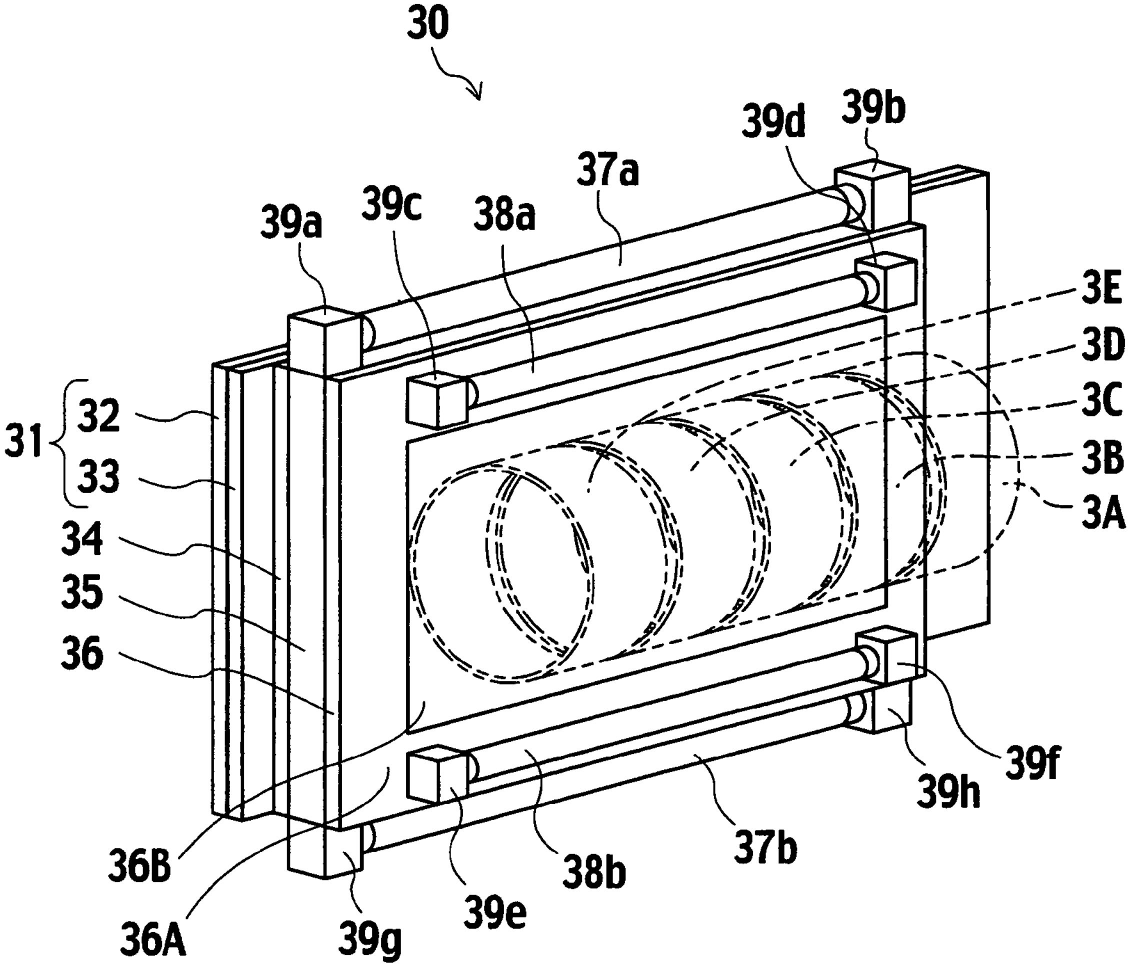
FIG. 5 is a diagram showing a back side view of a schematic configuration of a liquid crystal display in a slow machine according to one embodiment of the present invention.
Figure 6:
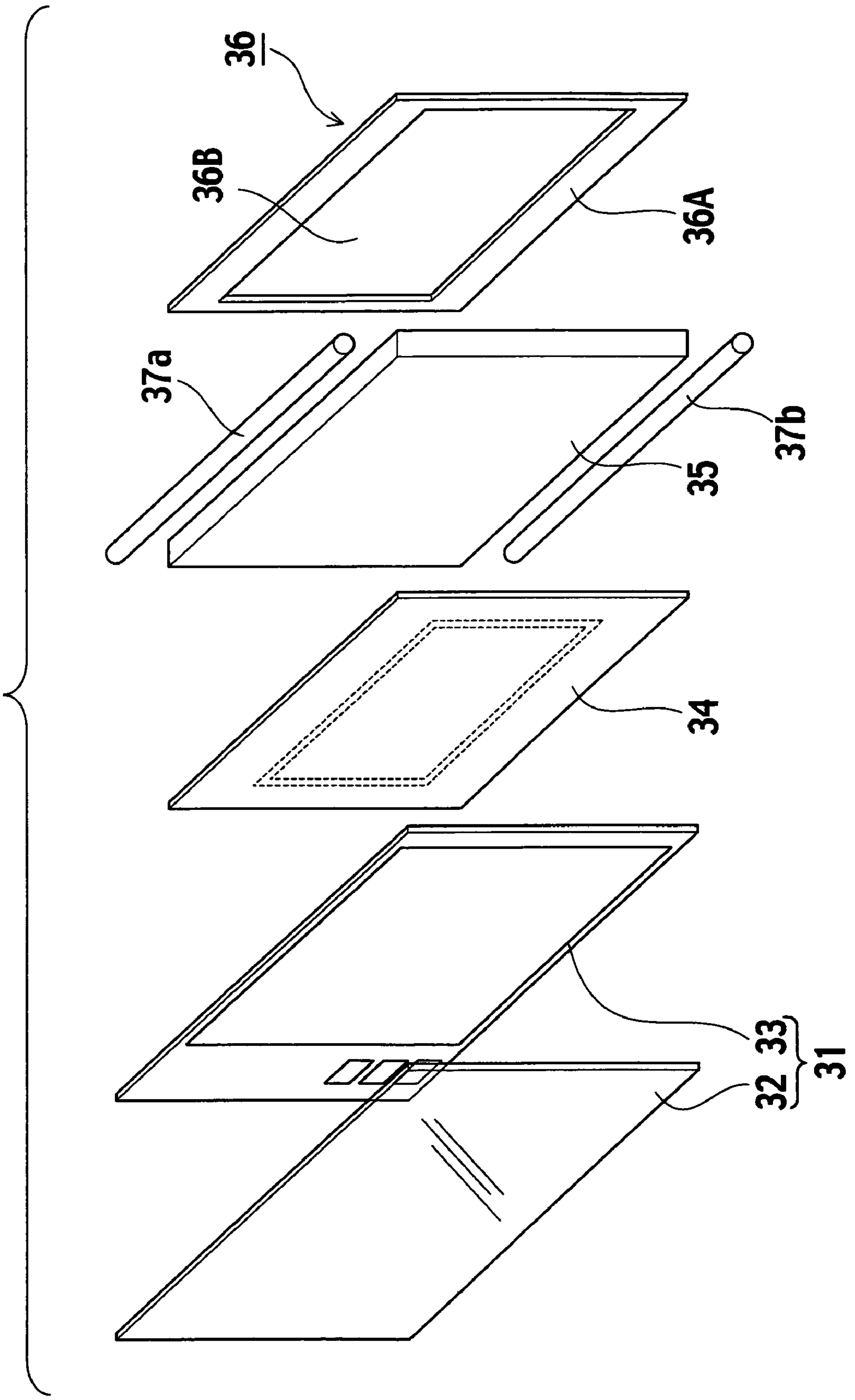
FIG. 6 is a diagram showing an expanded view of a part of a liquid crystal display shown in FIG. 5.

FIG. 5 and FIG. 6 are diagrams showing a configuration of the liquid crystal display 30 of the slot machine 13. The liquid crystal display 30 displays game images regarding the basic game and the second game. For this purpose, the liquid crystal display 30 has the front panel 31 having a touch panel 32 and a display plate 33, the transparent liquid crystal panel 34, a light guiding plate 35, a reflection film 36. fluorescent lamps 37*a*, 37*b*, 38*a* and 38*b* which are the so called white light sources, lamp holders 39*a*, 39*b*, 39*c*, 39*d*, 39*e*, 39*f*, 39*g* and 39*h*, and a table carrier package (TCP) on which the transparent liquid crystal panel driving IC is mounted. Although not particularly shown in FIG. 5 and FIG. 6, the TCP is formed by a flexible substrate (not shown) or the like which is connected to a terminal portion of the transparent liquid crystal panel 34.

The liquid crystal display 30 is provided on a front side of the display region of the mechanical reels 3A to 3E (a front side of the display screen 31*a*). The mechanical reels 3A to 3E and the liquid crystal display 30 are provided with a prescribed interval therebetween.

The touch panel 32 is formed by transparent elements. The display plate 33 is formed by transparent elements, and design patterns are formed at corresponding positions on the display plate 33 in a region between it and the various display units 48 to 50. Namely, a region on which the design patterns of the display plate 33 are formed is the design pattern formation region 31*b* in the front panel 31, and a region on which the design patterns of the display plate 33 are not formed is the display screen 31*a* in the front panel 31 (see FIG. 4). Alternatively, it is possible to make the entire front panel 31 as the display screen 31*a* without forming the design pattern formation region 31*b* in the front panel 31. In this case, either the design patterns are not formed on the display plate 33 or the display plate 33 is omitted.

Note that, in FIG. 5 and FIG. 6, electric circuits and the like for operating the various display units 48 to 50 that are arranged on the back side of the display plate 33 are not shown.

The transparent liquid crystal panel 34 is formed by inserting liquid crystal into a gap portion between a transparent substrate such as a glass plate or the like on which a thin film transistor layer is formed, and another transparent substrate facing against that transparent substrate. The display mode of the transparent liquid crystal panel 34 is set to be normally white. The normal white indicates that it becomes a white display (in which lights transmitting to the display screen side are visible from the outside) in a state where the liquid crystal is not activated. By adopting the transparent liquid crystal panel 34 that is set to be normally white in this way, even in the case where the situation where the liquid crystal cannot be activated occurs, the scrolling display and the stopping display of the symbols on the mechanical reels 3A to 3E can be made visible. For this reason, the player can continue the game. Namely, even in the case where the situation such as that described above occurs, it is still possible to play the game centered around the rearrangement of the symbols on the mechanical reels 3A to 3E.

The light guiding plate 35 is for guiding the lights from the fluorescent lamps 37*a* and 37*b* to the transparent liquid crystal panel 34 (in other words, for illuminating the transparent liquid crystal panel 34). The light guiding plate 35 is provided on the back side of the transparent liquid crystal panel 34, and formed by a transparent element (having a light guiding function) of acrylic resin or the like having a thickness of about 2 cm, for example.

The reflection film 36 is for reflecting the lights guided by the light guiding plate 35 toward the front side of the light guiding plate 35. The reflection film 36 is a white polyester film or aluminum thin film with a silver vaporization film formed thereon. The reflection film 36 is formed by a reflective region 36A and a non-reflective region (transmitting region) 36B The non-reflective region 36B is formed by a transparent material, and provided in a region containing a portion for covering a front side of the mechanical reels 3A to 3E in the front panel 31.

The fluorescent lamps 37*a* and 37*b* are arranged along an upper end portion and a lower end portion of the light guiding plate 35, and their both ends are supported by the lamp holders 39*a* and 39*b*, 39*g* and 39*h*, respectively. The lights emitted from the fluorescent lamps 37*a* and 37*b* are reflected by the reflective region 36A of the reflection film 36 and will illuminate the transparent liquid crystal panel 34. The fluorescent lamps 38*a* and 38*b* are arranged toward the mechanical reels 3A to 3E at an upper position and a lower position on the back side of the reflection film 36, and their both ends are supported by the lamp holders 39*c* and 39*d*, 39*e* and 39*f*, respectively. The lights emitted from the fluorescent lamps 38*a* and 38*b*, reflected at the surfaces of the mechanical reels 3A to 3E and entered into the non-reflective region 36B will illuminate the transparent liquid crystal panel 34. In this way, in the liquid crystal display 30, the light emitted from the fluorescent lamps 37*a* and 37*b* and reflected by the reflective region 36A of the reflection film 36 and the lights emitted from the fluorescent lamps 38*a* and 38*b*, reflected at the surfaces of the mechanical reels 3A to 3E and entered into the non-reflective region 36B will illuminate the transparent liquid crystal panel 34. Consequently, a region of the liquid crystal display 30 corresponding to the non-reflective region 36B of the reflection film 36 becomes a region which can be switched between transparent/non-transparent states according to whether the liquid crystal is activated or not. On the other hand, a region of the liquid crystal display 30 corresponding to the reflective region 36A of the reflection film 36 is in a non-transparent state regardless of whether the liquid crystal is activated or not.

In the slot machine 13, only one region of the display screen 31*a* of the liquid crystal display 30 is set as a region that can be switched between the transparent/non-transparent states, but it is also possible to set the entire region of the display screen of the liquid crystal display 30 as a region that can be switched between the transparent/non-transparent states. In the case of setting the entire region of the liquid crystal display 30 as a region that can be switched between the transmissive/non-transmissive states in this way, the reflection film 36 is entirely formed by the non-reflective region 36B or the reflection film 36 is omitted.

Figure 7:
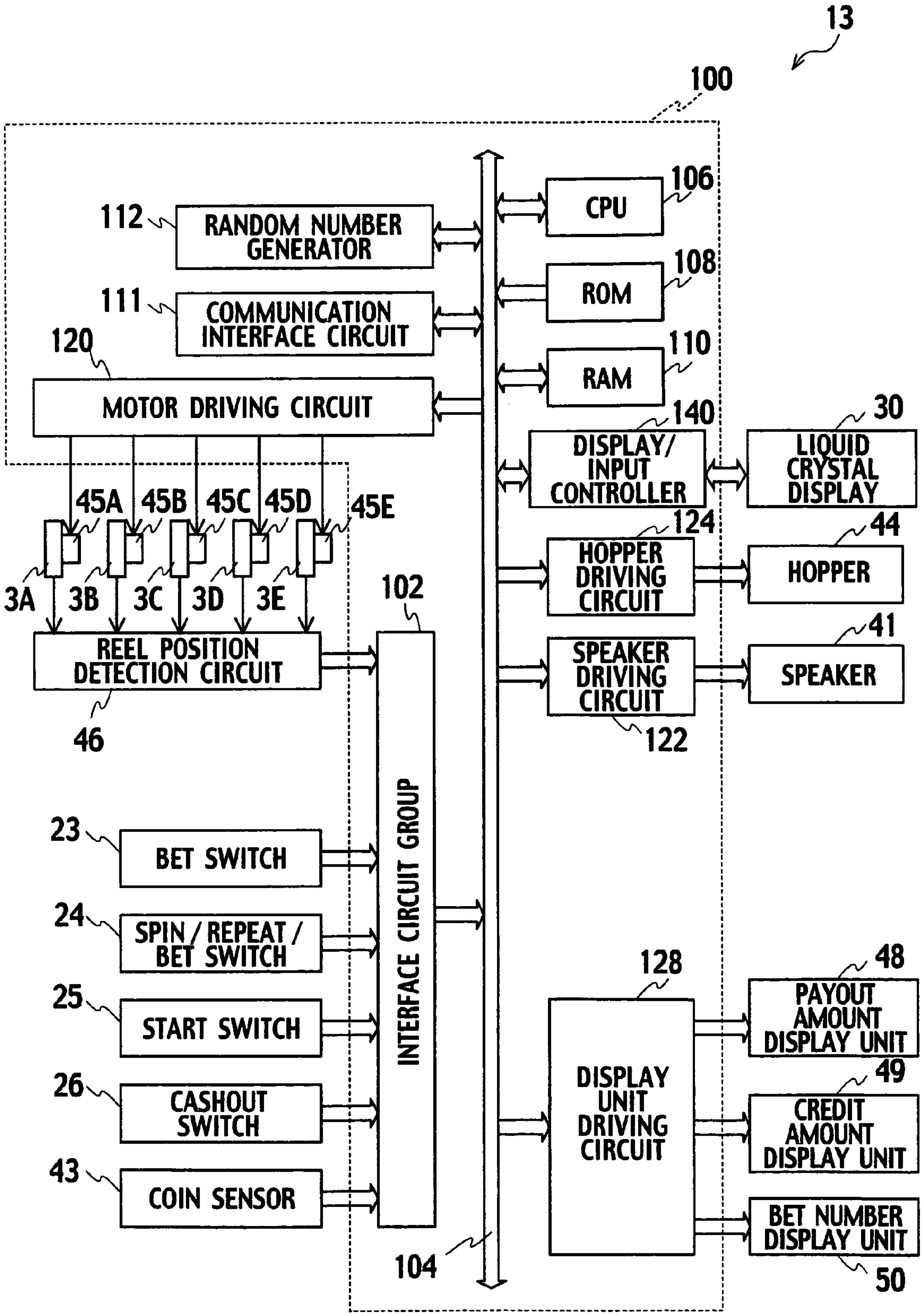
FIG. 7 is a block diagram showing an electric configuration of a controller of a slow machine according to one embodiment of the present invention.

FIG. 7 is a block diagram showing an electric configuration of the controller 100 in the slot machine 13. As shown in FIG. 7, the controller 100 of the slot machine 13 is a micro-computer, which has an interface circuit group 102, an input/output bus 104, a CPU 106, a ROM 108, a RAM 110, a communication interface circuit 111, a random number generator 112, a motor driving circuit 120, a speaker driving circuit 122, a hopper driving circuit 124, a display unit driving circuit 128, and a display/input controller 140.

The interface circuit group 102 is connected to the input/output bus 104. The interface circuit group 102 carries out the input/output of data signals or address signals with respect to the CPU 106 through the input/output bus 104.

To the interface circuit group 102, the start switch 25 is connected. The start signal outputted from the start switch 25 is converted into a prescribed signal at the interface circuit group 102, and then supplied to the input/output bus 104.

To the interface circuit group 102, the BET switch 23, the spin/repeat/bet switch 24, and the cashout switch 26 are connected. Each switching signal outputted from any of these switches 23, 24 and 26 is converted into a prescribed signal at the interface circuit group 102, and then supplied to the input/output bus 104.

To the interface circuit group 102, a coin sensor 43 is connected. The coin sensor 43 is a sensor for detecting the coin entered into the coin slot 22, which is provided in relation to the coin slot 22. The sensing signal outputted from the coin sensor 43 is converted into a prescribed signal at the interface circuit group 102, and then supplied to the input/output bus 104.

To the interface circuit group 102, a reel position detection circuit 46 is connected. The reel position detection circuit 46 is a circuit for detecting a rotation position of each one of the mechanical reels 3A to 3E according to pulse signals from a reel rotation position sensors (not shown). The detection signal from this reel position detection circuit 46 is converted into a prescribed signal at the interface circuit group 102, and then supplied to the input/output bus 104.

To the input/output bus 104, the ROM 108 and the RAM 110 are connected.

The CPU 106 reads out the basic game program and executes the basic game, at a timing when the basic game start operation by the start switch 25 is accepted. The basic game program is programmed such that the scrolling of symbols of the reels 3A to 3E is started by rotating all the mechanical reels 3A to 3E by activating the stepping motors 45A to 45E, and after that, symbols of the reels 3A to 3E are rearranged by stopping the rotation of all the mechanical reels 3A to 3E by stop activating the stepping motors 45A to 45E, and when a combination of symbols stopped at that point is shown on the payline and it is a specific combination awarding a prize, coins according to the specific combination awarding a prize will be paid.

The controller 100 containing the CPU 106 also carries out a control of the second game. For this reason, the controller 100 including the CPU 106 controls such that a signal for requesting a transition to the second game (hereafter referred to as a second game request signal) is transmitted, at a timing when a prescribed condition is realized as symbols of all the mechanical reels 3A to 3E are stopped and displayed. Then, after transmitting the second game request signal, when a second game waiting signal is received from the center controller 14, the fact that it is waiting for a transition to the second game is displayed on the liquid crystal display 30 which is displaying a screen of the basic game. The basic game is continued according to the command received from the center controller 14.

The controller 100 containing the CPU 106 controls such that a signal for withholding a transition to the second game (hereafter referred to as a second game withholding signal) is transmitted according to the command of the player, at a timing when a prescribed condition is realized as described above. Then, after transmitting the second game withholding signal, the fact that a transition to the second game is withheld is displayed on the liquid crystal display 30 which is displaying the screen of the basic game. Thereafter, the basic game is continued. In addition, when a second game permission signal to be described below is received from the center controller 14, the fact that a transition to the second game is possible is displayed on the liquid crystal display 30 which is displaying the screen of the basic game.

Figure 16:
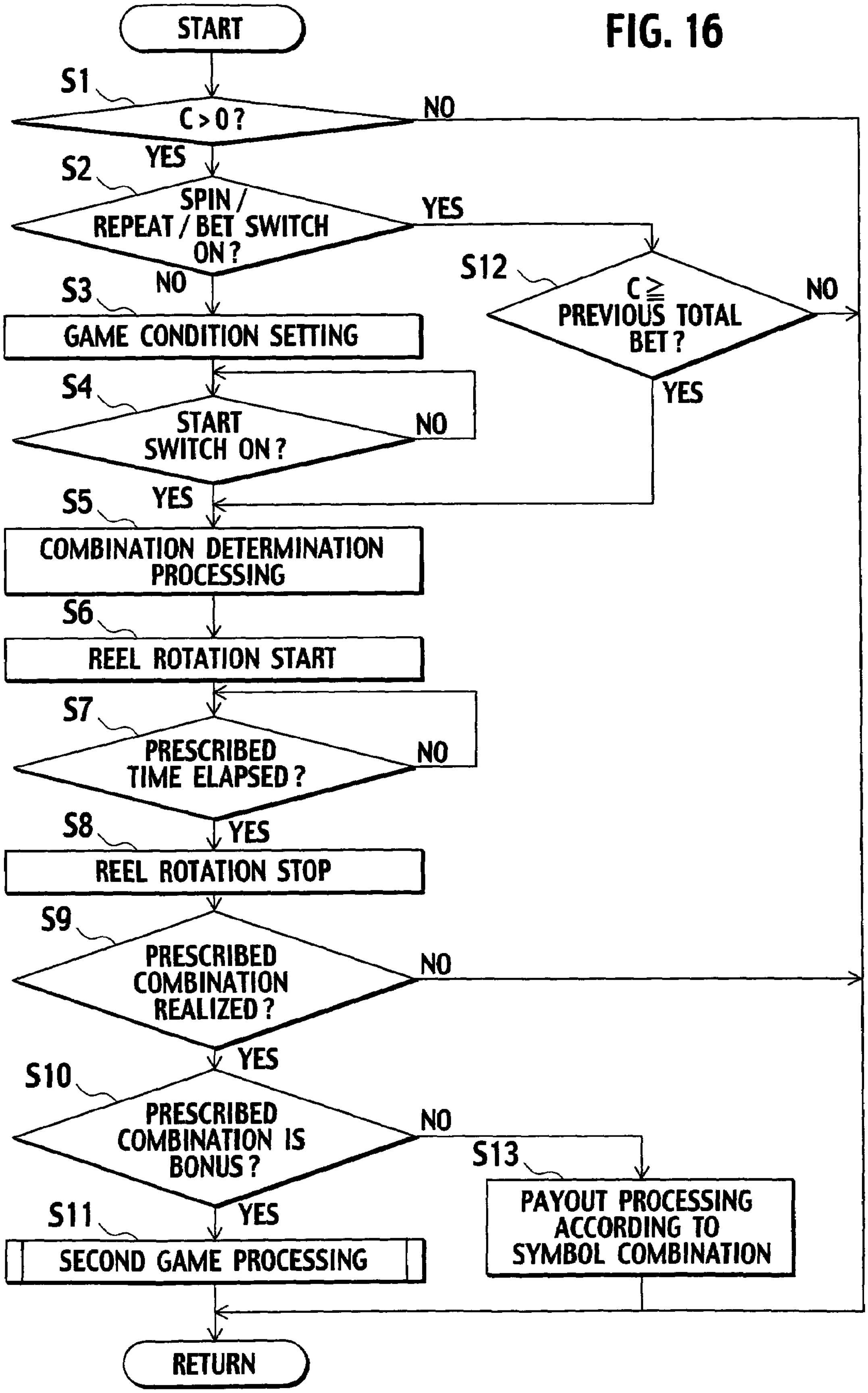
FIG. 16 is a flow chart showing a flow of processing operation in a basic game in a slot machine according to one embodiment of the present invention.
Figure 17A:
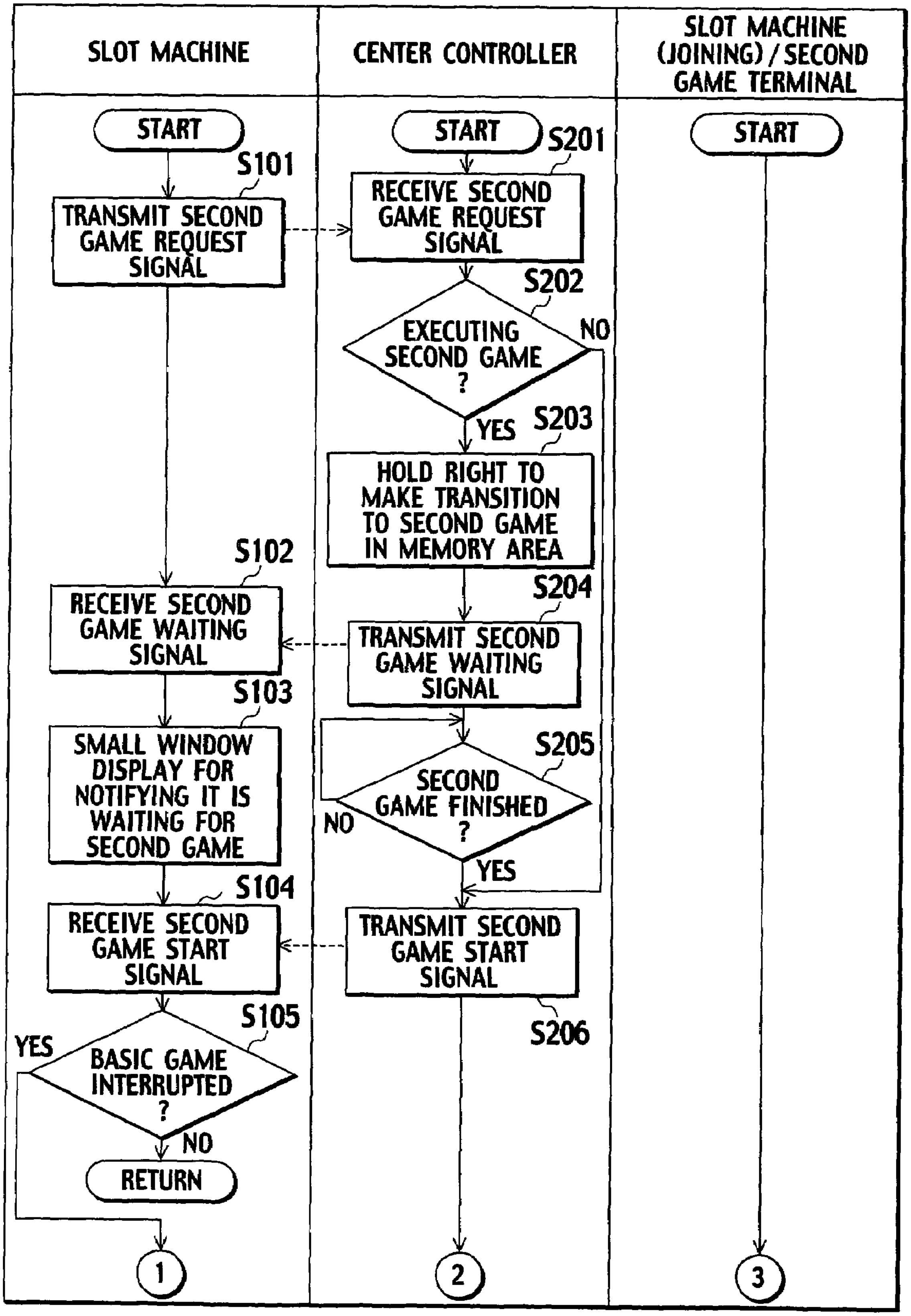
FIG. 17A to FIG. 17E are a flow chart showing a flow of processing operation in a second game in a game system according to one embodiment of the present invention.
Figure 17B:
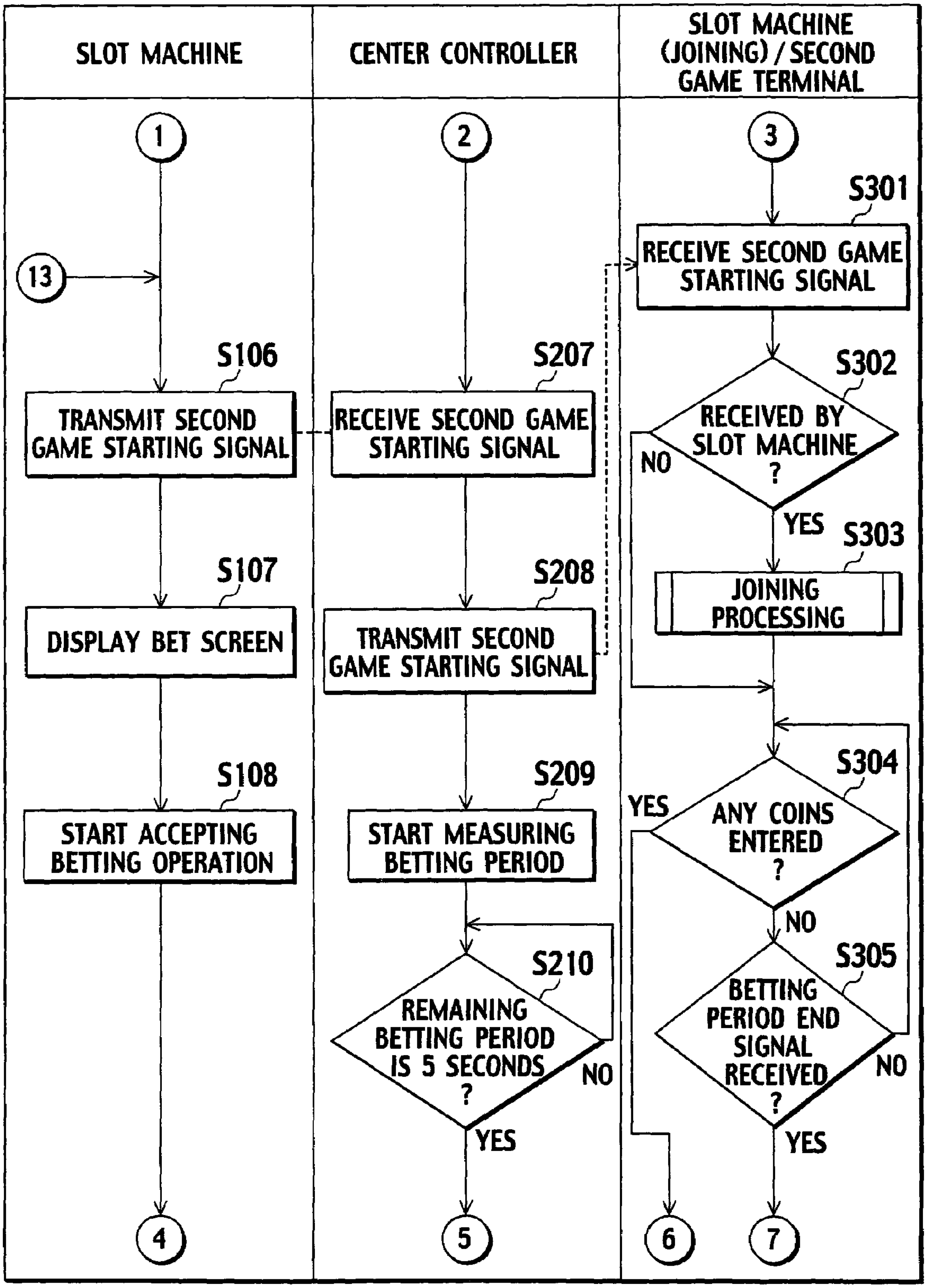
Figure 17C:
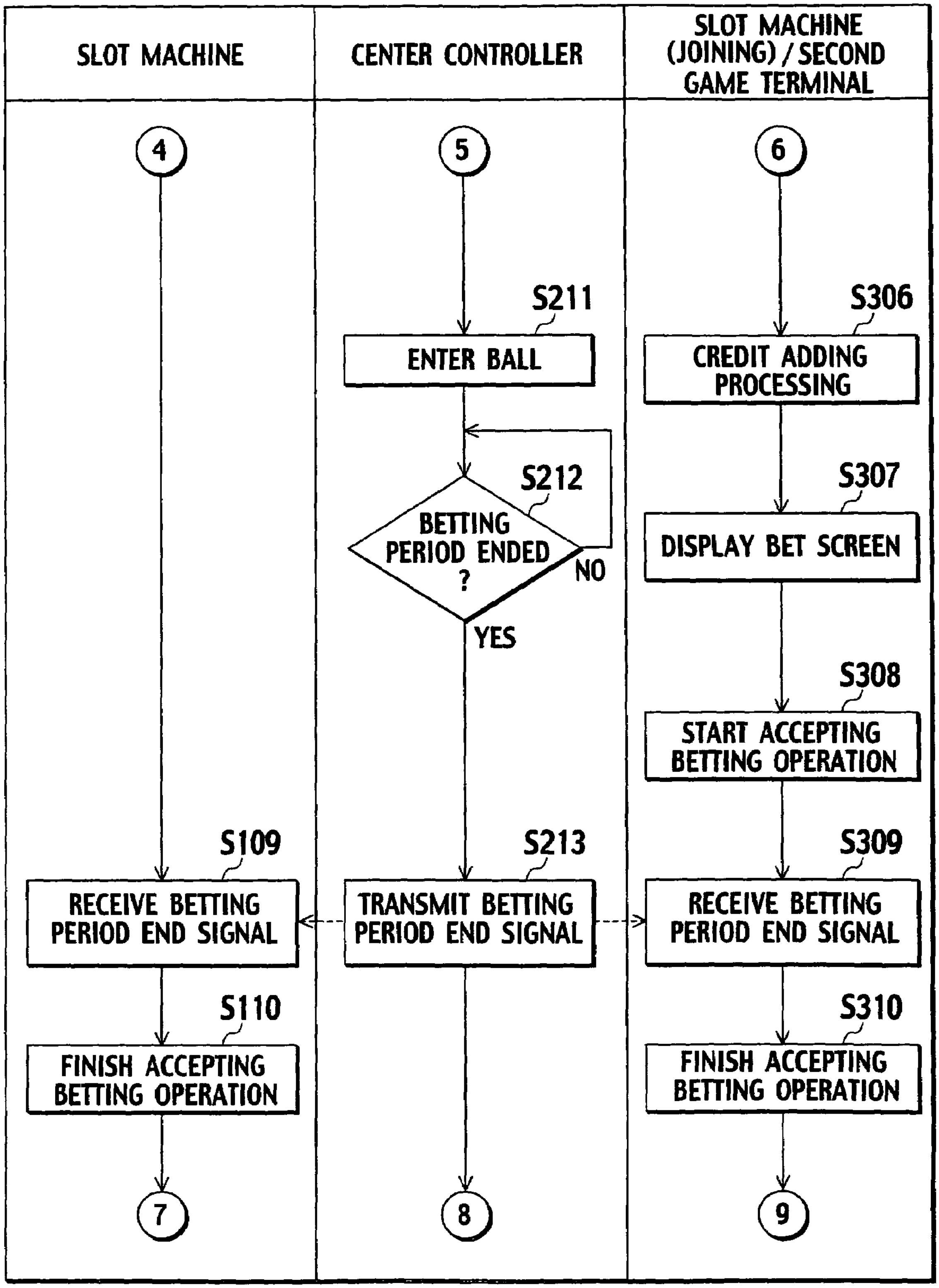
Figure 17D:
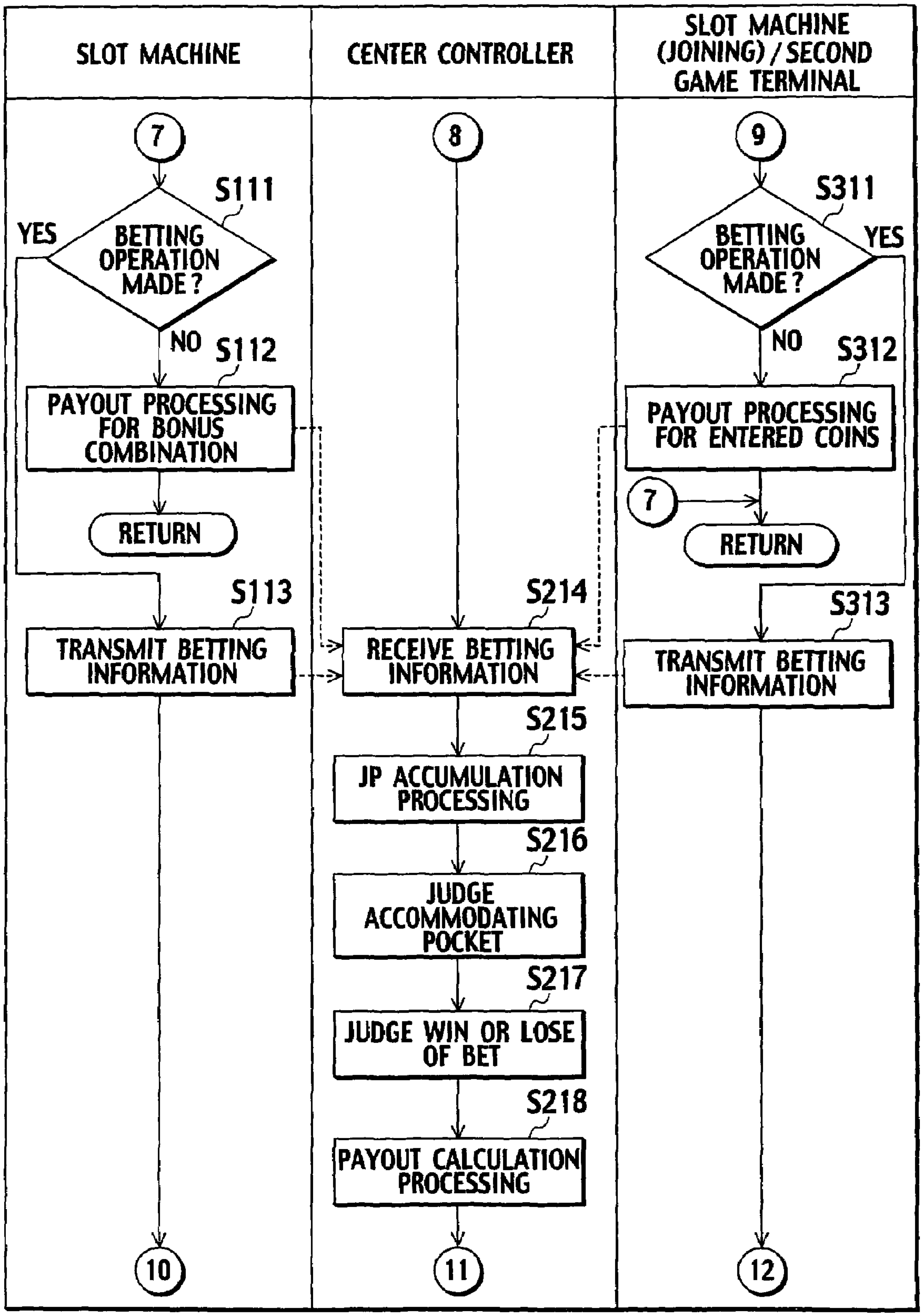
Figure 17E:
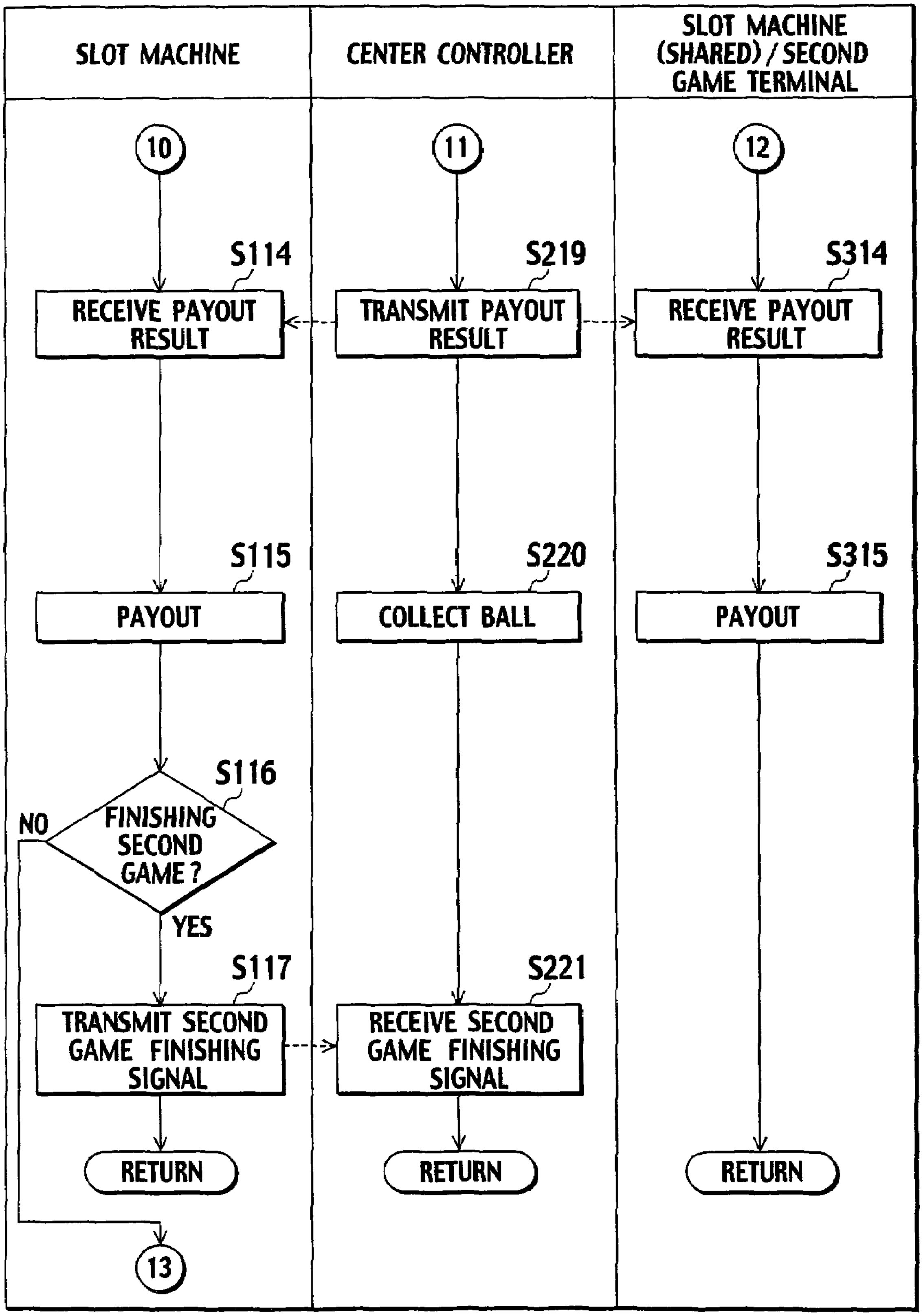
Figure 18:
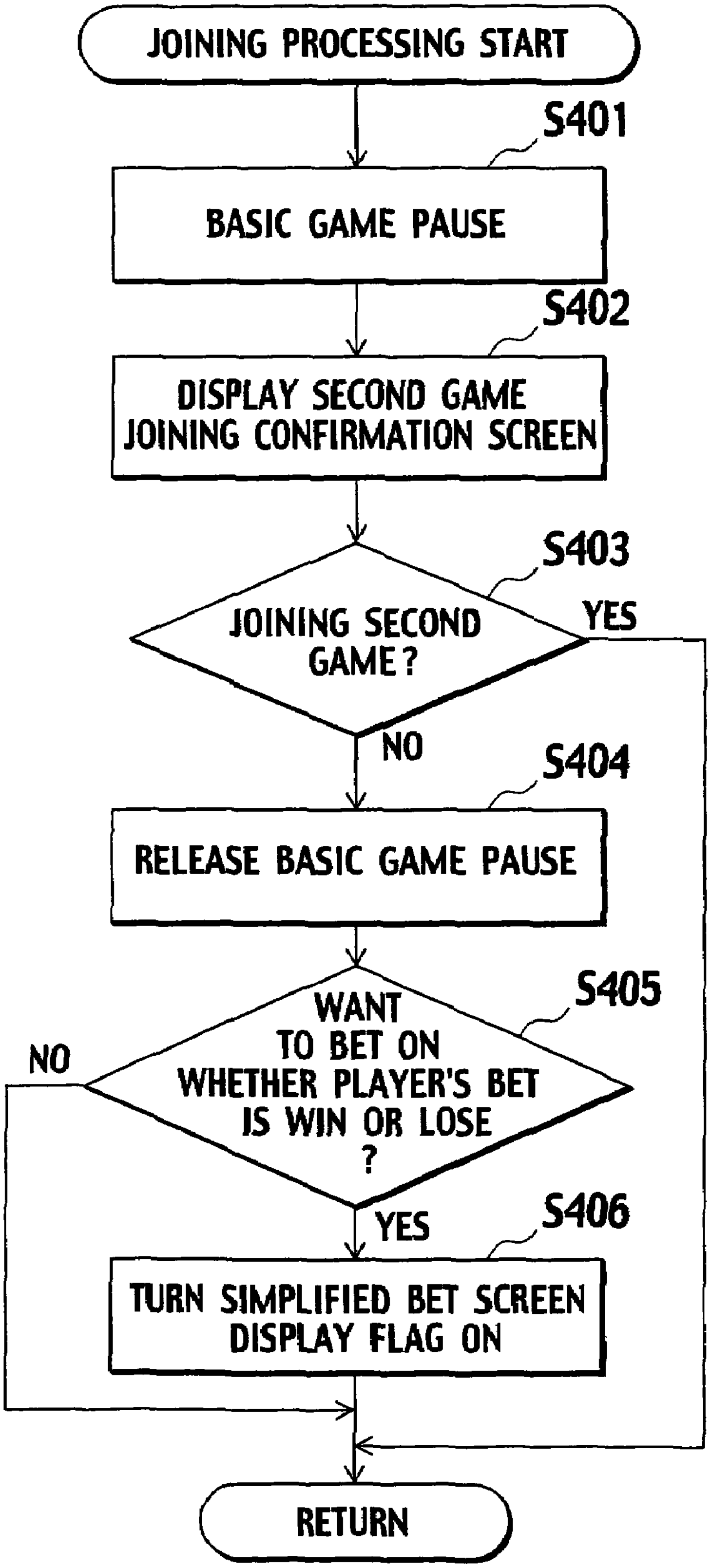
FIG. 18 is a flow chart showing a flow of operation of a joining processing in a second game in a game system according to one embodiment of the present invention.

In the ROM 108, a control program for controlling the slot machine 13 collectively, a program for executing routines shown in FIG. 16 to FIG. 18 (hereafter referred to as a routine execution program), initial data for executing the control program, and various data tables to be used in the determination processing are stored. The routine execution program contains the above described basic game program and the like. The data tables include tables shown in FIG. 13 and FIG. 14 and the like. The RAM 110 temporarily stores values of flags and variables such as a simplified BET screen display flag to be described below which is used by the above described control program and the like.

To the input/output bus 104, the communication interface circuit 111 is connected. The communication interface circuit 111 is a circuit for carrying out communications with the center controller 14 and the other slot machines 13 and the like through the network (see FIG. 1) including various networks of LAN. In the present embodiment, the CPU 106 makes a transition to the second game, at a timing when a prescribed condition is realized while executing the basic game. At this point, via the communication interface circuit 111, the second game request signal or the second game starting signal is transmitted from the CPU 106 to the center controller 14, and also the second game waiting signal or the second game start signal is received.

The CPU 106 receives the data necessary for displaying the BET screen 70 from the center controller 14 via the communication interface circuit 111, and displays them as the image of the BET screen 70 on the liquid crystal display 30. After that, the liquid crystal display 30 functions as a terminal for the slot machine 13 to carry out the betting operation in the second game.

To the input/output bus 104, the random number generator 112 for generating random numbers is connected. The random number generator 112 generates a random number contained in a certain range of numerical values, “0” to “65535 (216-1)”, for example. Alternatively, it is possible to use a configuration in which a random number is generated by the calculation processing of the CPU 106.

To the input/output bus 104, the motor driving circuit 120 for driving the stepping motors 45A to 45E and the display unit driving circuit 120 for driving the various display units 48 to 50 are connected. The CPU 106 controls the operations of the various display units 48 to 50 and the stepping motors 45A to 45E through the motor driving circuit 120 and the display unit driving circuit 128, in response to an occurrence of a prescribed event.

To the input/output bus 104, the speaker driving circuit 122 for driving the speaker 41 is connected. The CPU 106 reads out the sound data stored in the ROM 108, and transmits the read out sound data to the speaker driving circuit 122 through the input/output bus 104. In this way, the prescribed effect sounds will be generated from the speaker 41.

To the input/output bus 104, the hopper driving circuit 124 for driving the hopper 44 is connected. When the cashout signal from the cashout switch 26 is inputted, the CPU 106 outputs the driving signal to the hopper driving circuit 124 through the input/output bus 104. In this way, the hopper 44 will pay out coins corresponding to the remaining credit amount at that timing that is stored in a prescribed memory region of the RAM 110.

To the input/output bus 104, the display/input controller 140 is connected. The CPU 106 generates image display commands according to a game state and a game result, and outputs the generated image display commands to the display/input controller 140 through the input/output bus 104. When the image display commands from the CPU 106 are inputted, the display/input controller 140 generates the driving signals for driving the liquid crystal display 30 according to the inputted image display commands, and outputs the generated driving signals to the liquid crystal display 30. In this way, the prescribed images are displayed on the transparent liquid crystal panel 34 of the liquid crystal display 30. The display/input controller 140 transmits signals inputted by the touch panel 32 on the liquid crystal display 30 to the CPU 106 through the input/output bus 104, as the input signals.

Figure 8:
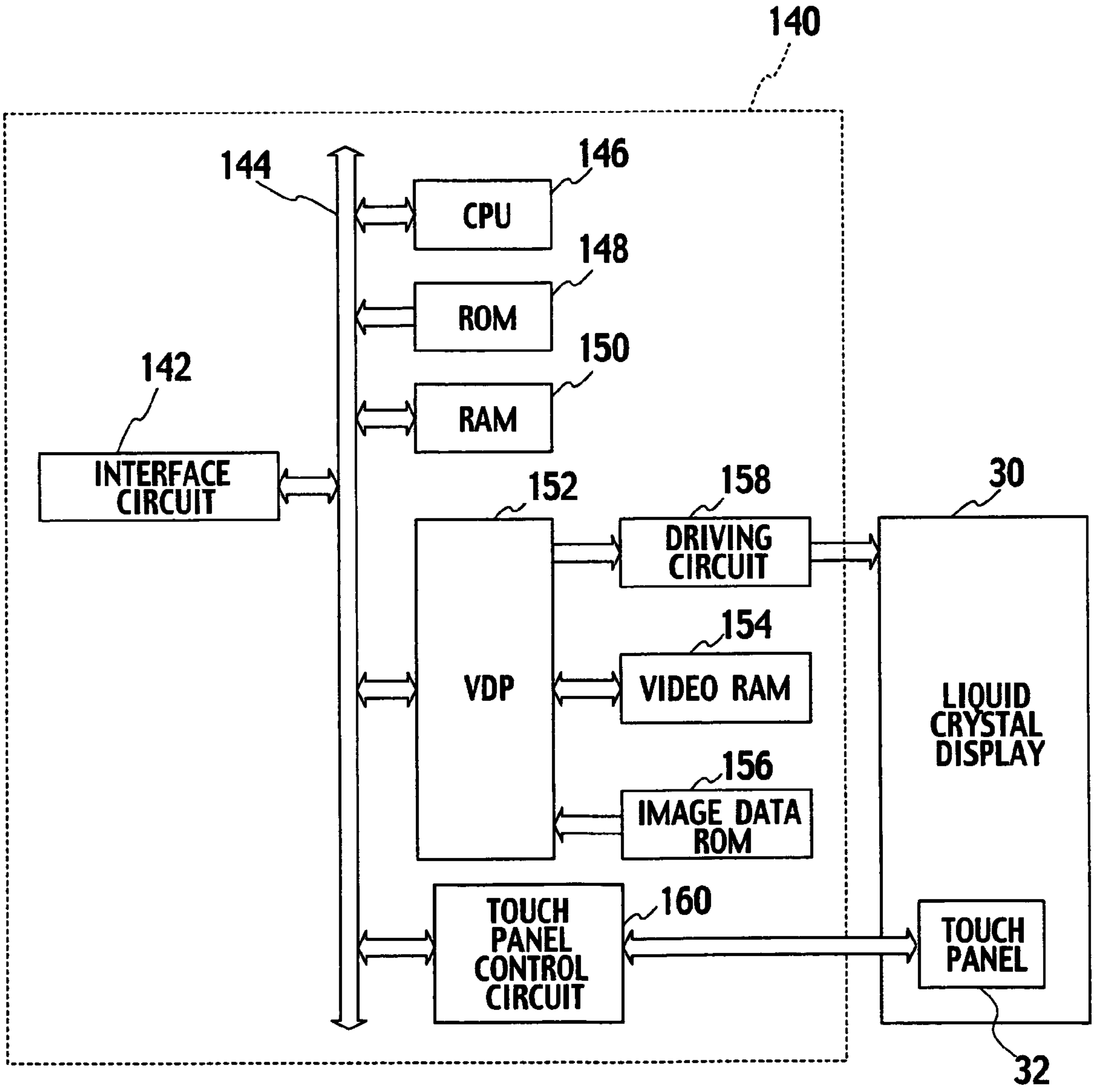
FIG. 8 is a block diagram showing an electric configuration of a display/input controller of a slow machine according to one embodiment of the present invention.

FIG. 8 is a block diagram showing an electric configuration of the display/input controller 140 in the slot machine 13. The display/input controller 140 of the slot machine 13 is a sub micro-computer for controlling inputs from the image display processing and the touch panel 32. The display/input controller 140 has an interface circuit 142, an input/output bus 144, a CPU 146, a ROM 148, a RAM 150, a VDP 152, a video RAM 154, an image data ROM 156, a driving circuit 158 and a touch panel control circuit 160.

The interface circuit 142 is connected to the input/output bus 144. The image display commands outputted from the CPU 106 of the controller 100 side are supplied to the input/output bus 144 through the interface circuit 142, and sent to the CPU 146. The input/output of data signals or address signals with respect to the CPU 146 is carried out through the input/output bus 144.

To the input/output bus 144, the ROM 148 and the RAM 150 are connected. In the ROM 148, a display control program is stored. This display control program is for generating driving signals to be supplied to the liquid crystal display 30 according to the image display commands from the CPU 106 of the controller 100 side. On the other hand, in the RAM 150, values of flags and variables to be used in the above described display control program are stored.

To the input/output bus 144, the VDP 152 is connected. The VDP 152 is a processing device containing the so called sprite circuit, screen circuit and palette circuit, which can carry out various processings for the purpose of displaying images on the liquid crystal display 30. To the VDP 152, the video RAM 154 for storing the image data according to the image display commands from the CPU 106 of the controller 100 side and the image data ROM 156 for storing various types of image data including the above described effect image data and the like are connected. To the VDP 152, the driving circuit 158 for outputting the driving signals for driving the liquid crystal display 30 is connected.

The CPU 146 stores the image data to be displayed on the liquid crystal display 30 according to the image display commands from the CPU 106 of the controller 100 side into the video RAM 154, by reading and executing the display control program stored in the ROM 148. The image display commands include various types of image display commands such as display commands for the above described effect images.

The image data ROM 156 stores various types of image data including data of the above described effect images and the like.

The touch panel control circuit 160 transmits signals inputted by the touch panel 32 on the liquid crystal display 30 to the CPU 106 through the input/output bus 144, as the input signals.

Figure 9:
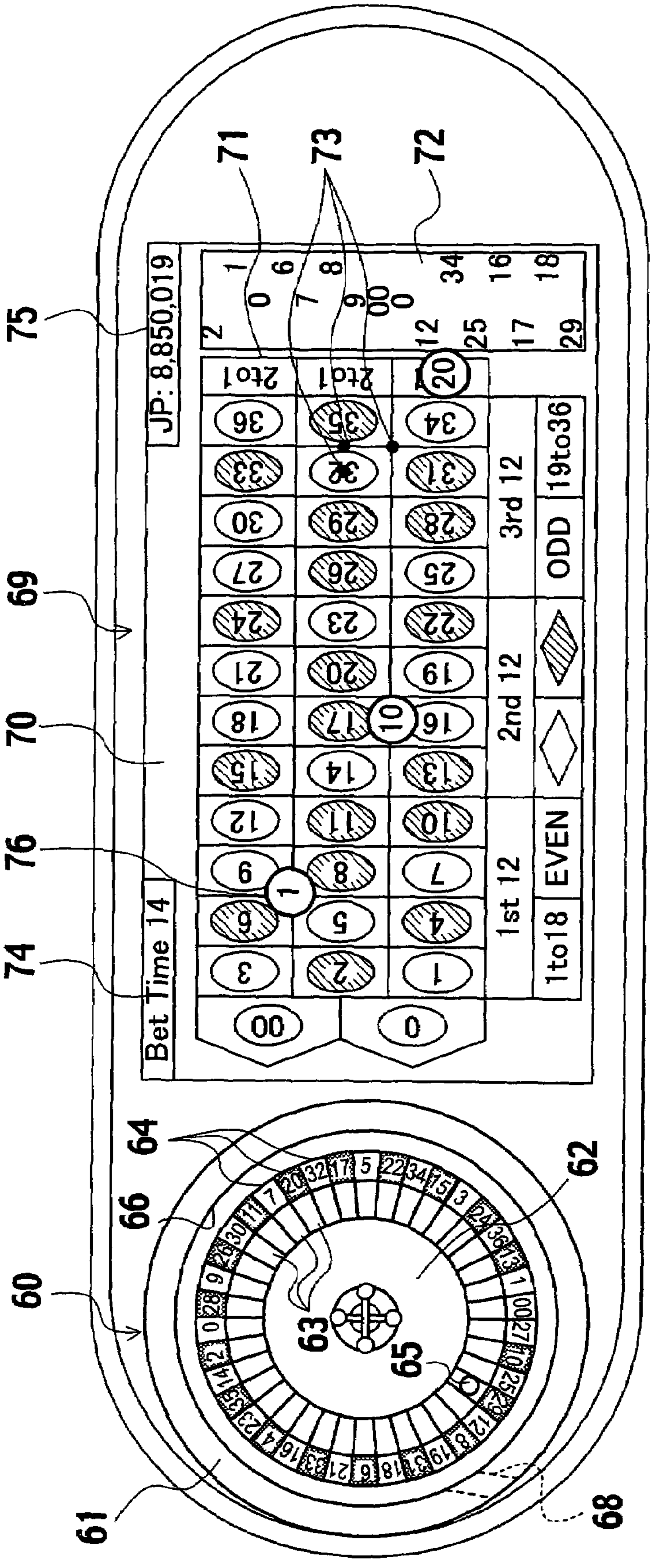
FIG. 9 is a diagram showing a plan view of a second game device according to one embodiment of the present invention.

FIG. 9 shows a plan view of the second game device 11. As shown in FIG. 9, the second game device 11 mainly comprises a roulette device 60, and a display 69 for displaying the BET screen 70 formed by the betting board 70 and the like.

The roulette device 60 basically comprises a frame body 61 fixed to the second game device 11, and a wheel 62 contained and supported to be rotatable within the frame body 61. On the upper face of the wheel 62, a multiplicity (38 in the present embodiment) of concave shaped number pockets 63 are formed. On the upper face of the wheel 62 at the outward direction of the number pockets 63, number display plates 64 displaying numbers "0", "00", "1" to "36" as numerical figures are formed in correspondence to the number pockets 63. A total 38 of the number pockets 63 with each assigned with any one number among "0", "00", "1" to "36" are formed on the wheel 62.

Inside the frame body 61, a ball entry port 68 is formed. The ball entry port is connected with a ball entering device (not shown), such that a ball 65 is entered onto the wheel 62 from the ball entry port 68, in conjunction with the driving of the ball entering device. Also, the entire upper side of the roulette wheel is covered by a hemispherical cover element 67 made of a transparent acrylic material (see FIG. 2).

On the lower side of the wheel 62, a win judgment device (not shown) is provided. This win judgment device is a device for judging which number pocket 63 accommodated the ball 65. On the lower side of the wheel 62, a ball collecting device (not shown) is provided. This ball collecting device is a device for collecting the ball 65 on the wheel 62. The ball entering device, the win judgment device, and the ball collecting device are already well known so that their detailed descriptions will be omitted here.

The frame body 61 is gently sloping toward inside, and a guide wall 66 is formed on its middle portion. The guide wall 66 is for keep rolling the ball 65 by guiding the entered ball 65 against the centrifugal force. Then, as the rotational speed of the ball 65 drops and the centrifugal force becomes weak, the ball 65 rolls down the slope of the frame body 61 toward inside and reaches to the rotating wheel 62.

Then, the ball 65 that rolled to the wheel 62 is accommodated into any one of the number pockets 63 by passing over the number display plates 64 on the outer side of the rotating wheel 62. As a result, the number described in the number display plate 64 corresponding to the number pocket 63 that accommodated the ball 65 is judged by the win judgment device, and that number becomes the winning number.

On the other hand, the display 69 for displaying the BET screen 70 having the betting board 71 is formed by a liquid crystal display, for example. When the players bet chips by using the owned credits by operating the slot machines 13 and the second game terminals 15 as described below, the bet chips will be displayed. The game medium such as coins in the slot machines 13 and the second game terminals 15 will be credited as chips in the roulette game. In the present embodiment, the BET screen 70 is displayed by the display 69, but it may be displayed by a projector or the like provided vertically downward from a ceiling, by changing the display 69 to a screen. In this case, it is possible to expect the more realistic display as it becomes possible to display the bet chips three dimensionally, by using the known technology.

On the betting board 71 displayed on the BET screen 70 of the display 69, the same numbers as 38 types of numbers "0", "00" and "1" to "36" are arranged and displayed in a lattice shaped grids. BET areas 73 for betting chips by specifying "odd numbers", "even numbers", "a color of the number display plate 64 (red or black)", or "a range of numbers ("1" to "12", for example)" are similarly arranged in a lattice shaped grids.

On the right side of the betting board 71, a result log display unit 72 is displayed. The result log display unit 72 displays a list of the resulting winning numbers in the previous games (here, one game is a series of operations in which the players make bets at the slot machines 13 and the second game terminals 15, the ball 65 drops into the number pocket 63, and the payout of credit is made according to the winning number). When one game is finished, a new winning number is added from the above and displayed, and it is made possible to check the log of the winning numbers of at most 16 games.

On the BET areas 73 (on the grids of the numbers and the marks or on lines forming grids), the bet chips are displayed when the players bet chips by using the slot machines 13 and the second game terminals 15.

On the upper portion of the betting board 71, a BET time display unit 74 is provided. The BET time display unit 74 displays a remaining time in which the players can bet. In the present embodiment, "30" will be displayed at a time of start accepting the betting operation, this number is decremented by one per each second, and the acceptance of the betting operation is finished when this number becomes "0". When the remaining time for betting by the players at the slot machines 13 and the second game terminals 15 becomes five seconds, the ball entering device is activated and the ball 65 is entered onto the roulette wheel.

On the right side of the BET time display unit 74, a JP display unit 75 for displaying the credit amount accumulated until now for JP. The JP display unit 75 displays the amount to which 0.5% of credits among the credits bet at a total 12 locations of the slot machines 13 and the second game terminals 15 are accumulated. Then, when a prescribed condition is realized by a JP bonus game which occurs at a prescribed timing, it becomes the win of JP. Then, the credit amount of JP is paid out, and the JP display unit 75 for the paid out JP will display a numerical value of an initial value (50,000 credits, for example).

On the betting board 71, chip marks 76 for indicating the number of chips and the BET area 73 that are bet until that time are displayed. The number displayed on the chip mark 76 indicates the number of bet chips. For example, as shown in FIG. 9, the chip mark 76 of "1" placed at an intersection of grids "5", "6", "8" and "9" indicates that it covers four numbers of "5", "6", "8" and "9" and one chip is bet. A method for betting that covers four numbers in this way is a betting method called "corner bet".

The chip mark 76 of "20" placed on a grid "2to1" indicates that it covers 12 numbers of a column of "1", "4", "7", and so one, and 20 chips are bet. A method for betting that covers 12 numbers by using a grid written as "2to1" in this way is a betting method called "column bet".

The other betting methods include a "straight bet" for betting only on one number, a "split bet" for covering two numbers by betting on a line between two numbers, a "street bet" for covering three numbers ("13", "14" and "15", for example) by betting at an edge of one row of numbers (one column in a vertical direction in FIG. 9), a "five bet" for covering five numbers "0", "00", "1", "2" and "3" by betting on a line between "00" and "3", a "line bet" for covering six numbers ("13", "14", "15", "16", "17" and "18", for example) by betting between numbers of two rows (two columns in a vertical direction in FIG. 9), and a "dozen bet" for covering 12 numbers by betting on a grid written as "1st12", "2nd12" or "3rd12". In addition, there are "red/black" for betting on the color of the number display plate 64 ("red" or "black"), "even/odd" for betting on the odd numbers or the even numbers, and "low/high" for covering 18 numbers by betting on the numbers less than or equal to 18 or the numbers greater than or equal to 19. Here, these plurality of betting methods have different payout amounts of credit per one chip (payout rates) when the bet chips win.

Figure 10:
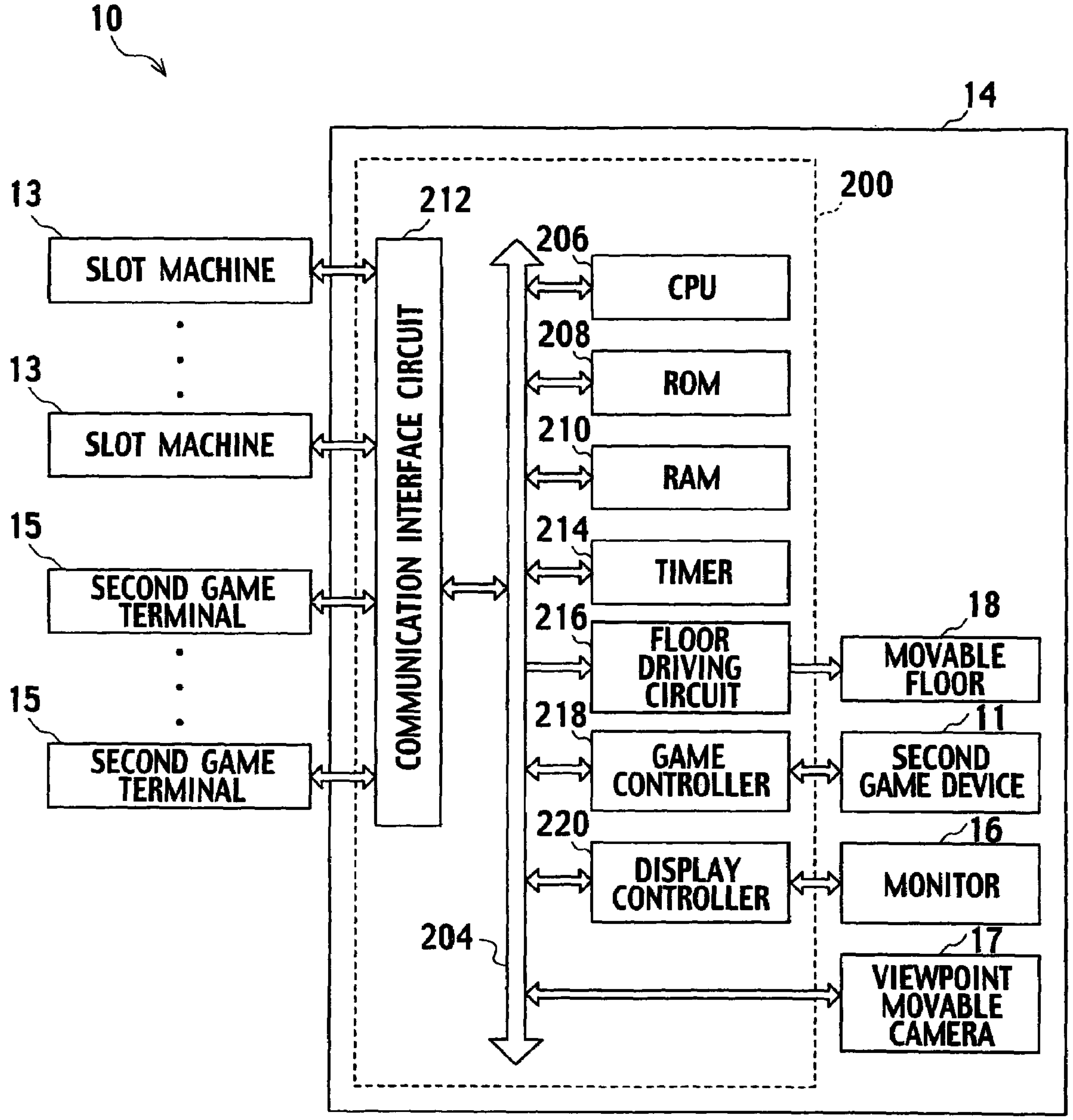
FIG. 10 is a block diagram showing an electric configuration of a controller of a center controller according to one embodiment of the present invention.

FIG. 10 is a block diagram showing an electric configuration of a controller 200 in the center controller 14. As shown in FIG. 10, the center controller 14 comprises a controller 200 and several peripheral devices. The center controller 14 is connected to a plurality (eight in the present embodiment) of the slot machines 13 and a plurality of (four in the present embodiment) of the second game terminals 15, through a communication interface circuit 212.

The controller 200 has an input/output bus 204, a CPU 206, a ROM 208, a RAM 210, a communication interface circuit 212, a timer 214, a floor driving circuit 216, a game controller 218, and a display controller 220.

To the input/output bus 204, the ROM 208 and the RAM 210 are connected.

The CPU 206 carries out various types of processing according to input signals and the like supplied from the slot machines 13 and the second game terminals 15 and data and programs stored in the ROM 208 and the RAM 210, and transmits command signals to the slot machines 13 and the second game terminals 15 according to that result. In this way, the controller 200 containing the CPU 206 controls the slot machines 13 and the second game terminals 15 by its initiative, and proceeds with the game.

When the second game request signal is received from any of the slot machines 13, the controller 200 containing the CPU 206 judges whether the second game is currently executed or not. At this point, if the second game is not currently executed, the second game start signal is transmitted to the slot machine 13 which transmitted the second game request signal.

The input/output bus 204 is connected to the second game device 11 through the game controller 218. When the second game starting signal is received in return from the slot machine 13 to which the second game start signal is transmitted, the controller 200 containing the CPU 206 controls the second game device 11 to start the second game. More specifically, by activating the driving motor (not shown) provided in the roulette device 60 of the second game device 11, the shooting of the ball 65 and the rotation of the wheel 62 are carried out, and the win judgment device for identifying the falling position of the ball 65 is controlled. In this way, the winning number onto which the ball 65 has fallen is judged. Then, the win judgment for the bet chips is made according to the obtained winning number and the betting information transmitted from the slot machines 13 and the second game terminals 15, and the payout amount of credit to be paid at each of the slot machines 13 and the second game terminals 15 is calculated. The second game device 11 is connected to the controller 200 of the center controller 14 through the communication interface circuit 212, similarly as the slot machines 13 and the second game terminals 15.

If the second game is currently executed when the second game request signal is received from any of the slot machines 13, the controller 200 containing the CPU 206 stores a right to make a transition to the second game into a second game transition right memory area of the RAM 210 to be described below, in an order of receiving the second game request signal. Then, the second game waiting signal is transmitted to the slot machine 13 which transmitted the second game request signal. When the second game is finished and a transition to the second game becomes possible for another slot machine 13, the controller 200 containing the CPU 206 reads out the right to make a transition to the second game from a top of the above described second game transition right memory area, and transmits the second game start signal to the slot machine 13 which has that right. Then, when the second game starting signal is received in return from the slot machine 13 to which the second game start signal is transmitted, the second game device 11 is controlled to start the second game. The subsequent processing is the same as that described above.

The ROM 208 comprises a semiconductor memory or the like, for example, and stores a program for realizing basic functions of the second game device 11, a program for realizing functions of the viewpoint movable cameras 17, a program for controlling the slot machines 13 and the second game terminals 15 by its initiative, etc. The programs include a program shown in FIG. 17A to 17E. It also stores the payout rates (the payout amounts of credit for a win per one chip) for the roulette game.

More specifically, in the ROM 208, a payout credit memory area (not shown) which stores the payout rates regarding the roulette game using the BET screen 70 is provided, and a second game payout table as shown in FIG. 15 to be described below is stored. As the payout rates for BET areas 73 of the BET screen 70 stored in the payout credit memory area, the rates of "2 times" to "36 times" are determined in advance according to types of the betting method ("straight bet", "corner bet", "split bet", etc.) and stored.

On the other hand, the RAM 210 temporarily stores the chip betting information supplies from the slot machines 13 and the second game terminals 15, the winning number of the roulette device 60 judged by the sensor, the amount of JP accumulated until now, and data regarding the result of the processing executed by the CPU 206, etc.

Also, the RAM 210 stores the rights to make a transition to the second game of the slot machines 13 in the second game transition right memory area in an order of receiving the second game request signal. More specifically, the information regarding the rights to make a transition to the second game is maintained in a queue, and managed such that the information stored first will be read out first. Namely, when the currently executed second game is finished and a transition to the next second game becomes possible, one right to make a transition to the second game maintained in the queue at a top will be read out.

More specifically, the RAM 210 is provided with a betting information memory area for storing the betting information of the player who is currently playing, a winning number memory area for storing the winning number of the roulette device 60 judged by the win judgment device, a JP accumulation memory area (not shown) for storing the amount of credit in which 0.5% of the amount of credit bet on the BET screen (see FIG. 9) is accumulated, and the second game transition right memory area (not shown) for sequentially storing the right to make a transition to the second game. More specifically, the betting information is an information regarding the bets made by using the slot machines 13 and the second game terminals 15 such as the BET area 73 specified in the BET screen 70, the number of chips bet (bet number), and the type of the betting method. As the information regarding the right to make a transition to the second game, the data for specifying the slot machine 13 which transmitted the second game request signal (such as an address or an ID on a network, for example) can be used.

To the input/output bus 204, the timer 214 for measuring time is connected. The time information of the timer 214 is transmitted to the CPU 206 via the input/output bus 204, and the CPU 206 carries out the rotation operation of the wheel 62 and the entering of the ball 65 as will be described below, according to the time information of the timer 214.

To the input/output bus 204, the floor driving circuit 216 is connected. The CPU 206 carries out a control to raise the movable floor 18 through the floor driving circuit 216, in response to receiving the signal for starting the second game from the slot machine 13. The CPU 206 carries out a control to lower the movable floor 18 through the floor driving circuit 216 in response to receiving a signal for finishing the second game from the slot machine 13.

To the input/output bus 204, the viewpoint movable cameras 17 are connected. The CPU 206 carries out various types of processing according to data and programs stored in the ROM 208 and the RAM 210, controls the viewpoint movable cameras 17 according to that result so as to take images.

Figure 11:
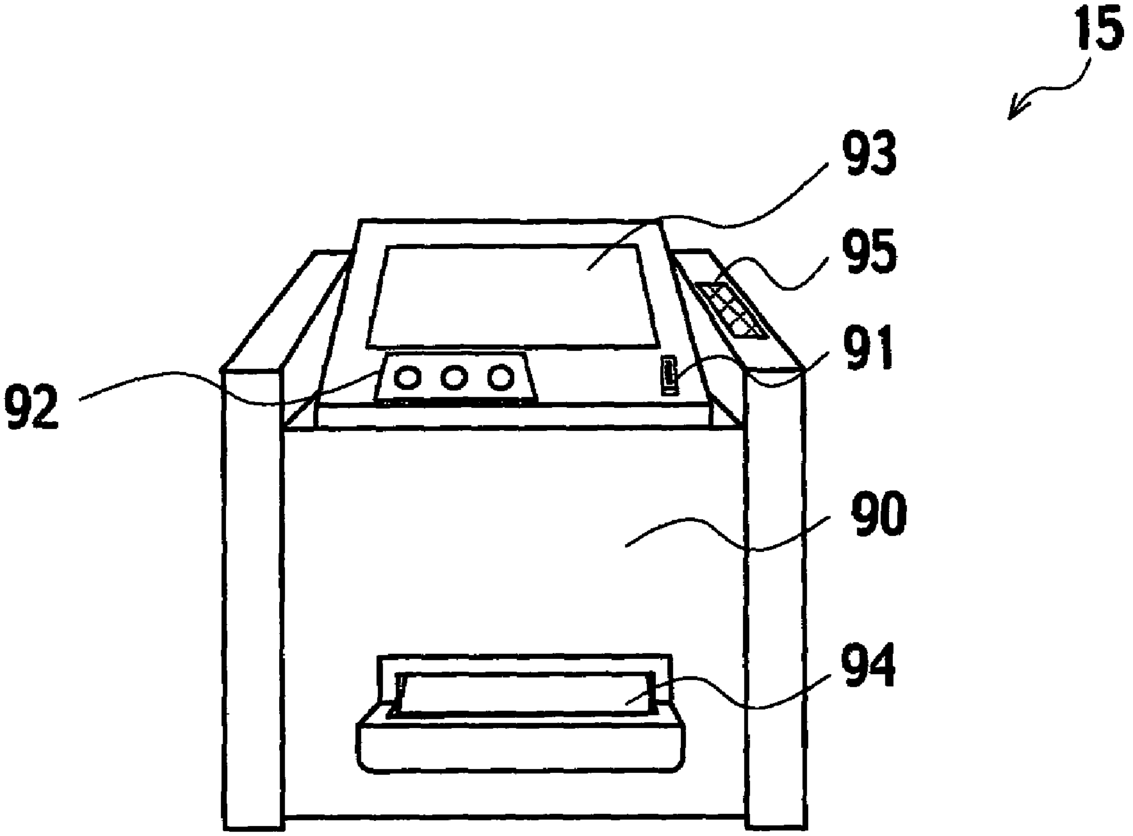
FIG. 11 is a diagram showing a second game terminal according to one embodiment of the present invention.

FIG. 11 is a diagram showing the second game terminal 15. As shown in FIG. 11, the second game terminal 15 at least has a coin slot 91 for entering the game medium such as coins, a control unit 92 formed by a plurality of control buttons and the like by which prescribed commands will be inputted by the player, and a display 93 for displaying images related to the game. The display 93 also plays a role of accepting the betting operation of the player. Then, the as the player operates the touch panel 99 and the control unit 92 while watching the images displayed on the display 93, the game in developing can be proceeded. The game medium to be used in the second game terminal 15 is also not limited to coins.

On the side face of the cabinet 90 in which the second game terminal 15 is arranged, a coin tray 94 is provided. In addition, on the upper right side of the display 93 of the second game terminal 15, a speaker 95 for outputting music, effect sounds and the like is provided.

Inside the coin slot 91, a coin sensor 314 (see FIG. 12) is provided, which carries out the identification of the game medium such as coins entered from the coin slot 91, and counts the entered coins. Inside the coin tray 94, a hopper 319 (see FIG. 12) is provided, which pays out a prescribed number of coins from the coin tray 94.

In this way, by using the touch panel 99 of the second game terminal 15, the operation performance of the player is made easier. As a result, it becomes possible for a third person of the gaming facility to join the roulette game by using the second game terminal 15 lightheartedly.

Figure 12:
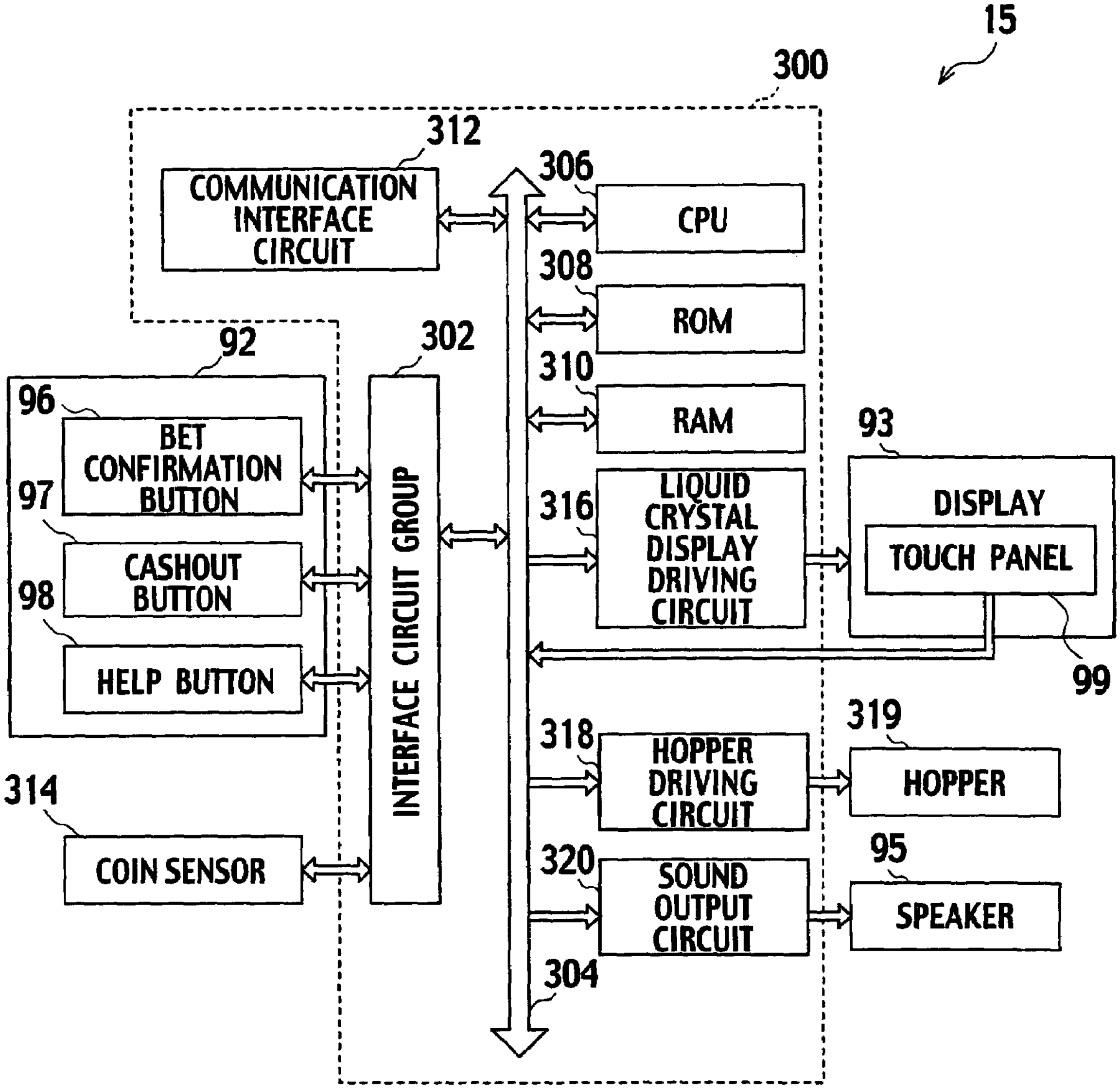
FIG. 12 is a block diagram showing an electric configuration of a controller of a second game terminal according to one embodiment of the present invention.

FIG. 12 is a block diagram showing an electric configuration of a controller 300 in the second game terminal 15. As shown in FIG. 12, the second game terminal 15 comprises a controller 300 of the second game terminal 15 and several peripheral devices.

The controller 300 has an interface circuit group 302, an input/output bus 304, a CPU 306, a ROM 308, a RAM 310, a liquid crystal driving circuit 316, a hopper driving circuit 318 and a sound output circuit 320.

The interface circuit group 302 is connected to the input/output bus 304. The input/output of the data signals or the address signals with respect to the CPU 306 is carried out through the input/output bus 304.

To the interface circuit group 302, a BET confirmation button 96, a cashout button 97 and a help button 98 that are provided in the control unit 92 (see FIG. 11) are connected. The operation signal outputted from each of these buttons is converted into a prescribed signal at the interface circuit group 302 and then supplied to the input/output bus 304. The CPU 306 carries out a control to execute various corresponding operations according to the operation signals supplied from the input/output bus 304 which are outputted by the pressing of these buttons.

To the interface circuit group 302 connected through the input/output bus 304, the coin sensor 314 is connected. The coin sensor 314 detects the coins entered from the coin slot 91 (see FIG. 11), counts the entered coins, and transmits that result to the CPU 306. Then, the CPU 306 increases the credit amount owned by the player which is stored in the RAM 310, according to the transmitted signal.

To the input/output bus 304, the ROM 308 and the RAM 310 are connected.

The CPU 306 receives the command signals from the CPU 206 inside the controller 200 of the center controller 14, through the interface circuit group 302 connected to the input/output bus 304. Then, the CPU 306 controls the peripheral devices constituting the second game terminal 15 according to these command signals, and makes the roulette game proceeds on the second game terminal 15. The CPU 306 executes various types of processing according to the input signals supplied from the control unit 92, and data and programs stored in the ROM 308 and the RAM 310, upon receiving an input of the operation of the player, depending on the content of the processing. Then, according to that result, the prescribed signals and the like are transmitted to the CPU 206 inside the controller 200 of the center controller 14 via the interface circuit group 302, controls the peripheral devices constituting the second game terminal 15, and makes the roulette game proceeds on the second game terminal 15.

The ROM 308 comprises a semiconductor memory or the like, for example, and stores a program for realizing basic functions of the second game terminal 15, and various types of programs, data tables and the like that are necessary in controlling the second game terminal 15. The programs include a program shown in FIG. 17A to 17E. The RAM 310 temporarily stores various data calculated by the CPU 306, the credit amount (deposited in the second game terminal 15) currently owned by the player, the state of chips bet by the player, etc.

To the input/output bus 304, the hopper driving circuit 318 is connected. The hopper 319 connected through the hopper driving circuit 318 pays out a prescribed number of coins from the coin tray 94 (see FIG. 11), according to the command signal from the CPU 306.

To the input/output bus 304, the display 93 is connected through the liquid crystal driving circuit 316. The liquid crystal driving circuit 316 comprises a program ROM, an image ROM, an image control CPU, a work RAM, a VDP (Video Display Processor), and a video RAM, although these are not shown in the figure. Then, in the program ROM, the image control program regarding the display on the display 93 and various types of selection tables are stored. In the image ROM, the dot data for forming images to be displayed on the display 93 are stored, for example. The image control CPU determines the images to be displayed on the display 93 from the dot data stored in advance in the image ROM, according to the image control program stored in advance in the program ROM, based on the parameters set by the CPU 306. The work RAM is a temporary storage means at a time of executing the image control program at the image control CPU. The VDP forms images according to the display content determined by the image control CPU, and outputs them to the display 93. The video RAM is a temporary storage means at a time of forming images at the VDP.

Figure 22:
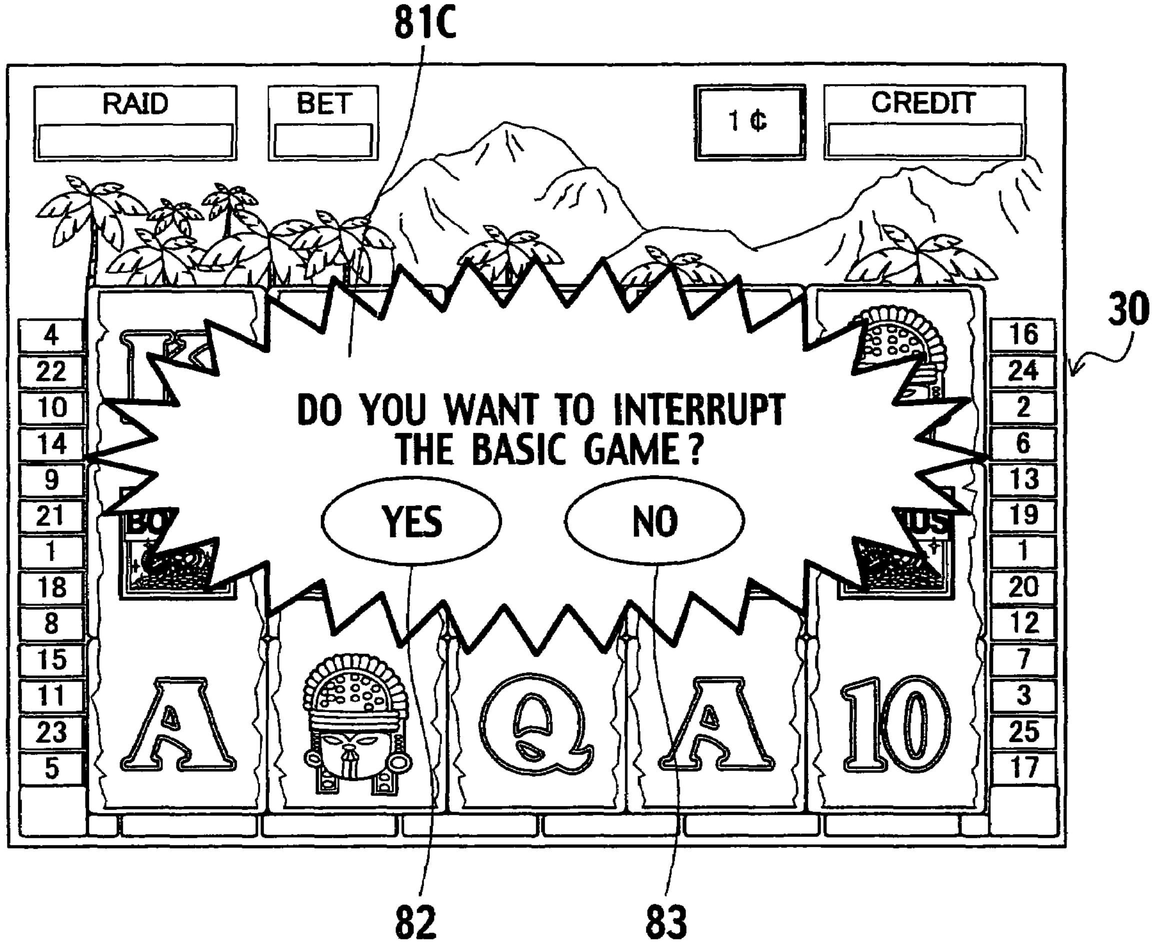
FIG. 22 is a diagram showing an exemplary display when a turn to make a transition to a second game comes while waiting for a second game in a slot machine according to one embodiment of the present invention.

On the front face of the display 93, the touch panel 99 is attached as described above. The operation information of the touch panel 99 is transmitted to the CPU 306 through the input/output bus 304. At the touch panel 99, the chip betting operation of the player is made in the BET screen 70 as shown in FIG. 22 to be described below which is displayed on the display 93. More specifically, the operation of the touch panel 99 is carried out in the selection of the BET area 73, the operation of the unit BET button 77 and the like to be described below, and that information is transmitted to the CPU 306. Then, according to that information, the betting information (the BET area 73 specified in the BET screen 70 and the number of chips bet) of the current player is stored into the RAM 310. In addition, that betting information is transmitted to the CPU 206 of the center controller 14, and stored into the betting information memory area of the RAM 210.

To the input/output bus 304, the sound output circuit 320 and the speaker 95 are connected, and the speaker 95 generates various types of effect sounds at a time of carrying out various types of effects according to the output signals from the sound output circuit 320.

FIG. 13 is showing a basic game random number table to be used by the basic game of the slot machine 13 which will be explained by FIG. 16 to be described below. In this basic game random number table, a range of random numbers and a winning probability are registered in correspondence for each specific combination for awarding a prize. For this reason, in the combination determination processing (step S5 of FIG. 16) to be described below, the generation of the specific combination for awarding a prize of "BONUS" as an eventual basic game result in a case where a random number in a range of "0" to "999" among random numbers of "0" to "65535" is extracted, for example, is determined inside the slot machine 13. In other words, the probability for having a combination of stopped symbols determined as the specific combination for awarding a prize of "BONUS" becomes "1000/65535". Also, the generation of the specific combination for awarding a prize of "K" as an eventual basic game result in a case where a random number in a range of "2000" to "3499" among random numbers of "0" to "65535" is extracted, for example, is determined inside the slot machine 13. In other words, the probability for having a combination of stopped symbols determined as the specific combination for awarding a prize of "K" becomes "1500/65535". On the other hand, the generation of a lost game as an eventual basic game result in a case where a random number in a range of "10000" to "65535" among random numbers of "0" to "65535" is extracted, for example, is determined inside the slot machine 13. In other words, the probability for having a combination of stopped symbols determined as a combination indicating a lost game becomes "55536/65535".

FIG. 14 is showing a basic game payout table to be used in the basic game which will be explained by FIG. 16 to be described below. In this basic game payout table, the specific combination for awarding a prize and a number of coins to be paid for each credit amount bet in one game are registered in correspondence. For this reason, at a time of judging whether it is the specific combination for awarding a prize or not, in the case where the combination of "K" is generated, 10 coins will be paid when the BET credit amount is "1", 20 coins will be paid when the BET credit amount is "2", and 30 coins will be paid when the BET credit amount is "3". For example, in the case where the combination of "BONUS" is generated, 100 coins when the BET credit amount is "1", 200 coins when the BET credit amount is "2", and 300 coins when the BET credit amount is "3", will be transmitted to the center controller 14 as the credit data, and become usable as the credit in the second game to be described below.

FIG. 15 shows one example of a second game payout table to be used in the roulette game which will be explained by FIG. 17A to FIG. 17E to be described below. In this second game payout table, an allowed range of the betting methods and a presence/absence of an allowance for multiple bets are registered for each terminal. Here each terminal implies the following three cases. One is the slot machine 13 which made a transition to the roulette game as a combination for awarding a prize of "BONUS" is stopped and displayed on the payline (hereafter referred to as a main slot machine 13). Another one is the slot machine 13 which has not made a transition to the roulette game as a combination of "BONUS" is not stopped and displayed on the payline by this slot machine 13 itself but it joins the roulette game to be started by the main slot machine 13 (hereafter referred to as a joining slot machine 13). Still another one is the second game terminal 15.

The second game payout table is configured such that the allowed range of the betting methods is different according to the credit amount bet in the basic game when a combination for awarding a prize of "BONUS" is generated, for the main slot machine 13.

For example, in the case where the credit amount bet when a combination for awarding a prize of "BONUS" is generated in the main slot machine 13 is "1", the betting methods by which the bet can be made in the roulette game are at least one of "straight bet", "split bet", and "street bet". Namely, the multiple bets are allowed for the main slot machine 13. Consequently, "straight bet" may be made at a plurality of places, or both of "straight bet" and "split bet" may be made. The betting method by which the bet can be made in the roulette game by the joining slot machine 13 is one of "dozen bet", "column bet", "red/black", "even/odd" and "low/high". Namely, the multiple bets are not allowed for the joining slot machine 13, so that it can only bet at one place among the BET areas 73 of the BET screen 70 in the present embodiment.

FIG. 15 is only showing one example in the present embodiment, and the payout rate for each BET area 73 of the BET screen 70 stored in this payout credit memory area may be made to be different for the slot machines 13 and for the second game terminals 15. It may be made to be different for the main slot machine 13 and the joining slot machine 13 even among the slot machines 13.

In one example shown in FIG. 15, the limitation is put on the betting methods according to the credit amount bet in the basic game of the main slot machine 13, but besides that, it may be made to determine the rate according to the credit amount bet in the basic game of the main slot machine 13. It may be made to allow the use of coins of the slot machine 13 as additional credit at a time of playing the roulette game and change the rate according to the additional credit amount, or it may be made to change the rate according to the total betting amount.

As in the second game payout table shown in FIG. 15, the payout rate for the roulette game is set to be relatively high, so that a high payout can be expected depending on the betting method of the player.

FIG. 16 is a flow chart showing a flow of processing operations in the basic game to be executed by the controller 100 of the slot machine 13. This program will be executed by being called up at a prescribed timing from the main program of the slot machine 13 which is already being executed. The main program is a program for controlling overall operations of the slot machine 13.

In the following, it is assumed that the slot machine 13 is activated in advance, the variables to be used in the CPU 106 of the controller 100 side are initialized to prescribed values, and as a result the slot machine 13 is normally operating.

The CPU 106 of the controller 106 side judges whether the credit which is the remaining number of coins entered by the player is remaining or not (step S1). More specifically, the CPU 106 reads out the credit amount C stored in the RAM 110, and carries out the processing according to this read out credit amount C. In the case where the credit amount C is "0" (step S1 NO), the CPU 106 cannot start the game, so that it finishes this routine without carrying out any processing. On the other hand, in the case where the credit amount C is greater than or equal to "1" (step S1 YES), the CPU 106 judges that there is a remaining credit, and shifts the processing to the step S2.

When it is shifted to the step S2, the CPU 106 judges whether the pressing operation of the spin/repeat/bet switch 24 is carried out or not. In the case where the spin/repeat/bet switch 24 is pressed and the operation signal from the spin/repeat/bet switch 24 is inputted in conjunction with this (step S2 YES), the CPU 106 shifts the processing to the step S12. On the other hand, in the case where the operation signal from the spin/repeat/bet switch 24 is not inputted even after a prescribed time has elapsed (step S2 NO), the CPU 106 judges that the spin/repeat/bet switch 24 is not pressed, and shifts the processing to the step S3.

When it is shifted to the step S3, the game condition is set. More specifically, the CPU 106 determines the number of coins to be bet on the payline in this game, according to the operation of the BET switch 23. At this point, the CPU 106 receives the operation signal generated as the operation of the BET switch 23 is carried out, and stores the BET number regarding the payline into a prescribed memory region of the RAM 110 according to the number of times by which this received operation signal is received. The CPU 106 reads out the credit amount C written in a prescribed memory region of the RAM 110, subtracts the total BET number in which the above described BET number is added, from this read out credit amount C, and stores this subtracted value into a prescribed memory region of the RAM 110. After that, the CPU 106 shifts the processing to the step S4.

When it is shifted to the step S4, the CPU 106 judges whether the start switch 25 is ON or not, and waits for having the start switch 25 operated. In the case where the start switch 25 is operated and the operation signal from the start switch 25 is inputted in conjunction with this (step S4 YES), the CPU 106 judges that the start switch 25 is operated, and shifts the processing to the step S5.

On the other hand, when it is shifted to the step S12, the CPU 106 judges whether the value of the credit amount C is greater than or equal to the value of the total bet amount in the previous game or not. In other words, the CPU 106 judges whether it is possible to start the game as the spin/repeat/bet switch 24 is pressed. More specifically, when the spin/repeat/bet switch 24 is pressed and the operation signal from that switch 24 is inputted in conjunction with this, the CPU 106 reads out the credit amount C and the BET numbers regarding the paylines L1 to L9 in the previous game which are written in a prescribed memory region of the RAM 110, and carries out the processing according to whether the value of the credit amount C is greater than or equal to the value the total bet amount in the previous game or not, according to the relationship between the read out credit amount C and the BET numbers. In the case where it is judged that the value of the credit amount C is less than the value of the total bet amount in the previous game (step S12 NO), the CPU 106 cannot start the game, so that it finishes this routine without carrying out any processing. On the other hand, in the case where it is judged that the value of the credit amount C is greater than or equal to the value of the total bet amount in the previous game (step S12 YES), the CPU 106 subtracts the value of the total bet amount in the previous game from the value of the credit amount C, and stores this subtracted value into a prescribed memory region of the RAM 110. After that, the CPU 106 shifts the processing to the step S5.

When it is shifted to the step S5, the CPU 106 carries out the combination determination processing. More specific processing content of this combination determination processing is as follows.

In the combination determination processing, first, the CPU 106 determines a combination of symbols to be stopped along the above described payline. More specifically, the CPU 106 issues a command for generating a random number to the random number generator 112, and extract a random number in a prescribed range ("0" to "65535" in the present embodiment) generated by the random number generator 112. The CPU 106 stores this extracted random number into a prescribed memory region of the RAM 110. In the present embodiment, the random number is generated by the random number generator 112 that is provided at external of the CPU 106, but it is also possible to generate it by the calculation processing of the CPU 106, without providing this random number generator 112. The CPU 106 reads out the basic game random number table (see FIG. 13) and a table of specific combination for awarding a prize (not shown) stored in the ROM 108, and stores the read out basic game random number table and the table of specific combination for awarding a prize into a prescribed memory region of the RAM 110. The CPU 106 controls the stopping display of each reel according to the above described basic game random number table. The CPU 106 reads out the basic game random number table and the table of specific combination for awarding a prize stored in a prescribed memory region of the RAM 110, and refers to the basic game random number table by using the random number written in a prescribed memory region of the RAM 110 as a parameter, and thereby determines a combination of symbols to be stopped regarding the above described payline. When the specific combination for awarding a prize is determined in this way, the CPU 106 stores this determined specific combination for awarding a prize into a prescribed memory region of the RAM 110. The CPU 106 reads out the random number value and the specific combination for awarding a prize written in a prescribed memory region of the RAM 110, and determined a combination of symbols to be stopped according to the read out random number value and the specific combination for awarding a prize. At this point, a symbol arrangement table (not shown) stored in the ROM 108 is read out by the CPU 106 and stored into a prescribed memory region of the RAM 110 as well as referred. The CPU 106 stores the determined symbols to be stopped data into a prescribed memory region of the RAM 110. Alternatively, it is possible to determine the symbols to be stopped for each reel by using the above described basic game random number table.

When the combination of symbols to be stopped regarding the above described payline is determined, the CPU 106 judges whether the combination of symbols to be stopped regarding the payline is the specific combination for awarding a prize or not. Then, in the case where the combination of symbols to be stopped regarding the above described payline is the specific combination for awarding a prize, the CPU 106 sets a flag indicating that a prize is to be awarded active, for that specific combination for awarding a prize, in order to generate a prize corresponding to the combination of symbols which is the above described specific combination for awarding a prize. This flag indicating that a prize is to be awarded that is set active is stored into a prescribed memory region of the RAM 110 by the CPU 106. On the other hand, in the case where the combination of symbols to be stopped regarding the payline is the other combination, that is the combination for a lost game, the CPU 106 does not set the above described flag indicating that a prize is to be awarded active. After that, the CPU 106 shifts the processing to the step S6.

In the subsequent step S6, the CPU 106 starts the rotation of the mechanical reels 3A to 3E. More specifically, the CPU 106 rotates the mechanical reels 3A to 3E sequentially or simultaneously, according to the symbol arrangement table stored in the RAM 110.

After starting the rotation of the mechanical reels 3A to 3E, the CPU 106 counts the number of driving pulses transmitted to each one of the stepping motors 45A to 45E, and stores the count value into a prescribed memory region of the RAM 110. Every time the mechanical reels 3A to 3E are rotated, reset pulses are acquired, and these reset pulses of the mechanical reels 3A to 3E are inputted into the CPU 106 through the reel position detection circuit 46. By the reset pulses so obtained, the driving pulse count values written in the RAM 110 are cleared to "0". In this way, the count values corresponding to the rotation positions in a range of one rotation for the mechanical reels 3A to 3E are stored in a prescribed region of the RAM 110. In the symbol arrangement table stored in the RAM 110, the rotation position of each of the mechanical reels 3A to 3E and the symbols of each of the mechanical reels 3A to 3E are set in correspondence. At a time of referring to the symbol arrangement table, the CPU 106 sets in correspondence the code numbers sequentially assigned to each constant rotation pitch of the mechanical reels 3A to 3E and the symbols codes indicating symbols provided in correspondence to these code numbers, with reference to the rotation positions at which the above described reset pulses occur.

When the rotation of the mechanical reels 3A to 3E is started, the CPU 106 waits for a prescribed time to elapse (step S7). At a timing where a prescribed time has elapsed (step S7 YES), the CPU 106 automatically stops the rotation of the mechanical reels 3A to 3E (step S8). More specifically, the CPU 106 stops the rotation of the mechanical reels 3A to 3E sequentially or simultaneously, such that the combination of stopped symbols corresponding to the specific combination for awarding a prize, that is determined at the step S5 according to the specific combination for awarding a prize that is written in a prescribed memory region of the RAM 110, will be displayed in the display region that has an interactive relationship with the player visually. After that, the CPU 106 shifts the processing to the step S9.

When it is shifted to the step S9, the CPU 106 judges whether a prescribed symbol combination is realized by the combination determination processing at the step S5 or not. More specifically, the CPU 106 judges according to a state of the flag indicating that a prize regarding the payline is to be awarded which is stored in a prescribed memory region of the RAM 110. In the case where the flag indicating that a prize is to be awarded is not set active, that is, in the case where the specific combination for awarding a prize is "others" (step S9 NO), the CPU 106 judges that the specific combination for awarding a prize is not realized, and finishes this routine. On the other hand, in the case where the flag indicating that a prize is to be awarded is set active, that is, in the case where the specific combination for awarding a prize is other than the above described "others" (step S9 YES), the CPU 106 shifts the processing to the step S10.

Figure 19:
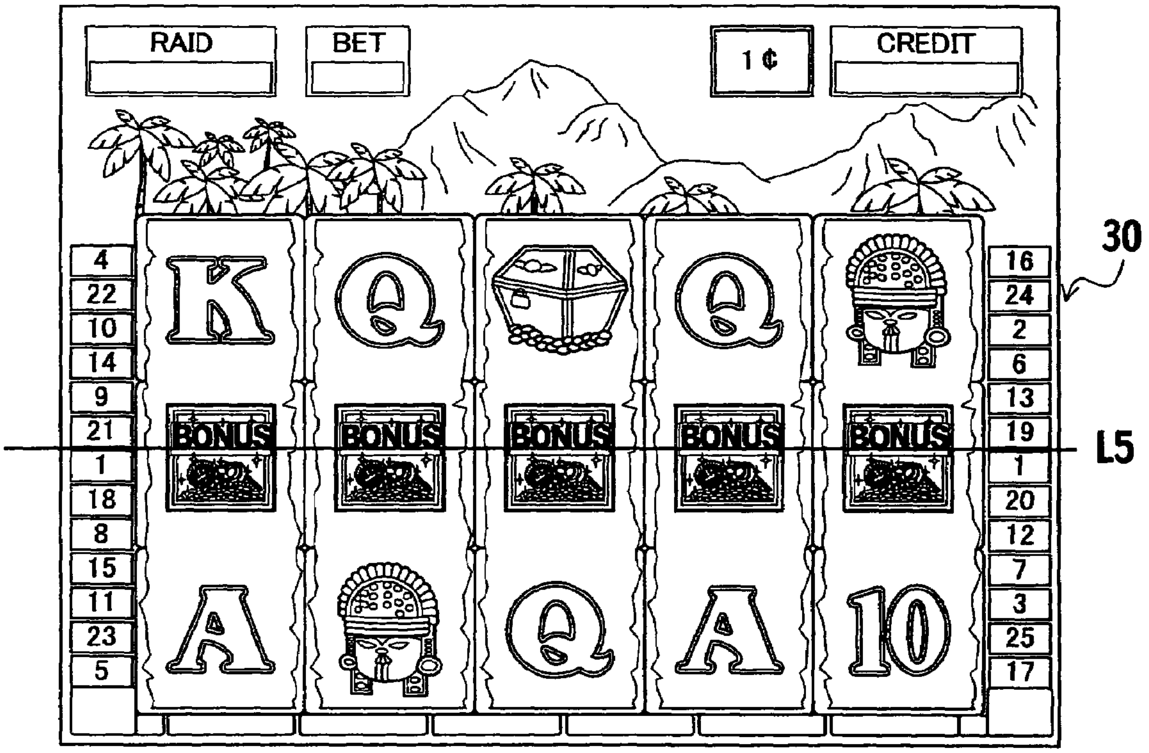
FIG. 19 is a diagram showing an exemplary display when a symbol combination of “BONUS” is stopped on a payline L5 of a display region in a basic game in a slot machine according to one embodiment of the present invention.

When it is shifted to the step S10, the CPU 106 judges whether the specific combination for awarding a prize is "BONUS" or not. More specifically, "BONUS" means symbols "BONUS" are aligned along the payline as shown in FIG. 19 to be described below. In the present embodiment, when "BONUS" is realized, the second game is started. The CPU 106 judges according to the specific combination for awarding a prize that is stored in a prescribed memory region of the RAM 110. In the case where the specific combination for awarding a prize is not "BONUS" (step S10 NO), the CPU 106 judges that the "BONUS" is not realized as the specific combination for awarding a prize, and shifts the processing to the step S13. On the other hand, in the case where the specific combination for awarding a prize is "BONUS" (step S10 YES), the CPU 106 judges that the "BONUS" is realized as the specific combination for awarding a prize, and shifts the processing to the step S11.

When it is shifted to the step S11, the CPU 106 carries out the second game processing shown in FIG. 17A to FIG. 17E to be described below. More specifically, the CPU 106 transmits the second game starting signal to the center controller 14. After carrying out the second game processing, the CPU 106 finishes this routine.

When it is shifted to the step S13, the CPU 106 pays out the number of coins according to the above described specific combination for awarding a prize. More specifically, the CPU 106 calculates the payout amount of coins corresponding to the above described specific combination for awarding a prize by referring to the basic game payout table. The CPU 106 reads out the credit amount stored in a prescribed memory region of the RAM 110, adds the above described calculated payout amount to this read out credit amount, and stores this added value in a prescribed region of the RAM 110. The CPU 106 displays that stored value on the credit amount display unit 49. After that, the CPU 106 finishes this routine.

Next, FIG. 17A to FIG. 17E are a flow chart showing the flow of processing operations in the second game of the game system 10. With references to FIG. 17A to 17E, the second game processing program of the slot machine 13 to be executed by the controller 100 containing the CPU 106 of the main slot machine 13, the second game processing program of the center controller 14 to be executed by the controller 200 containing the CPU 206 of the center controller 14, the second game processing program of the slot machine 13 to be executed by the controller 100 containing the CPU 106 of the joining slot machine 13, and the second game processing program of the second game terminal 15 to be executed by the controller 300 containing the CPU 306 of the second game terminal 15 will be described one by one.

The programs shown in the flow chart of FIG. 17A to FIG. 17E are stored in the ROM 108 and the RAM 110 provided in the slot machine 13, the ROM 208 and the RAM 210 provided in the center controller 14, or the ROM 308 and the RAM 310 provided in the second game terminal 15. Then, the control operations according to the programs are executed by the controller 100 containing the CPU 106 of the slot machine 13, the controller 200 containing the CPU 206 of the center controller 14, or the controller 300 containing the CPU 306 of the second game terminal 15. In the following description, the CPU of each controller will be described as the subject of the controlling.

First, the second game processing program of the main slot machine 13 will be described with references to FIG. 17A to FIG. 17E. At the step S101 of FIG. 17A, the CPU 106 transmits the second game request signal to the center controller 14. After that, the CPU 106 shifts the processing to the step S102.

Figure 21:
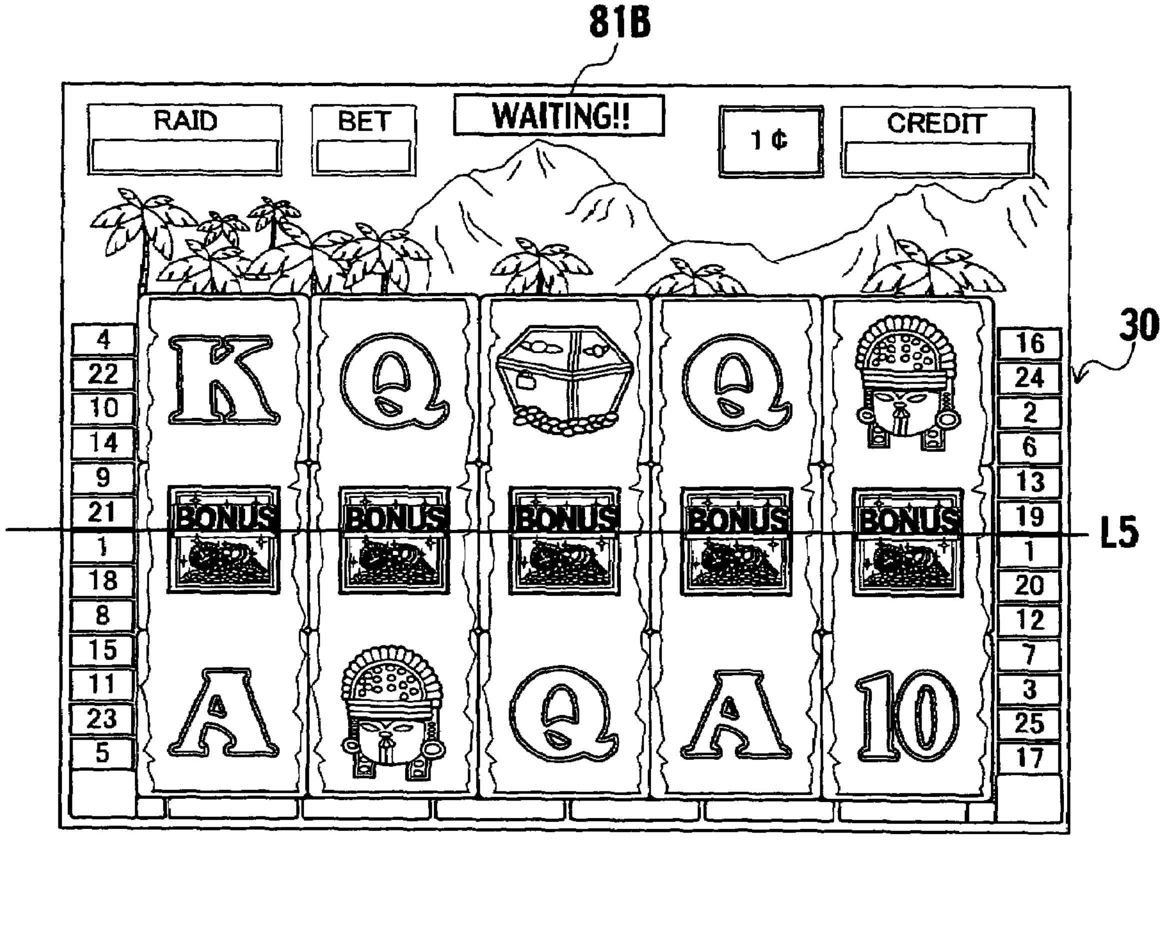
FIG. 21 is a diagram showing an exemplary display of a basic game while waiting for a second game in a slot machine according to one embodiment of the present invention.

At the step S102, in response to receiving the second game waiting signal from the center controller 14, the CPU 106 displays a message window for notifying that it is waiting for the second game as shown in FIG. 21 to be described below (step S103). When this second game waiting signal is received, the basic game is continued. After that, the CPU 106 shifts the processing to the step S104.

At the step S104, the CPU 106 receives the second game start signal indicating that a transition to the second game becomes possible from the CPU 206 of the center controller 14. Then, the CPU 106 displays a small window for inquiring whether the basic game should be interrupted or not to the player, which is shown in FIG. 22 to be described below (step S105). Here, when the interruption of the basic game is commanded by the player (step S105 YES), the CPU 106 shifts the processing to the step S106 of FIG. 17B, and transmits the second game starting signal to the center controller 14. On the other hand, when the continuation of the basic game is commanded by the player, the CPU 106 finishes this routing.

When the second game request signal is transmitted to the center controller 14 at the step S101, if a transition to the second game is possible, the second game start signal is transmitted from the center controller 14 in return. In this case, the CPU 106 shifts the processing from the step S101 to the step S104, and carries out the processing of the step S105 and subsequent steps.

The second game starting signal contains at least data for specifying that slot machine 13, the credit amount bet when the combination of "BONUS" is realized in the basic game, and the information of the paylines.

At the step S106 of FIG. 17B, the CPU 106 displays the BET screen 70 shown in FIG. 25 to be described below, on the liquid crystal display 30 of the slot machine 13 (step S108), and starts a measurement of the betting operation accepting period as the betting period in which the player can bet chips (step S109). Then, the player can bet own chips on the BET area 73 related to the number of his own guess by operating the touch panel 32 during the betting period in which the betting can be accepted. The places to bet and the number of times for betting are different depending on the credit amount bet in the basic game of the slot machine 13 and the paylines, as shown in the second game payout table (see FIG. 15). As a method for this control, it may be made such that the CPU 106 of the slot machine 13 transmits the betting information, and then the CPU 206 of the center controller 14 carries out the control, or it may be made such that, after the CPU 106 transmitted the second game starting signal at the step S106, the condition for allowing the betting is received from the center controller 14 as data and that data is stored into the RAM 110 of the slot machine 13, and then the CPU 106 of the slot machine 13 carries out the control. The specific betting methods using the BET screen 70 will be described below.

After that, when the betting period end signal indicating that the betting period has ended is received from the CPU 206 of the center controller 14 (step S109 of FIG. 17C), the CPU 106 displays an image indicating that the betting period has ended on the liquid crystal display 30 of the slot machine 13, and finishes accepting the betting operation at the touch panel 32 (step S110). After that, the CPU 106 shifts the processing to the step S111 of FIG. 17D.

At the step S111 of FIG. 17D, the CPU 106 judges whether the betting operation is made by the player during the betting period or not. In the case where the betting operation is made (step S112 YES), the CPU 106 shifts the processing to the step S114. On the other hand, in the case where the betting operation is not made (step S112 NO), the CPU 106 shifts the processing to the step S113.

At the step S113, the CPU 106 carries out the payout processing according to the combination of "BONUS", and transmits the betting information signal indicating that the betting was not made to the center controller 14. More specifically, the CPU 106 calculates the payout amount of coins according to the basic game payout table (see FIG. 14). The CPU 106 reads out the credit amount stored in a prescribed memory region of the RAM 110, adds the above described calculated payout amount to this read out credit amount, and stores this added value into a prescribed memory region of the RAM 110. The CPU 106 displays that stored value on the credit amount display unit 49. After that, the CPU 106 finishes this routine.

In the case where the roulette game is abandoned despite of the fact that the condition for playing the roulette game is met and there is a need to carry out the credit game under normal circumstances, it may be made such that the credit payout will not be made.

On the other hand, at the step S114, the CPU 106 transmits the betting information (the specified BET area 73 and the number of chips bet on the specified BET area 73 (bet number)) of the betting made by the player at the slot machine 13.

After that, the CPU 106 receives the credit payout result transmitted from the CPU 206 of the center controller 14 (step S114 of FIG. 17D). Note that the credit payout result is the payout result according to the win or lose of the roulette game using the BET screen 70. After that, the CPU 106 shifts the processing to the step S115.

At the step S115, the CPU 106 makes the credit payout according to the payout result received at the step S114. More specifically, the credit data for the amount according to the payout of the roulette game is recorded in the RAM 110. After that, the CPU 106 shifts the processing to the step S116.

Figure 26:
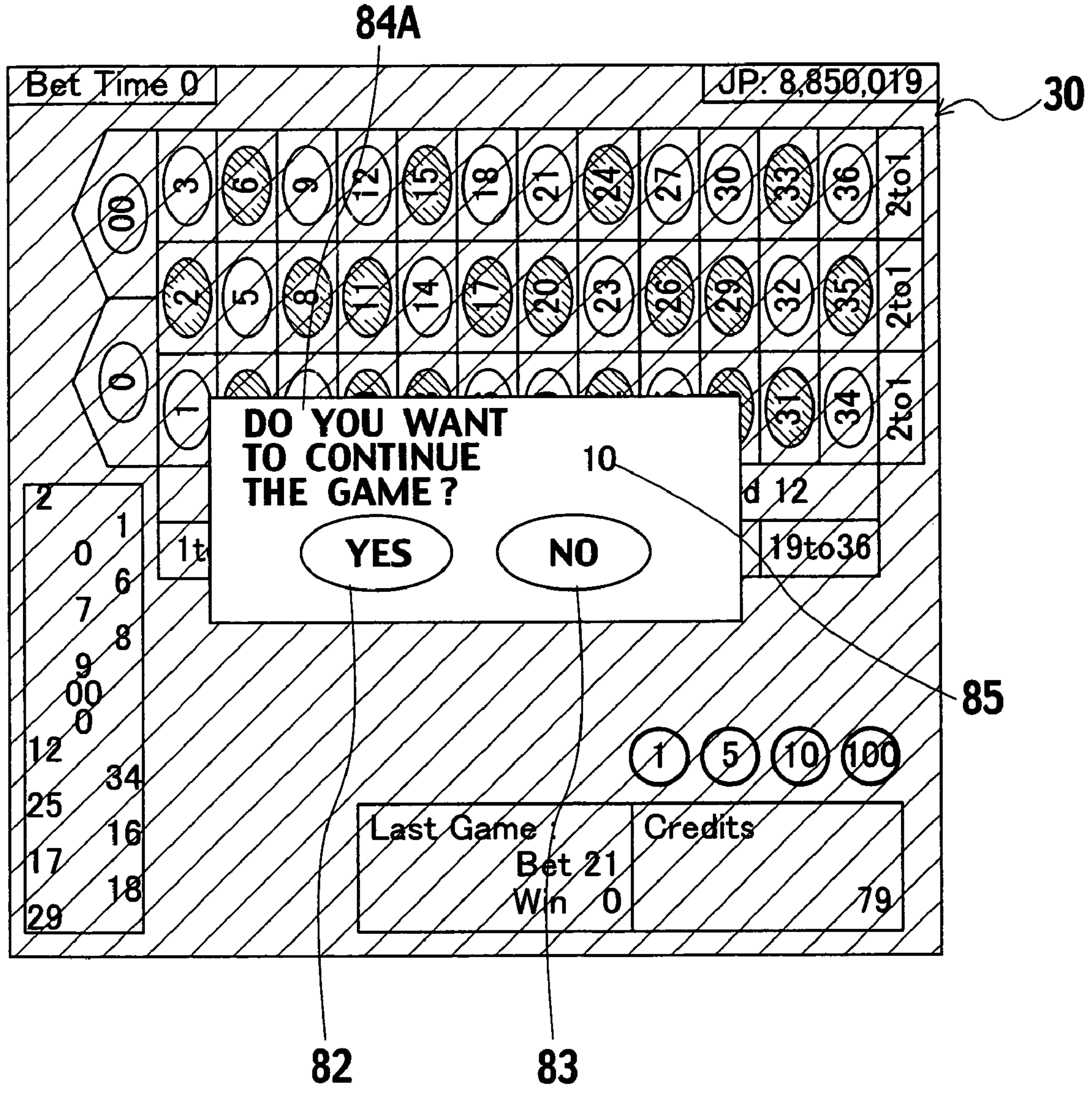
FIG. 26 is a diagram showing an exemplary display for inquiring whether a game should be continued or not at a time of finishing a game in a second game in a slot machine and a second game terminal according to one embodiment of the present invention.

At the step S116, the CPU 106 judges whether the second game should be finished or not. More specifically, in the case where the credit in the roulette game is remaining, a small window 84 as shown in FIG. 26 to be described below is displayed on the liquid crystal display 30 and the judgment is made as the player makes the selection. Then, in the case where the credit in the roulette game is not remaining, there is no room for selection by the player so that the CPU 106 finishes the second game. In the case where the credit in the roulette game is not remaining, or in the case where the player made the selection indicating that the roulette game should be finished (step S116 YES), the CPU 106 shifts the processing to the step S117. On the other hand, in the case where the credit in the roulette game is remaining and the player made the selection indicating that the roulette game should be continued (step S116 NO), the CPU 106 shifts the processing to the step S106 of FIG. 17B. Then, the CPU 106 transmits the second game starting signal to the center controller 14 again such that the betting period starts and a transition to the next game is made.

At the step S117, the CPU 106 transmits the second game finishing signal to the center controller 14. Then, in the case where the credit in the roulette game is remaining, the CPU 106 reads out the credit amount stored in a prescribed memory region to be used in the basic game, and adds the credit data according to the payout of the roulette game stored in the RAM 110 to this read out credit amount. Then, this added value is stored into a prescribed memory region of the RAM 110, and displayed on the credit amount display unit 49 of the slot machine 13. After that, the CPU 106 finishes this routine. In the case where the second game is to be finished at the slot machine 13, that roulette game processing is finished.

When the payout is obtained by the roulette game in this way, the credit increased by that payout is converted into coins of the slot machines 13 at a time of finishing the roulette game. As a result, the payout of the roulette game can be used as coins in the basic game after the second game. For this reason, the basic game and the second game can become highly related, and the further fan can be introduced to the games using the game system 10.

Next, the second game processing program of the center controller 14 will be described with references to FIG. 17A to FIG. 17E.

At the step S201 of FIG. 17A, the CPU 206 receives the second game request signal transmitted from the CPU 106 of the slot machine 13 at the step S101. After that, the CPU 206 shifts the processing to the step S202.

At the step S202, the CPU 206 judges whether the second game is currently executed or not. Here, if the second game is currently executed, the CPU 206 shifts the processing to the step S203. On the other hand, if the second game is not currently executed, that is, if a transition to the second game is possible, the CPU shifts the processing to the step S206.

At the step S203, the CPU 206 stores the right to make a transition to the second game into the second game transition right memory area of the RAM 210 in an order of receiving the second game request signal. Then, the CPU 206 transmits the second game waiting signal to the slot machine 13 which transmitted the second game request signal (step S204). After that, the CPU 206 shifts the processing to the step S205.

At the step S205, the CPU 206 judges whether the second game is finished or not. Here, in the case where the second game is not finished (step S205 NO), the CPU 206 continues to wait until the second game is finished. On the other hand, in the case where the second game is finished (step S205 YES), the CPU 206 shifts the processing to the step S206.

At the step S206, the CPU 206 reads out the right to make a transition to the second game from a top of the second game transition right memory area of the RAM 210, and transmits the second game start signal to the slot machine 13 which has that right. After that, the CPU 206 shifts the processing to the step S207 of FIG. 17B.

Figure 23:
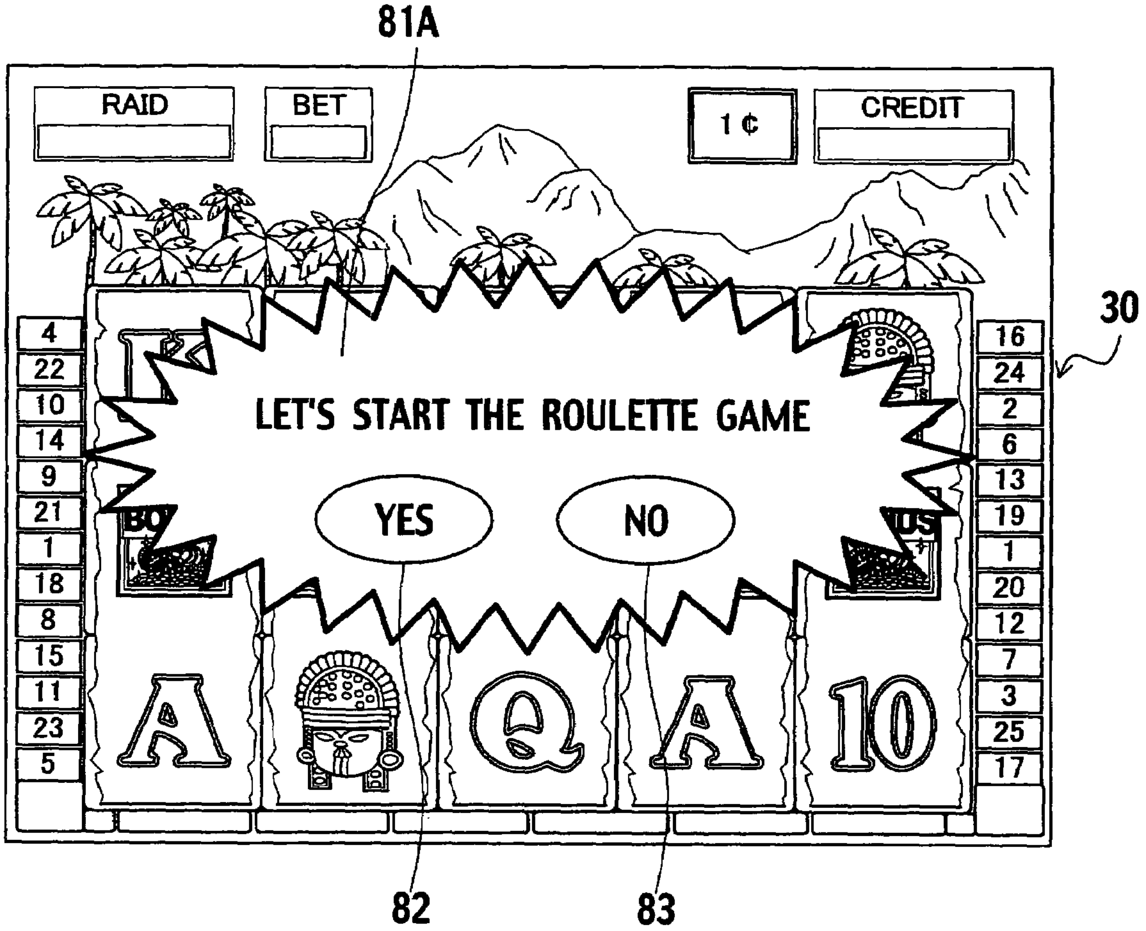
FIG. 23 is a diagram showing an exemplary display when a player selects a start of a second game in a slot machine according to one embodiment of the present invention.

At the step S207 of FIG. 17B, the CPU 206 receives the second game starting signal transmitted from the CPU 106 of the slot machine 13 at the step S106. The CPU 206 stores the received second game starting signal in the RAM 210. The CPU 206 raises the movable floor 18 on which the slot machine 13 which transmitted the second game starting signal and the chair 19 are fixedly provided. In addition, the display indicating that the second game will be started as shown in FIG. 23 to be described below is displayed on the large scale monitor 16. By the raising of the movable floor 18 of the slot machine 13 and the second game starting message on the large scale monitor 16, not only the players of the other slot machines 13 but also the third persons in the gaming facility can learn that the second game will be started. After that, the CPU 206 shifts the processing to the step S208.

At the step S208, the CPU 206 transmits the second game starting signal to the second game terminals 15. In this way, it becomes possible for the players to join the roulette game by using the second game terminals 15. After that, the CPU 206 shifts the processing to the step S209.

At the step S209, the CPU 206 starts a measurement of the betting period which is a period in which the player can make bets, from a timing at which the second game starting signal is transmitted by the slot machine 13. The players of the slot machines 13 who are joining the game can bet own chips to the BET area 73 related to the number of his own guess by operating the touch panel 32 of the liquid crystal display 30 during this betting period. The players of the second game terminals 15 to be described below can also bet chips by the similar operation.

In the case where the bets are confirmed by the operations of the players at the slot machines 13 and the second game terminal 15 to be described below, it may be made such that data containing the place and the amount bet by the player are transmitted from each of the slot machines 13 and the second game terminals 15 to be described below, and these data are displayed on the monitor 16 by the CPU 206. By displaying the above described data on the monitor 16, it becomes possible for the player to check the manners by which the other players are betting and then make own bet in view of the checked result. As a result, it becomes possible to enjoy competing the tactics with the other players.

After that, the CPU 206 shifts the processing to the step S210.

At the step S210, the CPU 206 judges whether the remaining betting period becomes five seconds or not. The remaining betting period is also displayed on the BET screen 70 of the second game device 11 by the BET time display unit 74 (see FIG. 9). Then, in the case where it is judged that the remaining betting period has not reached five seconds (step S210 NO), the CPU 206 repeats the processing of the step S210, and continues to wait until the remaining betting period becomes five seconds. On the other hand, in the case where it is judged that the remaining betting period is five seconds (step S210 YES), the CPU 206 shifts the processing to the step S211 of FIG. 17C.

At the step S211 of FIG. 17C, the CPU 206 enters the ball 65 inside the roulette wheel. Namely, by activating the ball entering device first, the ball 65 is entered inside the roulette wheel, and the number determination processing by the roulette device 60 is carried out according to the game execution program. More specifically, after entering the ball 65, the CPU 206 rotates the wheel 62 at a prescribed rotational speed in a direction opposite from the ball entering direction by driving the driving motor in addition. The entered ball 65 rolls over the roulette wheel along the guide wall 66, and after that, a the rotational speed drops and the centrifugal force becomes weak, the ball 65 rolls down the slope of the frame body 61 toward inside, and reaches to the rotating wheel 62 (see FIG. 9).

Then, the ball 65 that rolled to the wheel 62 is accommodated into any one of the number pockets 63 by passing over the number display plates 64 on the outer side of the rotating wheel 62, and the number (any one of "0", "00" and "1" to "36" shown in FIG. 9) described in the number display plate 64 corresponding to the number pocket 63 that accommodated the ball 65 becomes the winning number.

In addition, the CPU 206 takes the image of the roulette device 60 by the viewpoint movable camera 17 in response to the entering of the ball 65 inside the roulette wheel, and display it on the monitor 16. In this way, the player can watch the manner by which the winning number is determined in the roulette game by watching the monitor 16, without looking into the second game device 11. The monitor 16 may have its screen divided according to the need and display both the roulette device 60 and the BET screen 70.

After that, the CPU 206 judges whether the betting period has ended or not (step S212). Then, in the case where it is judged that the betting period has not ended (step S212 NO), the CPU 206 repeats the processing of the step S212 and continues to wait until the betting period ends. On the other hand, in the case where it is judged that the betting period has ended (step S212 YES), the CPU 206 transmits the betting period end signal indicating that the betting period has ended to the CPU 106 of the slot machine 13 and the CPU 306 of the second game terminal 15 (step S213).

After that, the CPU 206 receives the betting information (presence or absence of bet, and in the case where bet is made, the specified BET area 73, the number of chips bet on the specified BET area 73 (bet number) and the betting method) for the bets made by the players at the slot machines 13 and the second game terminals 15 from these devices, checks whether the betting method matches with the condition of the second game payout table stored in the ROM 208, and stores it into the betting information memory area of the RAM 210 (step S214 of FIG. 17D). The CPU 206 may also display this betting information stored in the betting information memory area of the RAM 210 on the monitor 16. In the case where the information indicating that the bet is not made is received at the step S214, the CPU 206 lowers the movable floor 18 on which the slot machine 13 and the chair 19 are fixedly provided. After that, the CPU 206 shifts the processing to the step S215.

At the step S215, the CPU 206 accumulates the credit corresponding to 0.5% of the total credit bet by the slot machines 13 and the second game terminals 15 that is received at the step S214, onto the amount of JP recorded in the JP accumulation memory area of the RAM 210. Then, in conjunction with that, the display of the JP display unit 75 is updated. In the case where the information received at the step S214 is the betting information indicating that the bet is not made, this processing is not carried out. After that, the CPU 206 shifts the processing to the step S216.

At the step S216, the CPU 206 judges that the ball 65 is accommodated into the number pocket 63, and after that, activates the win judgment device, to judge which number pocket 63 set in correspondence to which number has accommodated the ball 65. After that, the CPU shifts the processing to the step S217.

At the step S217, the CPU 206 judges whether the chips bet at the slot machines 13 and the second game terminals 15 are win or lose, according to the number of the pocket accommodated the ball 65 that is judged at the step S217 and the betting information of the slot machines 13 and the second game terminals 15 that is received at the step S214. After that, the CPU 206 shifts the processing to the step S218.

At the step S218, the CPU 206 carries out the payout calculation processing. In the payout calculation processing, the CPU 206 recognizes the winning chips bet on the winning number for each of the slot machines 13 and the second game terminals 15, and calculates a total payout amount of credit to be paid out to each of the slot machines 13 and the second game terminals 15, by using the payout rate for each BET area 73 in the second game payout table stored in the payout credit memory area of the ROM 208 (the credit amount to be paid per one chip (one bet)). After that, the CPU 206 shifts the processing to the step S219 of FIG. 17E.

In this case, the information such as the winning number and the number of winners is displayed on the monitor 16.

At the step S219 of FIG. 17E, the CPU 206 carries out the transmission processing for the payout result of the credit of the roulette game according to the payout calculation processing of the step S219. More specifically, the CPU 206 outputs the credit data corresponding to the payout amount to the winning ones of the slot machines 13 and second game terminals 15. After that, the CPU 206 shifts the processing to the step S220.

AT the step S220, the CPU 206 activates the ball collecting device provided on a lower side of the wheel 62, and collects the ball 65 on the wheel 62. The collected ball 65 will be entered into the wheel 62 of the roulette device 60 again in the subsequent games.

After that, the CPU 206 receives the second game finishing signal from the slot machine 13 (step S221). When this second game finishing signal is received, the CPU 206 lowers the movable floor 18 on which that slot machine 13 and the chair 19 are fixedly provided, and finishes this routine.

While only the basic games are played by all the slot machines 13 and no second game is played, the monitor 16 may display a video such as the demonstration of the second game that is stored in the ROM 208.

Finally, the second game processing programs of the joining slot machine 13 and the second game terminal 15 will be described with references to FIG. 17A to FIG. 17E. Here, the processing of the joining slot machine 13 will be described first, and then the processing of the second game terminal 15 will be described.

In the following, the betting processing in the roulette game by the joining slot machine 13 will be described.

At the step S301 of FIG. 17B, the CPU 106 of the slot machine 13 receives the second game starting signal transmitted from the center controller 14. By receiving this signal, the operation at a terminal for the roulette game becomes possible at the slot machine 13. After that, the CPU 106 shifts the processing to the step S302.

At the step S302, whether a device that received the second game starting signal is the slot machine 13 or not is judged. After that, the CPU 106 of the slot machine 13 shifts the processing to the step S303.

At the step S303, the CPU 106 of the joining slot machine 13 carries out the joining processing shown in FIG. 18 to be described below, and shifts the processing to the step S304.

At the step S304, the CPU 106 judges whether the coin is entered by the player or not according to the detection signal of the coin sensor 43. Then, in the case where the coin is not entered (step S304 NO), the CPU 106 shifts the processing to the step S305. On the other hand, in the case where the coin is entered (step S304 YES), the CPU 106 shifts the processing to the step S306 of FIG. 17C.

The coin to be used in the basic game of the joining slot machine 13 can be used in the roulette game.

At the step S305, the CPU 106 judges whether the betting period end signal is received or not. The betting period end signal is transmitted from the center controller 14 when the period for betting has elapsed. In the case where this signal is not received (step S305 NO), the CPU 106 shifts the processing to the step S304. On the other hand, in the case where the betting period end signal is received (step S305 YES), the betting information signal indicating that the bet is not made is transmitted to the center controller 14, and this routine is finished.

At the step S306 of FIG. 17C, the CPU 106 records the credit data of an amount according to the number of entered coins into the RAM 110. After that, the CPU 106 shifts the processing to the step S307.

At the step S307, the CPU 106 displays the BET screen 70 shown in FIG. 22 to be described below, on the liquid crystal display 30 of the joining slot machine 13 (step S307), and starts a measurement of the betting period in which the player can bet chips (step S308). The player who joined the game can bet own chips to the BET area 73 related to the number of his own guess by operating the touch panel 32 during the betting period in which the bet can be accepted. The specific betting methods using the BET screen 70 will be described below.

After that, when the betting period end signal indicating that the betting period has ended is received from the CPU 206 of the center controller 14 (step S309), the CPU 106 displays an image indicating that the betting period has ended on the liquid crystal display 30 of the joining slot machine 13, and finish accepting the betting operation at the touch panel 32 (step S310). After that, the CPU 106 shifts the processing to the step S311 of FIG. 17D.

At the step S311 of FIG. 17D, the CPU 106 judges whether the betting operation is made by the player during the betting period or not. In the case where the betting operation is made (step S311 YES), the CPU 106 shifts the processing to the step S313. On the other hand, in the case where the betting operation is not made (step S311 NO), the CPU 106 shifts the processing to the step S312.

At the step S312, the CPU 106 carries out the payout processing according to the coins entered by the player, and transmits the betting information signal indicating that the bet is not made to the center controller 14. After that, the CPU 106 finishes this routine.

On the other hand, at the step S313, the CPU 106 transmits the betting information (the specified BET area 73, and the number of chips bet on the specified BET area 73 (bet number)) for the bet made by the player at the joining slot machine 13 to the center controller 14.

After that, the CPU 106 receives the credit payout result transmitted from the CPU 206 of the center controller 14 (step S314 of FIG. 17E). Note that the credit payout result is the payout result of the roulette game using the BET screen 70. After that, the CPU 106 shifts the processing to the step S315.

At the step S315, the CPU 106 carries out the payout of credit according to the payout result received at the step S314. More specifically, the credit data of an amount according to the payout of the roulette game is recorded in the RAM 110. Then, when the cashout switch 26 is pressed, the CPU 106 pays out the coins according to the credit amount stored in the RAM 110 from the coin tray 28. After that, this routine is finished. In the case of continuing the game again at the main slot machine 13, the second game starting signal is transmitted from the center controller 14 again, and a transition to the next game is made.

Before finishing this routine, the pause of the basic game processing of the slot machine 13 will be released.

Next, the simplified betting processing of the joining slot machine 13 will be described. Here, the simplified betting indicates the betting on whether the bet made by the player of the main slot machine 13 is win or lose.

Figure 27:
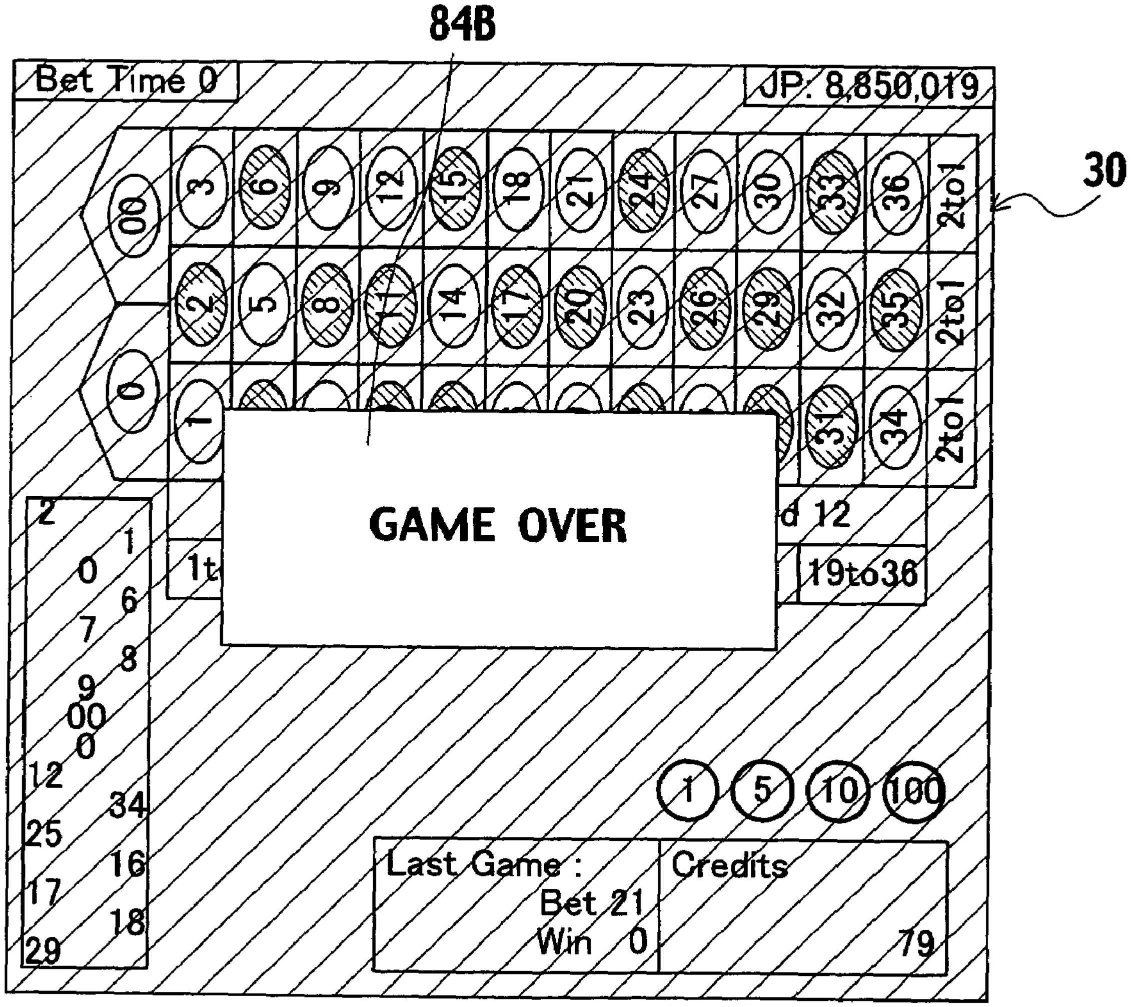
FIG. 27 is a diagram showing an exemplary display indicating a game over in a second game in a slot machine and a second game terminal according to one embodiment of the present invention.

At the step S303 of FIG. 17B, a transition to the joining processing shown in FIG. 18 to be described below is made. In this joining processing, the CPU 106 of the joining slot machine 13 for which the simplified BET screen display flag to be described below is turned ON carries out the following display processing. Namely, The simplified BET screen shown in a small window 85 as shown in FIG. 27 is displayed on an upper side of where the reels of the basic game are scrolling, such that it can be displayed while playing the basic game. The player selects win or lose according to that screen, during a period until the betting period end signal of the step S309 of FIG. 17C is received from the center controller 14.

In response to the selection made by the player, the CPU 106 of the joining slot machine 13 transmits a prescribed credit and an information regarding which one of win or lose is selected for the betting, to the center controller 14 (step S313 of FIG. 17D).

After that, in response to receiving the payout result from the center controller 14 (step S314 of FIG. 17E), the prescribed credit is paid and the simplified BET screen display flag is turned OFF (step S315).

Next, the processing of the second game terminal 15 will be described. At the step S301 of FIG. 17B, the CPU 306 of the second game terminal 15 receives the second game starting signal transmitted from the center controller 14. By receiving this signal, the operation at a terminal for the roulette game becomes possible at the second game terminal 15. After that, the CPU 306 shifts the processing to the step S302.

At the step S302, whether a device that received the second game starting signal is the slot machine 13 or not is judged. After that, the CPU 306 of the second game terminal 15 shifts the processing to the step S304.

At the step S304, the CPU 306 judges whether the coin is entered by the player or not according to the detection signal of the coin sensor 314. Then, in the case where the coin is not entered (step S304 NO), the CPU 306 shifts the processing to the step S305. On the other hand, in the case where the coin is entered (step S304 YES), the CPU 306 shifts the processing to the step S306 of FIG. 17C.

At the step S305, the CPU 306 judges whether the betting period end signal is received or not. The betting period end signal is transmitted from the center controller 14 when the period for betting has elapsed. In the case where this signal is not received (step S305 NO), the CPU 306 shifts the processing to the step S304. On the other hand, in the case where the betting period end signal is received (step S305 YES), the betting information signal indicating that the bet is not made is transmitted to the center controller 14, and this routine is finished.

At the step S306 of FIG. 17C, the CPU 306 of the second game terminal 15 records the credit data of an amount according to the number of entered coins into the RAM 310. After that, the CPU 306 shifts the processing to the step S307.

At the step S307, the CPU 306 displays the BET screen 70 shown in FIG. 22 to be described below, on the liquid crystal display 93 of the second game terminal 15 (step S307), and starts a measurement of the betting period in which the player can bet chips (step S308). The player who joined the game can bet own chips to the BET area 73 related to the number of his own guess by operating the touch panel 99 during the betting period in which the bet can be accepted. The specific betting methods using the BET screen 70 will be described below.

The player can join in a middle of the game for which the betting period has started by using the second game terminal 15, and in the game system 10 according to the present embodiment, at most four persons can play the second game by using the second game terminals 15.

After that, when the betting period end signal indicating that the betting period has ended is received from the CPU 206 of the center controller 14 (step S309), the CPU 306 displays an image indicating that the betting period has ended on the liquid crystal display 93 of the second game terminal 15, and finish accepting the betting operation at the touch panel 99 (step S310). After that, the CPU 306 shifts the processing to the step S311 of FIG. 17D.

At the step S311 of FIG. 17D, the CPU 306 judges whether the betting operation is made by the player during the betting period or not. In the case where the betting operation is made (step S311 YES), the CPU 306 shifts the processing to the step S313. On the other hand, in the case where the betting operation is not made (step S311 NO), the CPU 306 shifts the processing to the step S312.

At the step S312, the CPU 306 carries out the payout processing according to the coins entered by the player, and transmits the betting information signal indicating that the bet is not made to the center controller 14. After that, the CPU 306 finishes this routine.

At the step S313, the CPU 306 transmits the betting information (the specified BET area 73, and the number of chips bet on the specified BET area 73 (bet number)) for the bet made by the player at the second game terminal 15 to the center controller 14.

After that, the CPU 306 receives the credit payout result transmitted from the CPU 206 of the center controller 14 (step S314 of FIG. 17E). Note that the credit payout result is the payout result of the roulette game using the BET screen 70. After that, the CPU 306 shifts the processing to the step S315.

At the step S315, the CPU 306 carries out the payout of credit according to the payout result received at the step S314. More specifically, the credit data of an amount according to the payout of the roulette game is recorded in the RAM 310. Then, when the cashout button 97 is pressed, the CPU 306 pays out the coins according to the credit amount stored in the RAM 310 from the coin tray 94. After that, this routine is finished. In the case of continuing the game again at the main slot machine 13, the second game starting signal is transmitted from the center controller 14 again, and a transition to the next game is made.

FIG. 18 is a flow chart showing the joining processing in the second game to be executed by the controller 100 of the joining slot machine 13 according to one embodiment of the present invention.

At the step S401, the CPU 106 of the joining slot machine 13 pauses the basic game processing. After that, the CPU 106 shifts the processing to the step S402.

At the step S402, the CPU 106 displays the second game joining confirmation screen as shown in a lower half of FIG. 25 to be described below on the liquid crystal display 30. After that, the CPU 106 shifts the processing to the step S403.

At the step S403, the CPU 106 judges whether to join the second game or not. In the case of joining the second game (step S403 YES), the CPU 106 finishes this routine. In other words, while the second game is played, the basic game that has been played by the player will be in a pause state. On the other hand, in the case of not joining the second game (step S403 NO), the CPU 106 shifts the processing to the step S404.

At the step S404, the CPU 106 releases the pause of the basic game processing. After that, the CPU 106 shifts the processing to the step S405.

At the step S405, the CPU 106 displays the small window 85 as shown in FIG. 26 to be described below, and judges whether to bet on win or lose of the bet made by the player of the main slot machine 13 or not. In the case of betting (step S405 YES), the CPU 106 shifts the processing to the step S406. On the other hand, in the case of not betting (step S405 NO), the CPU 106 finishes this routine. In this case, the CPU 106 of the slot machine 13 continues the basic game.

At the step S406, the CPU 106 displays the small window 81K of the simplified BET screen as shown in FIG. 27 on the liquid crystal display 30, and in response to the selection of win or lose by the player, turns ON the simplified BET screen display flag stored in the RAM 110. After that, this routine is finished. The simplified BET screen display flag is for judging whether the simplified BET for betting on win or lose of the bet made by the player of the main slot machine 13 is made or not, which is turned ON in the case where the simplified BET is made, and turned OFF when that unit game is finished.

Figure 20:
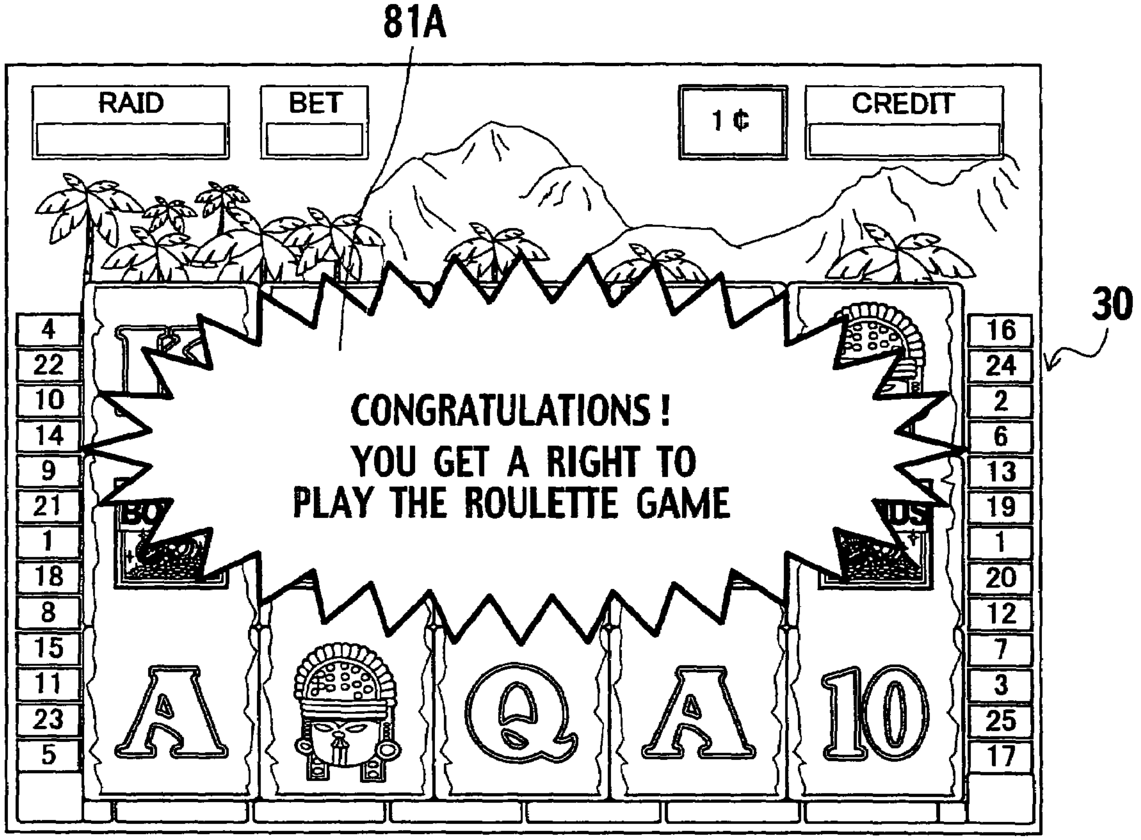
FIG. 20 is a diagram showing an exemplary display to be displayed after

FIG. 19 and FIG. 20 show exemplary displays of the basic game in the slot machine of the present embodiment. As shown in FIG. 19, the symbols are displayed by the stopping display on the liquid crystal display 30 of the slot machine 13. In the case of the present embodiment, symbols "BONUS" are aligned horizontally at a central portion, and the "BONUS" is realized on the payline L5. As described above, in the case where the condition of having symbols "BONUS" aligned on the payline L5 is realized, a small window 81A containing letters "Congratulations! You get a right to play the roulette game" as shown in FIG. 20 is displayed on the liquid crystal display 30. By such an effect, the player can recognize that a right to make a transition to the roulette game which is the second game is obtained. The CPU 106 of the slot machine 13 transmits the second game request signal to the center controller 14. At that point, if the second game is currently executed, the second game waiting signal is transmitted from the center controller 14 to the CPU 106 of the slot machine 13. On the other hand, if the second game is not currently executed, the second game start signal is transmitted.

FIG. 21 shows an exemplary display in the case where the condition for making a transition to the second game is realized, but a transition to the second game cannot be made immediately. Namely, when the CPU 106 of the slot machine 13 transmitted the second game start signal to the center controller 14, if the second game is currently executed, the second game waiting signal is transmitted from the center controller 14. In this case, at the slot machine 13, after the small window 81A as shown in FIG. 20 is displayed for a prescribed time, a screen of the basic game is displayed again. At this point, as shown in FIG. 21, a small window 81C containing letters "Waiting!!" is displayed on the liquid crystal display 30. By presenting such a display, the player can recognize that a transition to the roulette game cannot be made immediately, even though the right to make a transition to the roulette game which is the second game is obtained as symbols "BONUS" are aligned. Then, the player can be prevented from forgetting that there is the right to make a transition to the roulette game, and recognize that the right to make a transition to the roulette game is not lost. It may be made such that a number of persons waiting for the roulette game is displayed as a count in a vicinity of the small window 81C, where this count number is reduced whenever the waiting persons are reduced. By presenting such a display, the player can learn when his own turn is coming, so that the expectation to the second game can be made greater.

FIG. 22 shows an exemplary display in the case where a transition to the second game becomes possible from a state of waiting for the second game In the slot machine 13 of the present embodiment. In the case where own turn to make a transition to the second game comes while waiting for the second game, it may be possible to immediately make a transition to a screen of the second game as shown in FIG. 25 to be described below, but depending on the playing state at that point (the case where payouts are obtained consecutively, for example), it is possible to expect cases where the player desires to continue enjoying the basic game. In such a case, making a transition to the roulette game automatically may cause the loss of the interest to the game. For this reason, in the case where a transition to the second game becomes possible from the second game waiting state, a window for inquiring whether the basic game should be interrupted or not to the player is displayed. Namely, as shown in FIG. 22, a small window 81C containing letters "Do you want to interrupt the basic game?" is displayed on the liquid crystal display 30. The player can select either starting the second game or continuing the basic game, by pressing either a YES button 82 or a NO button 83 on the touch panel 32 (see FIG. 5) which is displayed on a lower side of the window. The screen of FIG. 22 is also displayed in the case where a transition to the second game is immediately possible when the condition of having symbols "BONUS" aligned on the payline L5 is realized.

Figure 24:
FIG. 24 is a diagram showing an exemplary display of a screen to be displayed on a large scale monitor at a time of starting a second game.

FIG. 23 and FIG. 24 are exemplary displays in the case where the player selected starting of the second game. When the player presses the YES button 82 in FIG. 22, as shown in FIG. 23, a small window 81D containing letters "Let's start the roulette game" is displayed on the liquid crystal display 30. By presenting such a display, the player can recognize that the roulette game which is the second game will be started from now. FIG. 24 shows an exemplary display of a display for urging to join the second game to be displayed on the large scale monitor 16, when the second game is to be started. By displaying "Let's join the roulette game!" on the large scale monitor 16 in this way, the third persons in the gaming facility can join the roulette game by using the second game terminals 15. By outputting sounds from the speakers provided on left and right of the large scale monitor 16 as shown in FIG. 2, the announcement to the third persons can be made more effectively.

Figure 25:
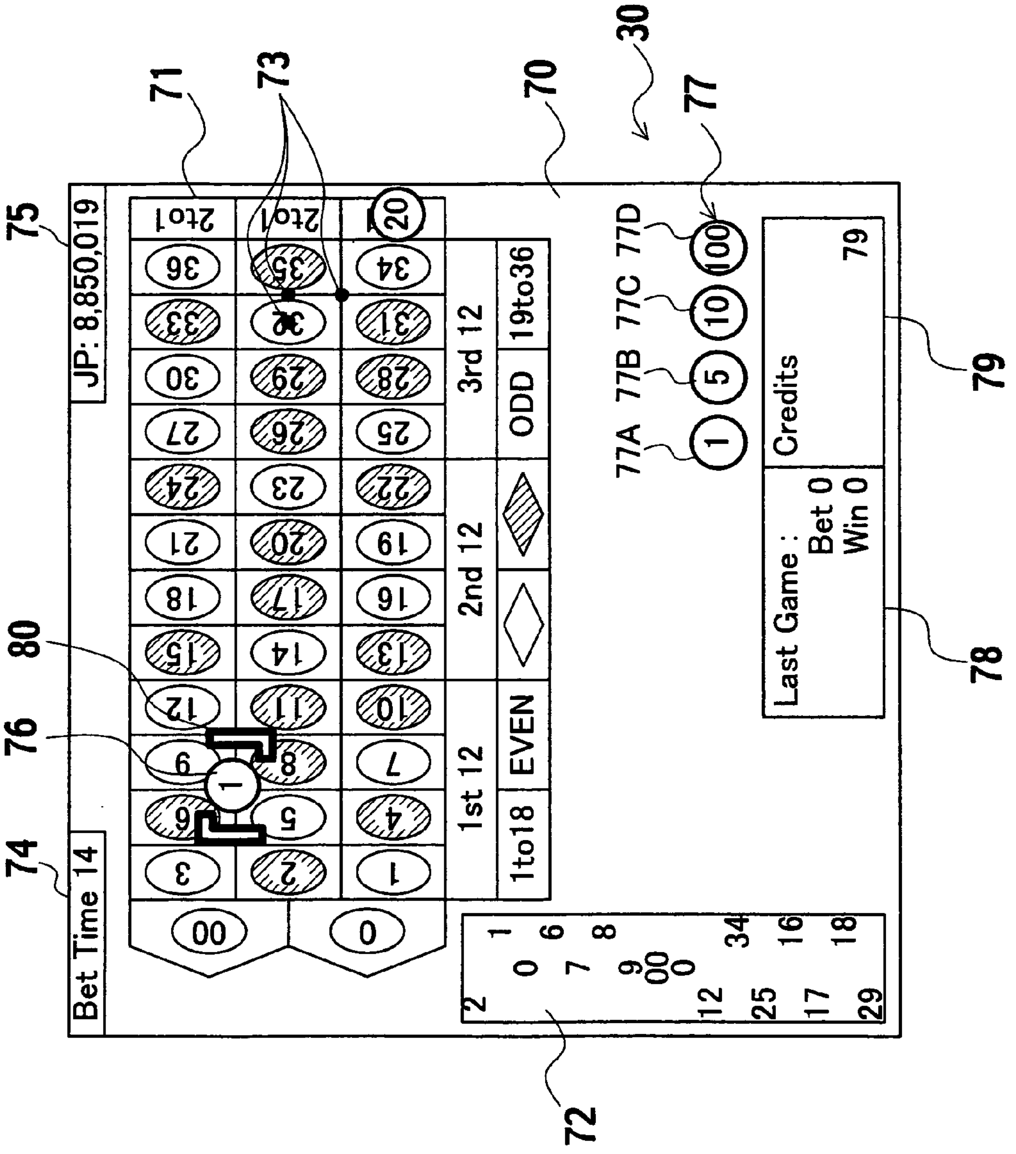
FIG. 25 is a diagram showing an exemplary display at a time of a betting operation in a second game in a slot machine and a second game terminal according to one embodiment of the present invention.

FIG. 25 shows an exemplary display of the second game in the slot machine 13. More specifically, it shows an exemplary display to be displayed on the liquid crystal display 30 at a time of making the betting operation of the roulette game. The similar display is presented also on the display 93 of the second game terminal 15. Except for those explained in FIG. 9 described above, this display will be described with reference to FIG. 25.

First, this BET screen 70 is displayed on the liquid crystal display 30 of the slot machine 13 and the display 93 of the second game terminal 15. Here, it will be described as displayed on the liquid crystal display 30 of the slot machine 13. On the lower side of the betting board 71 displayed on the BET screen 70, a result log display unit 72, unit BET buttons 77, a payout amount display unit 78 and a credit amount display unit 79 are displayed sequentially from a upper left side of the screen. The payout amount display unit 78 and the credit amount display unit 79 are displaying those in the roulette game, unlike the payout amount display unit 48 and the credit amount display unit 49 of the slot machine 13.

The unit BET buttons 77 are buttons for betting chips on the BET area 73 (on a grid of a number and a mark or on a line forming a grid) specified by the player. The unit BET buttons 77 comprises four types of a 1-BET button 77A, 5-BET button 77B, 10-BET button 77C and 100-BET button 77D.

The player specifies an area to bet by displaying a cursor 80 to be described below, by directly pressing the BET area 73 to be bet on a screen by a finger or the like first. In that state, when the 1-BET button 77A is pressed, the player can bet chips in unit of one chip (the number of bet chips will be increased sequentially like 1, 2, 3 and so on whenever the 1-BET button 77A is pressed by the finger or the like). When the 5-BET button 77B is pressed, the player can bet chips in unit of five chips (the number of bet chips will be increased sequentially like 5, 10, 15 and so on whenever the 5-BET button 77B is pressed by the finger or the like). When the 10-BET button 77C is pressed, the player can bet chips in unit of ten chips (the number of bet chips will be increased sequentially like 10, 20, 30 and so on whenever the 10-BET button 77C is pressed by the finger or the like). When the 100-BET button 77D is pressed, the player can bet chips in unit of one hundred chips (the number of bet chips will be increased sequentially like 100, 200, 300 and so on whenever the 100-BET button 77D is pressed by the finger or the like).

Consequently, even at a time of betting many chips, its operation can be simplified. One coin to be used in the basic game of the slot machine 13 corresponds to one chip to be used in the second game.

The places to bet chips are not limited to one place. After pressing the unit BET button, by enabling the player to specify another BET area 73, it becomes possible to make the betting operations for a plurality of places.

The payout amount display unit 78 displays the number of bet chips of the player in the previous game, and the payout credit amount. Here, the number obtained by subtracting the number of bet chips from the payout credit amount is the credit amount newly obtained by the player in the previous game. In this exemplary display, it is the first game since a transition to the second game is made by the slot machine 13 so that the number of bet chips and the payout credit amount are both "0".

In addition, the credit amount display unit 79 displays the credit amount currently owned by the player. This credit amount is decreased according to the number of bet chips when the chips are bet (one credit for one bet chip). When the bet chips become win and the payout of credit is made, the credit amount will be increases as much as the number of payout chips. When the credit amount owned by the player becomes "0", it becomes game over. In this exemplary display, the case where a transition to the second game is made when the credit amount at the slot machine 13 is "1" is shown. Namely, 20 chips are bet on "2to1" which covers "1", "4", "7", "10" and so on, and 1 chip is bet on four numbers "5", "6", "7" and "8", so that "79" obtained by subtracting "21 (20+1)" from the number of chips "100" at a time of the transition is displayed as the credit amount.

On the betting board 71, the cursor 80 for indicating the BET area 73 currently selected by the player is displayed.

When the player makes the bet on the BET screen 70 in a configuration described above, first the BET area 73 (on a grid of a number and a mark, or a line forming a grid) to be bet is specified on a screen by directly pressing it by the finger. As a result, the cursor 80 moves to the specified BET area 73.

After that, by pressing each unit button (1-BET button 77*a,* 5-BET button 77B, 10-BET button 77C, 100-BET button 77D) of the unit BET buttons 77, the chips in that unit number are bet on the specified BET area 73. For example, by pressing the 10-BET buttons 77C four times, the 5-BET button 77B once, and 1-BET button 77A three times, a total 48 chips can be bet. The player can make the betting operation by operating a terminal at hand using these functions.

FIG. 26 and FIG. 27 show exemplary displays of a screen to be displayed on the liquid crystal display 30 after the payout processing at the step S115 of FIG. 17E described above. Among them, FIG. 26 is the exemplary display of a screen to be displayed on the liquid crystal display 30 of the slot machine 13 in the case where the credit in the roulette game is remaining. In this case, a small window 84A for inquiring whether the game should be continued or not the player is displayed at a center of the screen. On the upper right side inside the window, the countdown number 85 is displayed. The countdown number 85 is counted down sequentially from "10" like "10", "9", "8", and so on. In the case where the player does not press either the YES button 82 or the NO button 83 on the touch panel 32 (see FIG. 5) which is on a lower side of the image before it becomes "0", or in the case where the NO buttons 83 is pressed during the countdown, it is judged that the roulette game is to be finished. Then, a small window 84B for notifying the game over as shown in FIG. 27 is displayed. In the case where the credit in the roulette game is not remaining, FIG. 27 is displayed on the liquid crystal display 30, without displaying FIG. 26, and the roulette game is finished.

In this way, in the game system and the playing method according to the present embodiment, when the basic game is played by the slot machine 13 and the combination of prescribed symbols such as "BONUS" is stopped on the payline L5, for example, the roulette game to be played by the second game device 11 is started. In this case, the slot machine 13 becomes a terminal capable of making the betting operation of the roulette game. Then, in the roulette game, the player will use the credit given by the combination of symbols "BONUS" in the basic game. The roulette game is finished mostly when the player finishes playing or runs out of the credit to bet. Consequently, depending on the playing method of the player, it is possible to play the roulette game many times.

Figure 28:
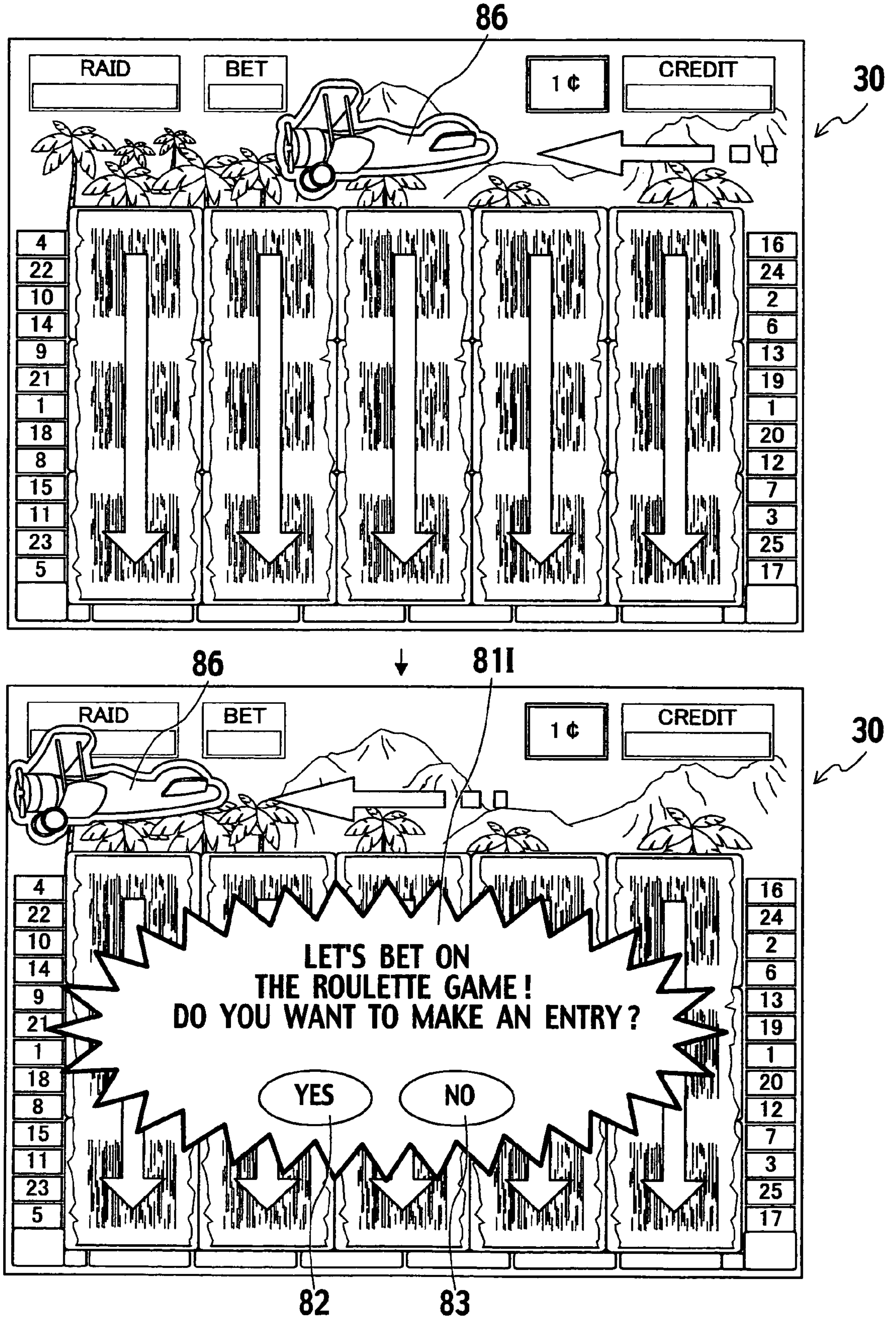
FIG. 28 is a diagram showing an exemplary display of a second game joining admission screen of a slot machine which is executing a basic game in a second game according to one embodiment of the present invention.

FIG. 28 shows an exemplary display of a screen to be displayed on the liquid crystal display 30 at the step S402 of FIG. 18 described above. The upper half of FIG. 28 is displaying a manner by which an airplane 86 is flying from an upper right side on the liquid crystal display 30 of the slot machine 13 which is playing the basic game. By the effect of the airplane 86, it is possible to arouse expectation to the event to take place from now on in the player. After that, as shown in a lower half of FIG. 28, a small window 81E containing letters "Let's bet on the roulette game!" is displayed as the airplane 86 flies to the left side. At the same time, buttons by which joining or not joining the roulette game can be selected are displayed on a lower side of the window. Here, in the case where the YES button 82 is pressed, the slot machine 13 is controlled such that the roulette game will be played. On the other hand, in the case where the NO button 83 is pressed, the basic game will be continued.

Figure 29:
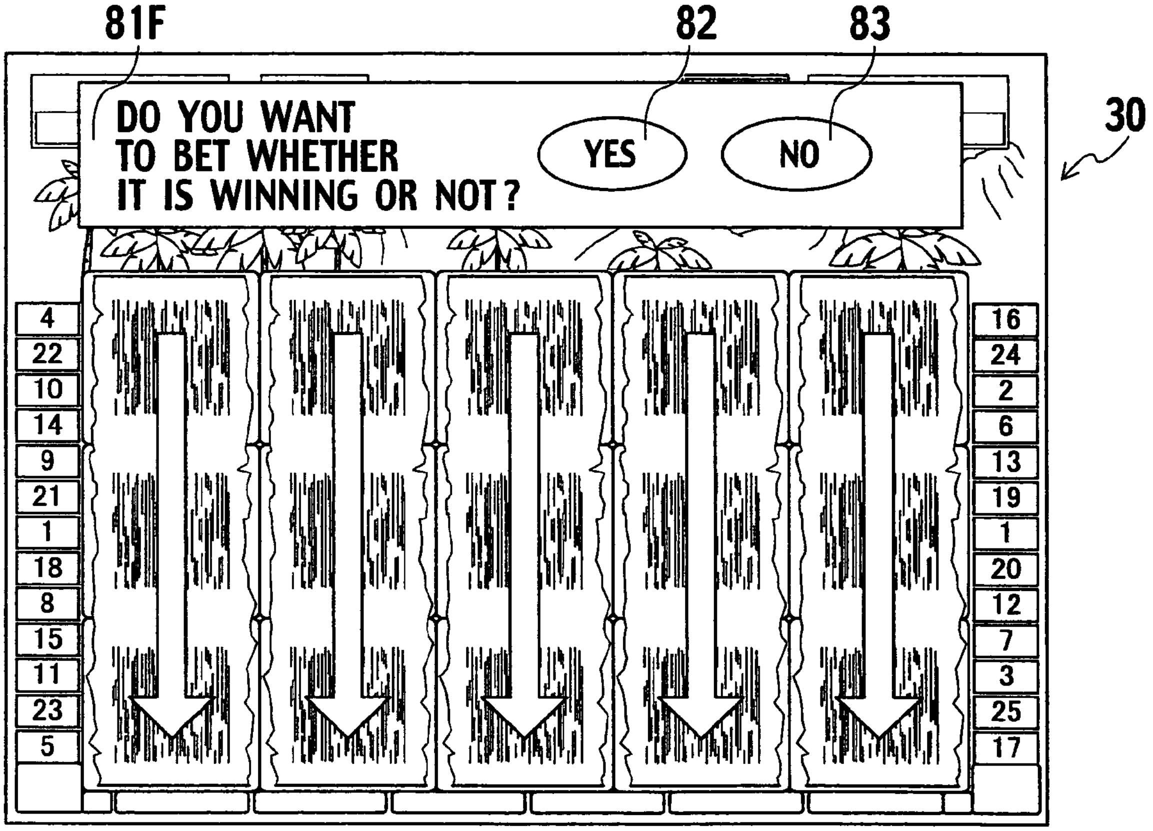
FIG. 29 is a diagram showing an exemplary display of a second game win or lose betting joining admission screen of a slot machine which is executing a basic game in a second game according to one embodiment of the present invention.
Figure 30:
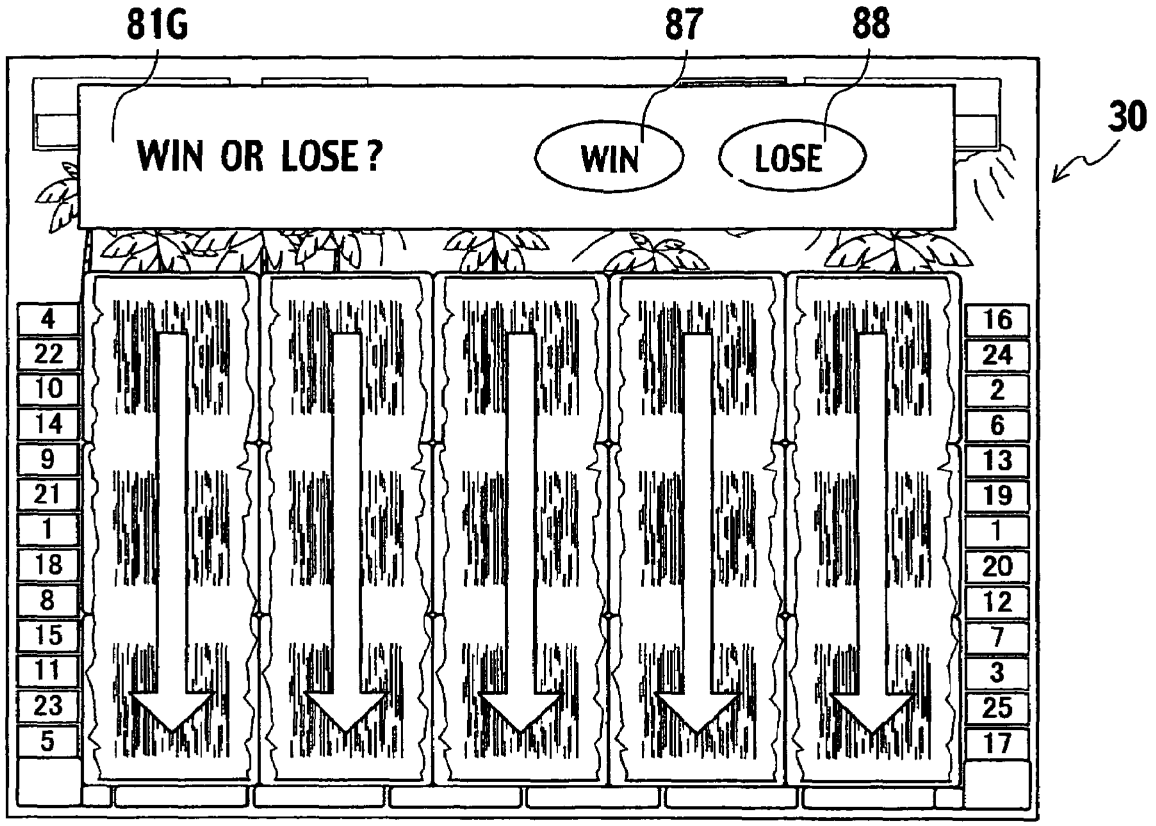
FIG. 30 is a diagram showing an exemplary display of a screen for betting win or lose in a case of joining to a second game win or lose betting in a slot machine which is executing a basic game in a second game according to one embodiment of the present invention.

FIG. 29 is an exemplary display of a screen to be displayed on the liquid crystal display 30 of the slot machine 13 which selected not to join the roulette game, after the pause of the basic game processing is released at the step S404 of FIG. 18 described above. Here, a small window 81F for selecting whether or not to bet on win or lose of the bet made by the player of the main slot machine 13 is displayed. Namely, "Do you want to bet whether it is winning or not?" is displayed, and buttons by which betting or not betting can be selected are displayed. In the case where the YES button 82 is pressed, a small window 81G as shown in FIG. 30 is displayed. On the other hand, in the case where the NO button 83 is pressed, the screen of FIG. 29 is closed.

FIG. 30 shows a screen of the simplified bet to be displayed in the case where the YES button 82 is pressed in the screen of FIG. 29. By the small window 81F, the player can select either win or lose by pressing either a WIN button 87 or a LOSE button 88. This bet can be made by using a prescribed credit, and in the case of winning the bet, a prescribed credit will be added to the credit of the basic game.

In this way, in the game system and the playing method according to the present embodiment, when the basic game is played by the slot machine 13 and the combination of prescribed symbols such as "BONUS" is stopped on the payline L5, for example, the roulette game to be played by the second game device 11 which is physically separate from the slot machine 13 is started. In this case, the slot machine 13 becomes a terminal capable of making the betting operation of the roulette game. The slot machine that is playing the basic game in which the combination of the prescribed symbols such as "BONUS" is not stopped and displayed can also join the roulette game as the joining slot machine 13. In this case, in the roulette game, the player can use the credit given by the combination of symbols "BONUS" in the basic game. The payout of the roulette game is transmitted to the slot machine 13. This payout can be used in the basic game at the slot machine 13. The roulette game is finished when the player wishes to finish playing the roulette game or runs out of the credit to bet. Consequently, depending on the playing method of the player, it is possible to play the roulette game many times.

A plurality of second game terminals 15 dedicated to the roulette game are provided. By having such second game terminals 15 that can join the roulette game, it becomes possible for the third person in the gaming facility to join only the roulette game even if he is not playing the game at the slot machine 13, so that it is possible to arouse a high interest with respect to the game.

In the roulette game, the rules such as places that can be bet or betting at multiple places by a single play is allowed or not, and the payout in the case of win, are determined according to the second game payout table. The second game payout table can be set differently for different terminals to be used in playing the game, and the payout rate can be changed according to the conditions in the basic game. Consequently, it becomes possible to make such various settings, so that it becomes possible to provide the game in which the player can maintain the interest to the game.

At the joining slot machine 13, while playing the basic game, it is possible to make the betting of the roulette game as the simplified bet at the same time. This betting is on whether the bet made by the player who is playing the roulette game at the slot machine 13 by its initiative is win or lose, for example. In this way, it is possible to join the roulette game played by the other player indirectly, without interrupting its own playing, so that the joy of the playing can be shared.

In the game system and the playing method according to the present embodiment, when a transition from the basic game to the roulette game is to be made, if the second game is currently executed by another player, the second game will be started at a timing where that second game is finished, so that the player will not lose his own right, even when the player's right to make a transition to the second game is in conflict with that of another player, and the player can enjoy the game at east, without feeling any unfairness. The basic game is continued until the second game is started, so that the player can enjoy the basic game without wasting a waiting time until the second game is started, and the player can maintain the interest to the game.

In the present embodiment, a right to make a transition to the second game is stored in an order of receiving the second game request signal, so that the players can make a transition to the second game in an order by which the condition for making a transition to the second game is realized. In this way, the handling of the right to make a transition to the second game becomes fair, so that the reliability of the game system can be increased.

In the present embodiment, when a transition from the basic game to the roulette game is to be made but the second game is currently executed, the fact that it is waiting for a transition to the second game is displayed on a screen, so that the player can be prevented from forgetting that there is a right to make a transition to the second game, and recognize that a right to make a transition to the second game is not lost. Namely, the player can confirm that there is a right to make a transition to the second game even while playing the basic game. Consequently, the player can play the basic game at east until a transition to the second game is made, and the player can maintain the interest to the game.

In the present embodiment, when a transition to the second game becomes possible while waiting for the second game, an inquiry to the player as to whether the basic game should be interrupted or not is displayed on a screen, so that the player can continue to enjoy the basic game according to the playing state. In this way, a transition to the second game will not be made automatically despite of the fact that the interruption of the basic game is not desired by the player, so that the player can maintain the interest to the game.

In the above, the embodiments of the game system and the playing method according to the present invention have been described, but they are only showing concrete examples. Namely, the above described embodiments are not intended to limit the present invention, and the concrete configuration of each means or the like can be appropriately changed by design. Also, the concrete configuration of each means or the like can be replaced by other means having equivalent functions, or a combination of a plurality of means each having a part of functions, and can also be realized by a part of functions of the other means having expanded functions. Also, the effects described in the embodiments of the present invention are only listing the most preferable effects arising from the present invention, and the effects of the present invention are not limited to those described in the embodiments of the present invention.

For example, as the second game, the roulette game has been described, but without being limited to that, it may be the card game such as a poker or the gambling such as quiz. It may be a competition with a computer or another player using an equipment that requires physical actions such as a cycling machine or a horse riding exercise device.

What is claimed is:

1. A game system, comprising:

a plurality of slot machines, each slot machine having a controller operable to control at least a basic game and a second game, each slot machine being capable of making a transition to the second game from a middle of the basic game when a prescribed condition is realized in the basic game, each slot machine transmitting a second game request signal for requesting a transition to the second game when the prescribed condition is realized in the basic game;

a second game device operable to execute the second game, which is provided as a physically separate device from the slot machines;

a display adapted to display images according to a game status of the second game device, which is visible by a plurality of players playing the second game at the slot machines; and a center controller configured to communicate with the slot machines, the second game device and the display, the center controller operable to control one slot machine which transmitted the second game request and the second game device to start the second game if the second game is not currently executed by any one of the slot machines and the second game device when the second game request signal is received from the one slot machine, and control the one slot machine which transmitted the second game request signal and the second game device to start the second game at a timing where the second game executed by any one of the other slot machines and the second game device is terminated if the second game is currently executed by any one of the other slot machines and the second game device when the second game request signal is received from the one slot machine.

2. The game system of claim 1, wherein the center controller is operable to hold a right to make a transition to the second game by the one slot machine which transmitted the second game request signal in an order of receiving the second game request signal and control a slot machine for which the right is held at a top and the second game device to start the second game at a timing where the second game executed by any of the other slot machines and the second game device is terminated, if the second game is currently executed by any one of the other slot machines and the second game device when the second game request signal is received from the one slot machine.

3. The game system of claim 1, wherein the center controller is operable to hold a right to make a transition to the second game by the one slot machine which transmitted the second game request signal in an order of receiving the second game request signal, transmit a second game waiting signal indicating that it is waiting for the second game to the one slot machine which transmitted the second game request signal, and control a slot machine for which the right is held at a top and the second game device to start the second game at a timing where the second game executed by any one of the other slot machines and the second game device is terminated, if the second game is currently executed by any one of the other slot machines and the second game device when the second game request signal is received from the one slot machine; and a controller of the one slot machine which transmitted the second game request signal is operable to display a message indicating that it is waiting for the second game on a screen visible to a player, when the second game waiting signal is received from the center controller.

4. The game system of claim 1, wherein the center controller is operable to hold a right to make a transition to the second game by the one slot machine which transmitted the second game request signal in an order of receiving the second game request signal, transmit a second game waiting signal indicating that it is waiting for the second game to the one slot machine which transmitted the second game request signal, transmit a second game start signal to a slot machine for which the right is held at a top at a timing where the second game executed by any one of the other slot machines and the second game device is terminated and control the one slot machine which transmitted a second game starting signal and the second game device to start the second game in response to receiving the second game starting signal from the one slot machine which transmitted a second game starting signal, if the second game is currently executed by any one of the other slot machines and the second game device when the second game request signal is received from the one slot machine; and a controller of the one slot machine is operable to display a message indicating that it is waiting for the second game on a screen visible to a player when the second game waiting signal is received from the center controller, display an inquiry as to whether the basic game should be interrupted or not on the screen visible to the player when the second game start signal is received from the center controller while executing the basic game, interrupt the basic game and transmit the second game starting signal to the center controller when an interruption of the basic game is commanded from the player, and continue the basic game when a continuation of the basic game is commanded from the player.

5. A game system, comprising:

a plurality of slot machines, each slot machine having a controller operable to control at least a basic game and a second game, each slot machine being capable of making a transition to the second game from a middle of the basic game when a prescribed condition is realized in the basic game, each slot machine transmitting a second game request signal for requesting a transition to the second game when the prescribed condition is realized in the basic game;

a second game device operable to execute the second game, which is provided as a physically separate device from the slot machines;

a display adapted to display images according to a game status of the second game device, which is visible from a plurality of players playing the second game at the slot machines; and a center controller configured to communicate with the slot machines, the second game device and the display, the center controller operable to control one slot machine which transmitted the second game request signal and the second game device to start the second game if the second game is not currently executed by any one of the other slot machines and the second game device when the second game request signal is received from the one slot machine, and hold a right to make a transition to the second game by the one slot machine which transmitted the second game request signal in an order of receiving the second game request signal and control a slot machine for which the right is held at a top and the second game device to start the second game at a timing where the second game executed by any one of the other slot machines and the second game device is terminated, if the second game is currently executed by any one of the other slot machines and the second game device when the second game request signal is received from the one slot machine.

6. The game system of claim 5, wherein the center controller is operable to transmit a second game waiting signal indicating that it is waiting for the second game to the one slot machine which transmitted the second game request signal, if the second game is currently executed by any one of the slot machines and the second game device when the second game request signal is received from the one slot machine; and a controller of the one slot machine which transmitted the second game request signal is operable to display a message indicating that it is waiting for the second game on a screen visible to a player, when the second game waiting signal is received from the center controller.

7. The game system of claim 5, wherein the center controller is operable to transmit a second game waiting signal indicating that it is waiting for the second game to the one slot machine which transmitted the second game request signal if the second game is currently executed by any one of the other slot machines and the second game device when the second game request signal is received from the one slot machine, transmit a second game start signal to a slot machine for which the right is held at a top at a timing where the second game executed by any one of the other slot machines and the second game device is terminated, and control the one slot machine which transmitted a second game starting signal and the second game device to start the second game in response to receiving the second game starting signal from the one slot machine which transmitted a second game starting signal; and a controller of the one slot machine is operable to display a message indicating that it is waiting for the second game on a screen visible to a player when the second game waiting signal is received from the center controller, display an inquiry as to whether the basic game should be interrupted or not on the screen visible to the player when the second game start signal is received from the center controller while executing the basic game, interrupt the basic game and transmit the second game starting signal to the center controller when an interruption of the basic game is commanded from the player, and continue the basic game when a continuation of the basic game is commanded from the player.

8. A game system, comprising:

a plurality of slot machines, each slot machine having a controller operable to control at least a basic game and a second game, each slot machine being capable of making a transition to the second game from a middle of the basic game when a prescribed condition is realized in the basic game, each slot machine transmitting a second game request signal for requesting a transition to the second game when the prescribed condition is realized in the basic game, each slot machine displaying a message indicating that it is waiting for the second game on a screen visible to a player when a second game waiting signal is received from a center controller;

a second game device operable to execute the second game, which is provided as a physically separate device from the slot machines;

a display adapted to display images according to a game status of the second game device, which is visible from a plurality of players playing the second game at the slot machines; and a center controller configured to communicate with the slot machines, the second game device and the display, the center controller operable to transmit a second game waiting signal indicating that it is waiting for the second game to the one slot machine which transmitted the second game request signal, and hold a right to make a transition to the second game by the one slot machine which transmitted the second game request signal in an order of receiving the second game request signal, and control a slot machine for which the right is held at a top and the second game device to start the second game at a timing where the second game executed by any one of the other slot machines and the second game device is terminated, if the second game is currently executed by any one of the other slot machines and the second game device when the second game request signal is received from the one slot machine.

9. The game system of claim 8, wherein the center controller is operable to transmit a second game start signal to a slot machine for which the right is held at a top at a timing where the second game executed by any one of the other slot machines and the second game device is terminated, and control the one slot machine which transmitted a second game starting signal and the second game device to start the second game in response to receiving the second game starting signal from the one slot machine which transmitted a second game starting signal; and a controller of the one slot machine is operable to display that it is waiting for the second game on a screen visible to a player when the second game waiting signal is received from the center controller, display an inquiry as to whether the basic game should be interrupted or not on the screen visible to the player when the second game start signal is received from the center controller while executing the basic game, interrupt the basic game and transmit the second game starting signal to the center controller when an interruption of the basic game is commanded from the player, and continue the basic game when a continuation of the basic game is commanded from the player.

10. A control method of a game system, the game system comprising:

a plurality of slot machines, each slot machine having a controller operable to control at least a basic game and a second game, each slot machine being capable of making a transition to the second game from a middle of the basic game when a prescribed condition is realized in the basic game, each slot machine transmitting a second game request signal for requesting a transition to the second game when the prescribed condition is realized in the basic game;

a second game device operable to execute the second game, which is provided as a physically separate device from the slot machines;

a display adapted to display images according to a game status of the second game device, which is visible from a plurality of players playing the second game at the slot machines; and a center controller configured to communicate with the slot machines, the second game device and the display;

the control method comprising the steps of:

receiving the second game request signal from one slot machine at the center controller;

controlling the one slot machine which transmitted the second game request signal and the second game device to start the second game if the second game is not currently executed by any one of the other slot machines and the second game device when the second game request signal is received from the one slot machine; and controlling the one slot machine which transmitted the second game request signal and the second game device to start the second game at a timing where the second game executed by any one of the other slot machines and the second game device is terminated if the second game is currently executed by any of the other slot machines and the second game device when the second game request signal is received from the one slot machine.

11. The control method of a game system of claim 10, further comprising the steps of:

holding a right to make a transition to the second game by the one slot machine which transmitted the second game request signal in an order of receiving the second game request signal, if the second game is currently executed by any one of the other slot machines and the second game device when the second game request signal is received from the one slot machine at the center controller; and controlling a slot machine for which the right is held at a top and the second game device to start the second game at a timing where the second game executed by any one of the other slot machines and the second game device is terminated.

12. The control method of a game system of claim 10, further comprising the steps of:

holding a right to make a transition to the second game by the one slot machine which transmitted the second game request signal in an order of receiving the second game request signal, if the second game is currently executed by any one of the other slot machines and the second game device when the second game request signal is received from the one slot machine at the center controller;

transmitting a second game waiting signal indicating that it is waiting for the second game to the one slot machine which transmitted the second game request signal;

controlling a slot machine for which the right is held at a top and the second game device to start the second game at a timing where the second game executed by any one of the other slot machines and the second game is terminated;

receiving the second game waiting signal from the center controller at a controller of the one slot machine which transmitted the second game request signal; and controlling to display a message indicating that it is waiting for the second game on a screen visible to a player, when the second game waiting signal is received.

13. The control method of a game system of claim 10, further comprising the steps of:

holding a right to make a transition to the second game by the one slot machine which transmitted the second game request signal in an order of receiving the second game request signal, if the second game is currently executed by any one of the other slot machines and the second game device when the second game request signal is received from the one slot machine;

transmitting a second game waiting signal indicating that it is waiting for the second game to the one slot machine which transmitted the second game request signal;

transmitting a second game start signal to a slot machine for which the right is held at a top at a timing where a transition to the second game becomes possible;

controlling the one slot machine which transmitted a second game starting signal and the second game device to start the second game in response to receiving the second game starting signal from the one slot machine which transmitted a second game starting signal;

receiving the second game waiting signal from the center controller at a controller of the one slot machine;

displaying a message indicating that it is waiting for the second game on a screen visible to a player when the second game waiting signal is received;

receiving the second game start signal from the center controller;

displaying an inquiry as to whether the basic game should be interrupted or not on the screen visible to the player;

interrupting the basic game when an interruption of the basic game is commanded from the player;

transmitting the second game starting signal to the center controller when the basic game is interrupted according to a command from the player; and continuing the basic game when a continuation of the basic game is commanded from the player.

14. A control method of a game system, the game system comprising:

a plurality of slot machines, each slot machine having a controller operable to control at least a basic game and a second game, each slot machine being capable of making a transition to the second game from a middle of the basic game when a prescribed condition is realized in the basic game, each slot machine transmitting a second game request signal for requesting a transition to the second game when the prescribed condition is realized in the basic game;

a second game device operable to execute the second game, which is provided as a physically separate device from the slot machines;

a display adapted to display images according to a game status of the second game device, which is visible from a plurality of players playing the second game at the slot machines; and a center controller configured to communicate with the slot machines, the second game device and the display;

the control method comprising the steps of:

receiving the second game request signal from one slot machine at the center controller;

controlling the one slot machine which transmitted the second game request signal and the second game device to start the second game if the second game is not currently executed by any one of the other slot machines and the second game device when the second game request signal is received from the one slot machine; and holding a right to make a transition to the second game by the one slot machine which transmitted the second game request signal in an order of receiving the second game request signal and controlling a slot machine for which the right is held at a top and the second game device to start the second game at a timing where the second game executed by any one of the other slot machines and the second game device is terminated, if the second game is currently executed by any one of the other slot machines and the second game device when the second game request signal is received from the one slot machine.

15. The control method of a game system of claim 14, further comprising the steps of:

transmitting a second game waiting signal indicating that it is waiting for the second game to the one slot machine which transmitted the second game request signal, if the second game is currently executed by any one of the other slot machines and the second game device when the second game request signal is received from the one slot machine at the center controller; and controlling to display a message indicating that it is waiting for the second game on a screen visible to a player, when the second game waiting signal is received from the center controller at a controller of the one slot machine which transmitted the second game request signal.

16. The control method of a game system of claim 14, further comprising the steps of:

transmitting a second game waiting signal indicating that it is waiting for the second game to the one slot machine which transmitted the second game request signal, if the second game is currently executed by any one of the other slot machines and the second game device when the second game request signal is received from the one slot machine;

transmitting a second game start signal to a slot machine for which the right is held at a top at a timing where a transition to the second game becomes possible;

controlling the one slot machine which transmitted a second game starting signal and the second game device to start the second game in response to receiving the second game starting signal from the one slot machine which transmitted a second game starting signal;

displaying a message indicating that it is waiting for the second game on a screen visible to a player when the second game waiting signal is received from the center controller at a controller of the one slot machine;

receiving the second game start signal from the center controller;

displaying an inquiry as to whether the basic game should be interrupted or not on the screen visible to the player;

interrupting the basic game when an interruption of the basic game is commanded from the player;

transmitting the second game starting signal to the center controller when the basic game is interrupted according to a command from the player; and continuing the basic game when a continuation of the basic game is commanded from the player.

17. A control method of a game system, the game system comprising:

a plurality of slot machines, each slot machine having a controller operable to control at least a basic game and a second game, each slot machine being capable of making a transition to the second game from a middle of the basic game when a prescribed condition is realized in the basic game, each slot machine transmitting a second game request signal for requesting a transition to the second game when the prescribed condition is realized in the basic game, each slot machine displaying a message indicating that it is waiting for the second game on a screen visible to a player, when a second game waiting signal is received from a center controller after the second game request signal is transmitted;

a second game device operable to execute the second game, which is provided as a physically separate device from the slot machines;

a display adapted to display images according to a game status of the second game device, which is visible from a plurality of players playing the second game at the slot machines; and a center controller configured to communicate with the slot machines, the second game device and the display;

the control method comprising the steps of:

receiving the second game request signal from one slot machine at the center controller;

transmitting a second game waiting signal indicating that it is waiting for the second game to the one slot machine which transmitted the second game request signal, holding a right to make a transition to the second game by the one slot machine which transmitted the second game request signal in an order of receiving the second game request signal, and controlling a slot machine for which the right is held at a top and the second game device to start the second game at a timing where the second game executed by any one of the other slot machines and the second game device is terminated, if the second game is currently executed by any one of the other slot machines and the second game device when the second game request signal is received from the one slot machine.

18. The control method of a game system of claim 17, further comprising the steps of:

transmitting a second game start signal to a slot machine for which the right is held at a top from the center controller at a timing where the second game executed by any one of the other slot machines and the second game device is terminated;

controlling the one slot machine which transmitted a second game starting signal and the second game device to start the second game in response to receiving the second game starting signal from the one slot machine which transmitted a second game starting signal;

displaying a message indicating that it is waiting for the second game on a screen visible to a player when the second game waiting signal is received from the center controller at a controller of the one slot machine;

displaying an inquiry as to whether the basic game should be interrupted or not on the screen visible to the player, when the second game start signal is received from the center controller;

interrupting the basic game when an interruption of the basic game is commanded from the player;

transmitting the second game starting signal to the center controller when the basic game is interrupted according to a command from the player; and continuing the basic game when a continuation of the basic game is commanded from the player.

* * * * *